United States Patent
Kurakake et al.

(10) Patent No.: US 11,827,304 B2
(45) Date of Patent: Nov. 28, 2023

(54) LEANING VEHICLE

(71) Applicant: YAMAHA HATSUDOKI KABUSHIKI KAISHA, Iwata (JP)

(72) Inventors: Haruhito Kurakake, Shizuoka (JP); Takayuki Sano, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 406 days.

(21) Appl. No.: 17/334,488

(22) Filed: May 28, 2021

(65) Prior Publication Data

US 2021/0284270 A1 Sep. 16, 2021

Related U.S. Application Data

(63) Continuation-in-part of application No. PCT/JP2019/046865, filed on Nov. 29, 2019.

(30) Foreign Application Priority Data

Nov. 29, 2018 (JP) ................. 2018-224260

(51) Int. Cl.
*B60K 5/00* (2006.01)
*B62K 5/027* (2013.01)
(Continued)

(52) U.S. Cl.
CPC ............... *B62K 5/027* (2013.01); *B62K 5/05* (2013.01); *B62K 21/18* (2013.01); *B62K 25/00* (2013.01); *B62J 25/04* (2020.02)

(58) Field of Classification Search
CPC .......... B60K 5/027; B60K 5/05; B60K 21/18; B60K 25/00

(Continued)

(56) References Cited

U.S. PATENT DOCUMENTS 7,226,062 B1 6/2007 Stefano
7,648,148 B1 * 1/2010 Mercier .................. B62K 5/05
280/5.509

(Continued)

FOREIGN PATENT DOCUMENTS

CN 104507790 A 4/2015
CN 104703870 A 6/2015
(Continued)

OTHER PUBLICATIONS

"Tritown", Yamaha Hatsudoki Kabushiki Kaisha, [searched on Oct. 1, 2018], Internet, https://global.yamaha-motor.com/jp/design_technology/design/concept/tritown/.

*Primary Examiner* — Hau V Phan
(74) *Attorney, Agent, or Firm* — Rabin & Berdo, P.C.

(57) ABSTRACT

A leaning vehicle having a linkage mechanism supported by a linkage support part. The linkage mechanism includes left and right side members and a lower cross member. The lower cross member has a front cross part, a rear cross part, a coupling part coupling the front and rear cross parts, and a foreign-matter-entering-suppression part. The left and right side members are respectively rotatable about left and right axes extending in a front-rear direction of a vehicle body frame. The front and rear cross parts are rotatable about an intermediate axis parallel to the left and right axes. The foreign-matter-entering-suppression part fills a gap between the linkage support part, or the left or right side member, and the coupling part. The coupling part has a recess configured to accommodate the foreign-matter-entering-suppression part when the front and rear cross parts rotate with respect to the linkage support part.

11 Claims, 25 Drawing Sheets

(51) Int. Cl.
   *B62K 5/05* (2013.01)
   *B62K 21/18* (2006.01)
   *B62K 25/00* (2006.01)
   *B62J 25/04* (2020.01)

(58) Field of Classification Search
   USPC .................................................. 280/62
   See application file for complete search history.

(56) References Cited

U.S. PATENT DOCUMENTS

| | | | |
|---|---|---|---|
| 8,070,172 B1* | 12/2011 | Smith | B62K 5/05 |
| | | | 280/124.135 |
| 9,744,952 B2 | 8/2017 | Seto et al. | |
| 9,873,474 B2* | 1/2018 | Ohno | B62K 21/18 |
| 2010/0044977 A1 | 2/2010 | Hughes | |
| 2012/0181765 A1* | 7/2012 | Hill | B62K 5/10 |
| | | | 903/902 |
| 2014/0375015 A1 | 12/2014 | Yu | |
| 2015/0246704 A1 | 9/2015 | Takano et al. | |
| 2016/0318581 A1 | 11/2016 | Kim et al. | |
| 2017/0088222 A1 | 3/2017 | Ohno et al. | |
| 2017/0144719 A1* | 5/2017 | Terada | B62K 5/05 |
| 2017/0210440 A1 | 7/2017 | Dragomir | |
| 2018/0178870 A1 | 6/2018 | Takeshita et al. | |
| 2018/0264906 A1* | 9/2018 | Hara | B62K 5/027 |
| 2018/0265117 A1* | 9/2018 | Hara | B62J 45/412 |
| 2018/0281543 A1 | 10/2018 | Mori | |
| 2019/0047550 A1* | 2/2019 | Miki | B62K 5/10 |
| 2019/0118894 A1* | 4/2019 | Hirakawa | B62K 21/12 |
| 2019/0210683 A1 | 7/2019 | Lin | |
| 2022/0204112 A1 | 6/2022 | Sun et al. | |
| 2022/0306233 A1 | 9/2022 | Chee | |

FOREIGN PATENT DOCUMENTS

| | | |
|---|---|---|
| CN | 108502077 A | 9/2018 |
| EP | 2998209 A1 | 3/2016 |
| EP | 3150476 A1 | 4/2017 |
| EP | 3153392 A1 | 4/2017 |
| EP | 3184409 A2 | 6/2017 |
| EP | 3871966 A4 | 12/2021 |
| JP | S5948282 A | 3/1984 |
| JP | S59179466 A | 10/1984 |
| JP | 2006256401 A | 9/2006 |
| JP | 2007159776 A | 6/2007 |
| JP | 2015120360 A | 7/2015 |
| JP | 2016060470 A | 4/2016 |
| JP | 2016060471 A | 4/2016 |
| JP | 2017065527 A | 4/2017 |
| JP | 2017094906 A | 6/2017 |
| JP | 2017165147 A | 9/2017 |
| JP | 2018030516 A | 3/2018 |
| TW | 201834911 A | 10/2018 |
| WO | 2006075278 A1 | 8/2005 |
| WO | 2009059099 A2 | 5/2009 |
| WO | 2014046282 A1 | 3/2014 |
| WO | 2017086351 A1 | 5/2017 |
| WO | 2017208992 A1 | 12/2017 |
| WO | 2018211973 A1 | 11/2018 |
| WO | 2020111261 A1 | 6/2020 |

* cited by examiner

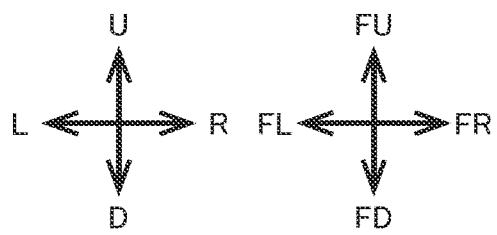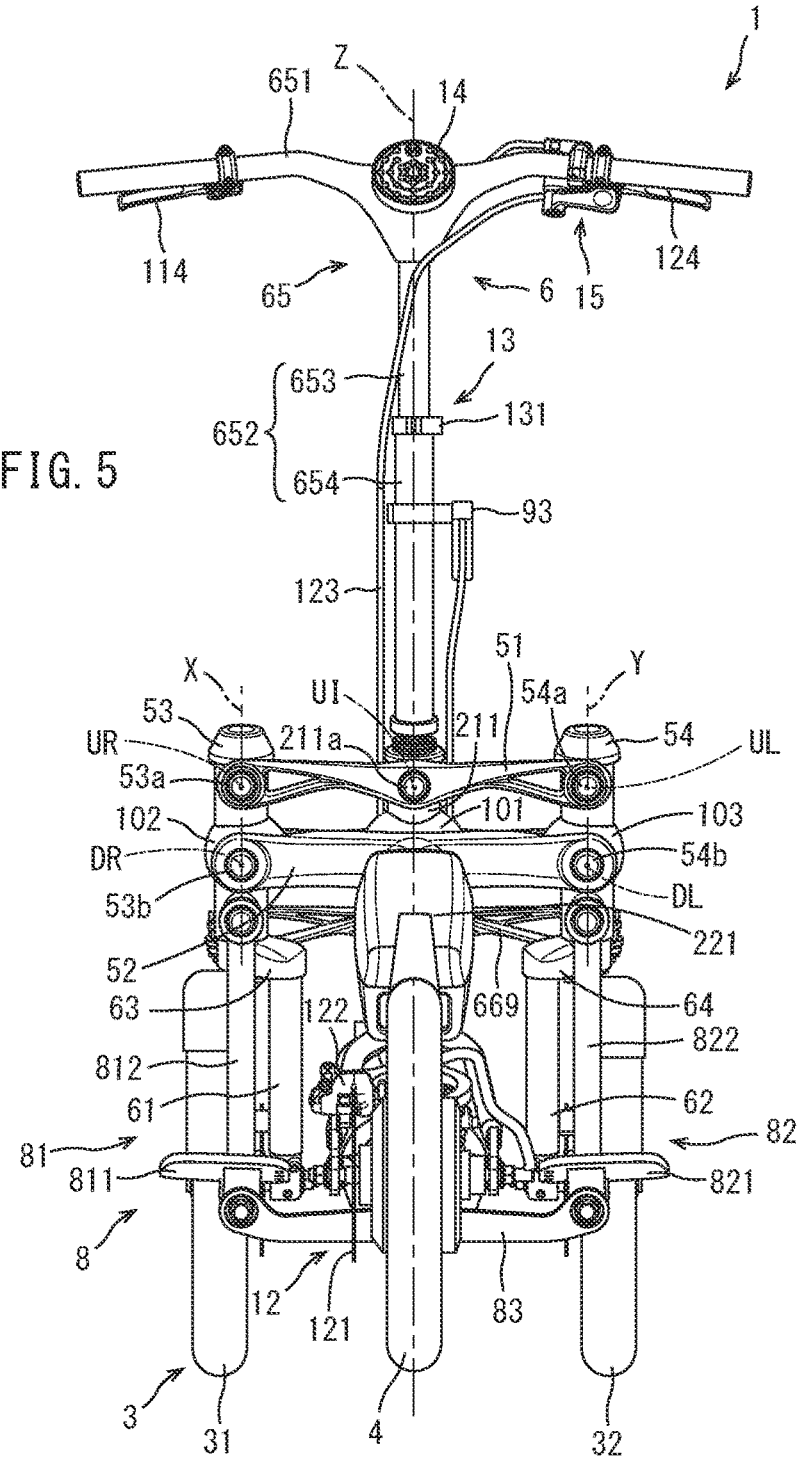
FIG. 5

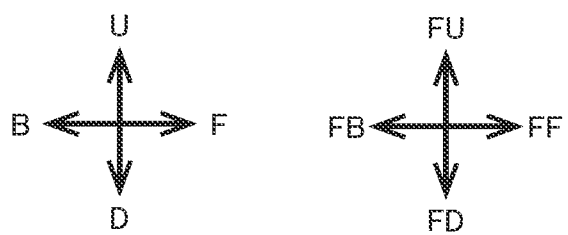
FIG. 9
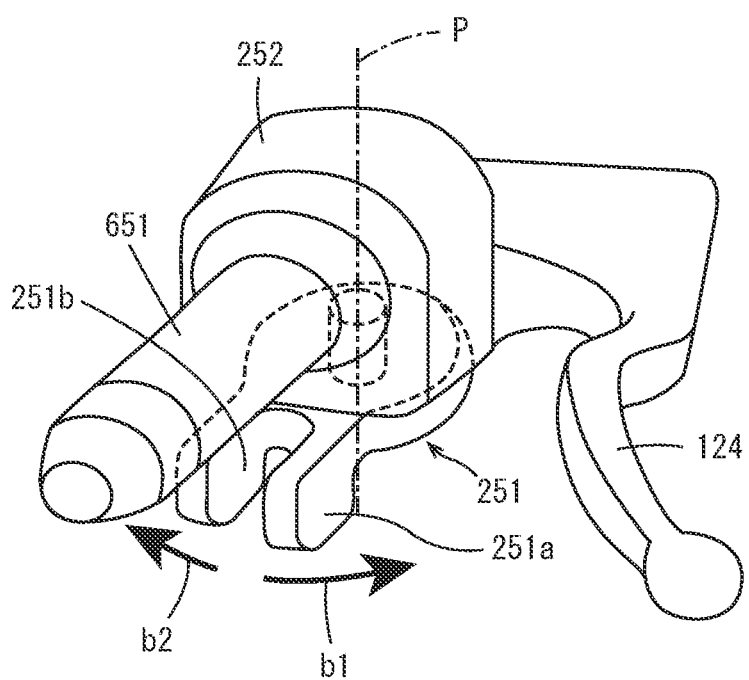

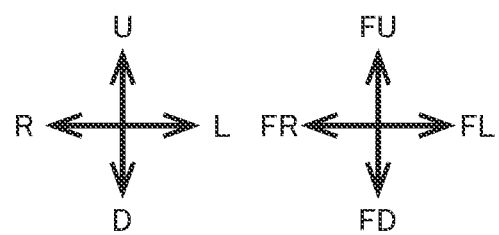
FIG. 16
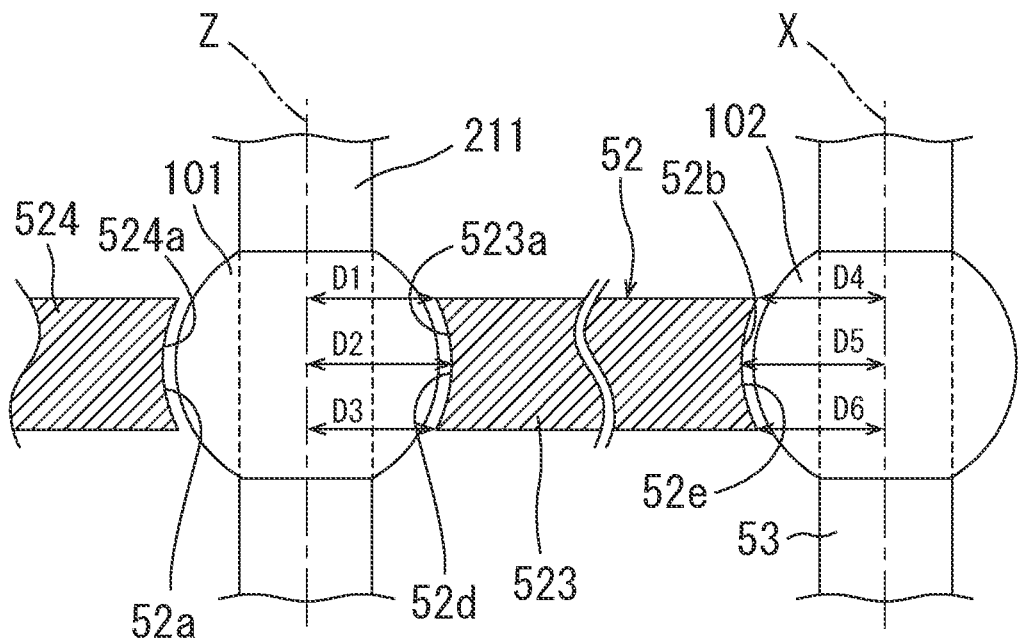
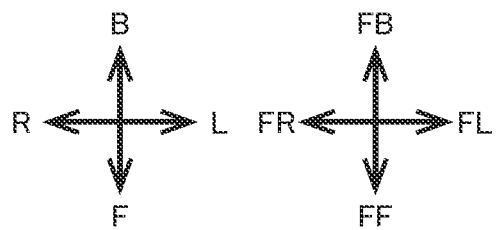
FIG. 17
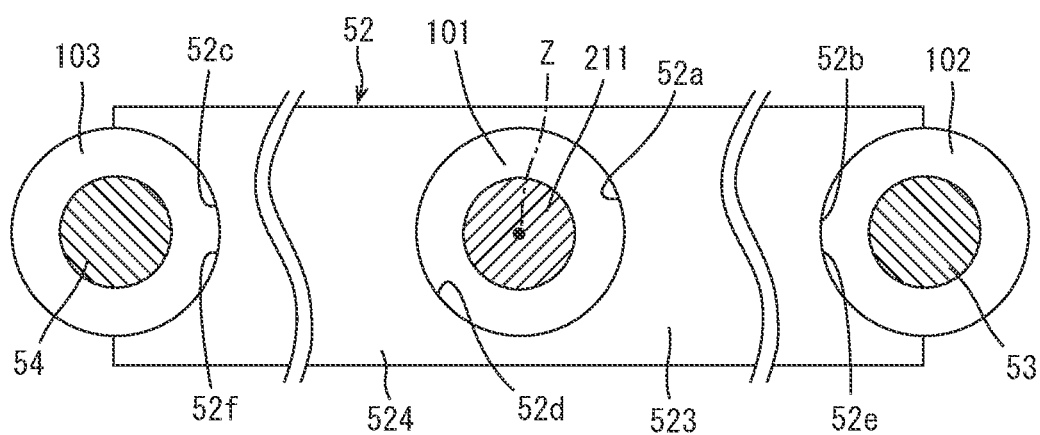

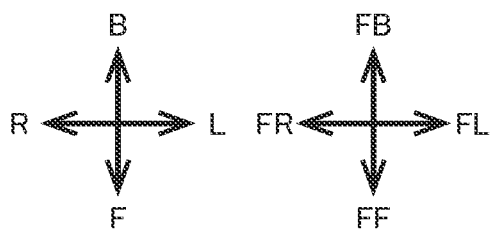
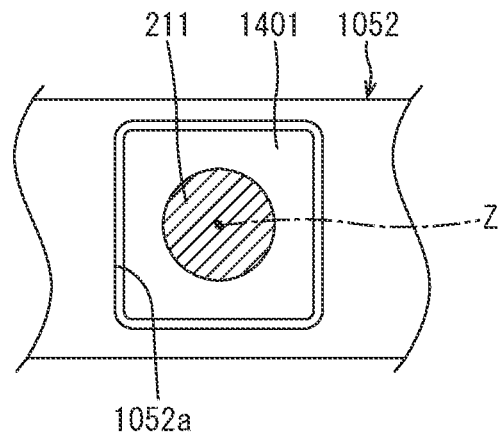
FIG. 22
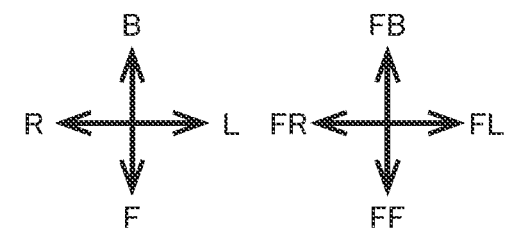
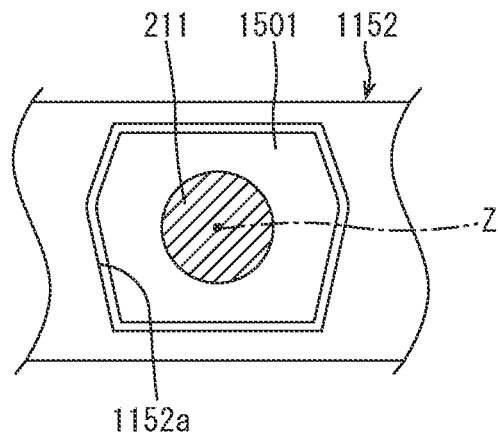
FIG. 23

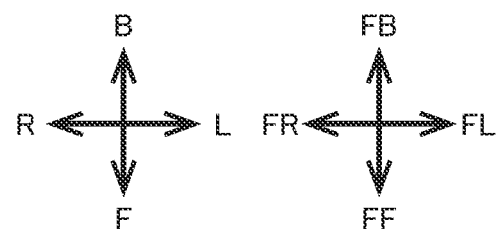
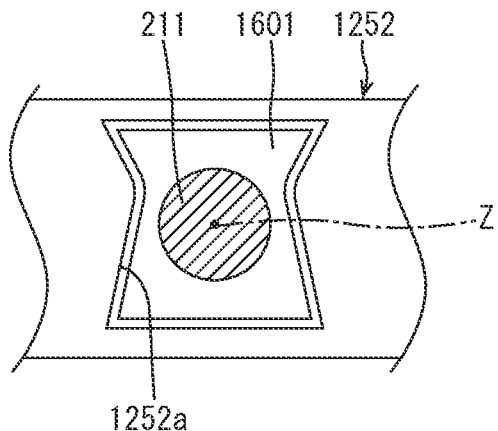
FIG. 24
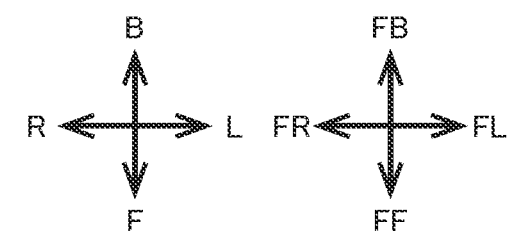
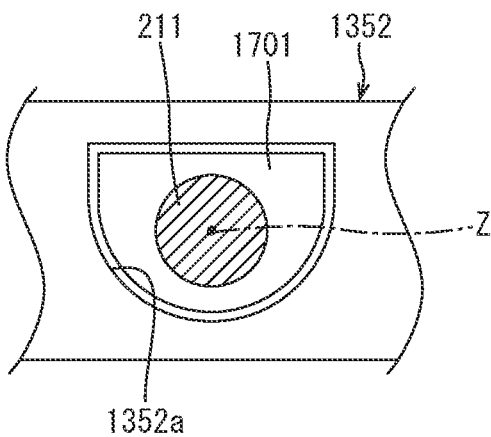
FIG. 25

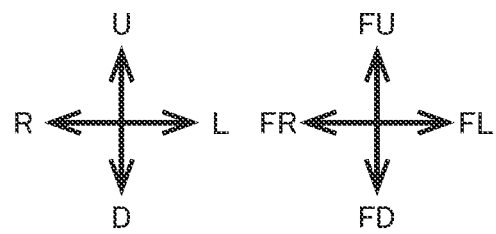
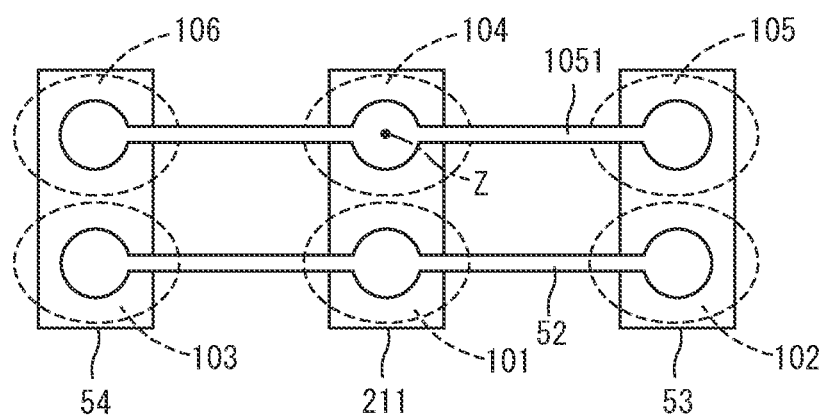
FIG. 30
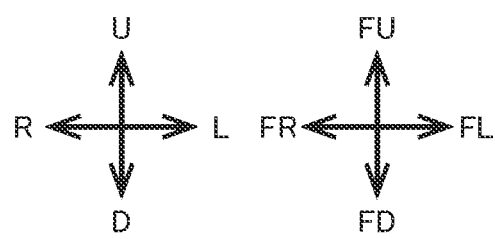
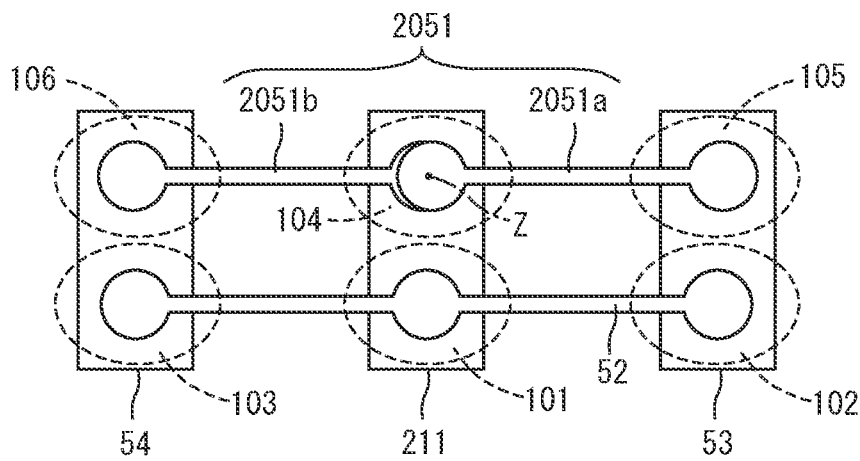
FIG. 31

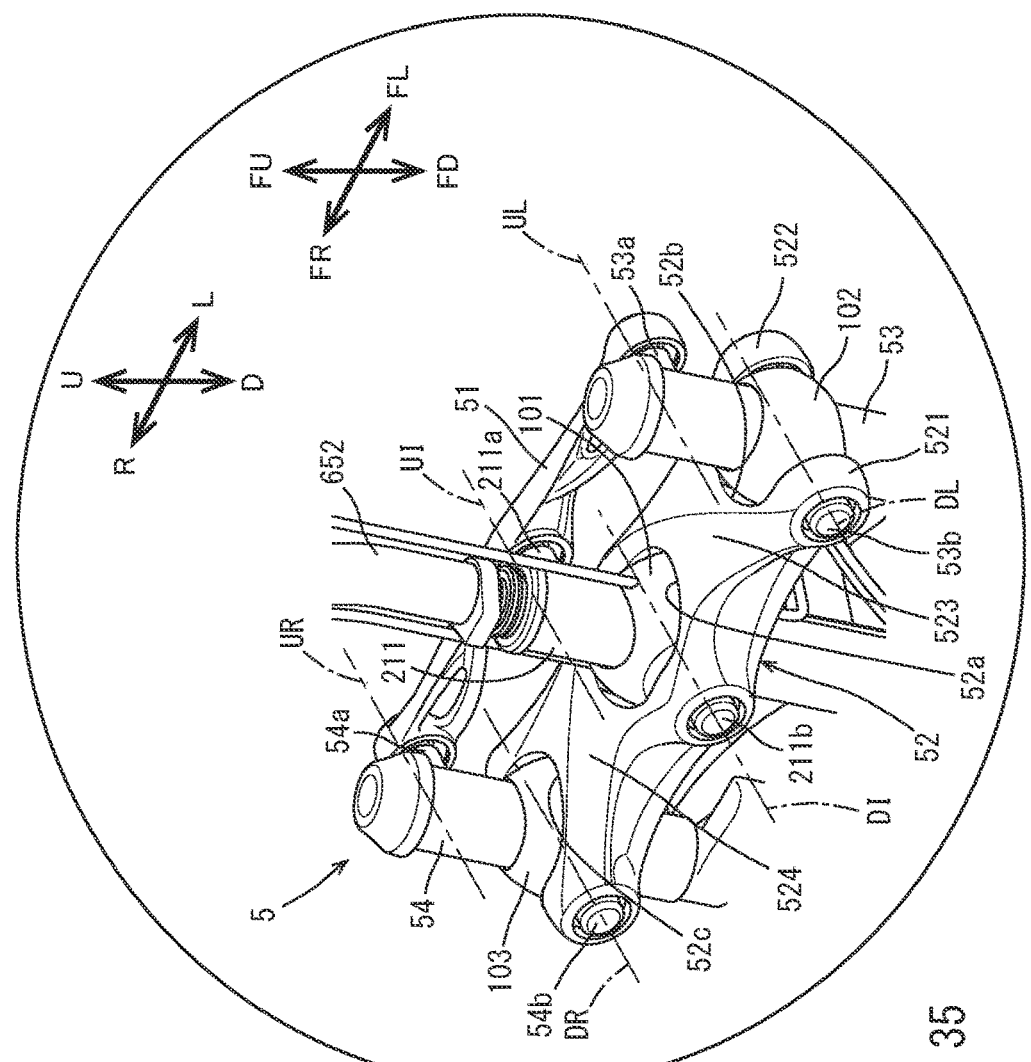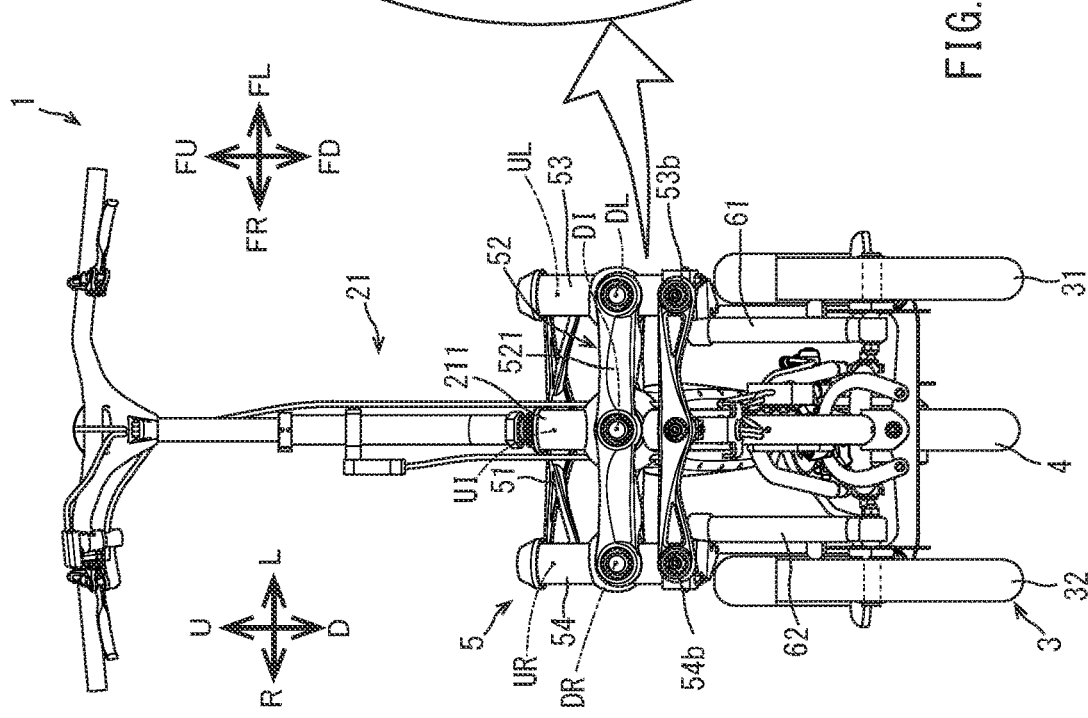
FIG. 35

LEANING VEHICLE

CROSS REFERENCE TO RELATED APPLICATIONS

This is a continuation-in-part application of international application PCT/JP2019/046865, filed on Nov. 29, 2019, which claims priority from a Japanese patent application no. 2018-224260 filed on Nov. 29, 2018, the contents of which are incorporated herein by reference.

The present application is related to two co-pending applications, which are filed on the same date as the present application, and are continuation-in-part applications of international applications PCT/JP2019/046866 and PCT/JP2019/046877, both filed on Nov. 29, 2019, respectively.

TECHNICAL FIELD

The present teaching relates to a leaning vehicle.

BACKGROUND ART

There has been known a vehicle including a vehicle body frame, left and right front wheels disposed at the left and the right, respectively, when the vehicle is seen from the front, and a linkage mechanism. As such a vehicle, Patent Document 1, for example, discloses a vehicle including a vehicle body frame, left and right front wheels, and a linkage mechanism disposed above the left and right front wheels and configured to change relative positions of the left and right front wheels relative to the vehicle body frame to cause the vehicle body frame to lean leftward or rightward of the vehicle. In the vehicle disclosed in Patent Document 1, the linkage mechanism includes an upper cross member, a lower cross member, a left side member, and a right side member.

The vehicle disclosed in Patent Document 1 includes a front cover covering at least a part of the linkage mechanism.

CITATION LIST

Patent Document

Patent Document 1: Japanese Patent Application Publication No. 2017-65527

SUMMARY OF INVENTION

Technical Problem

As disclosed in Patent Document 1 above, the linkage mechanism is covered with the front cover so that entering of foreign matter into a movable range of the linkage mechanism can be suppressed. However, when the linkage mechanism is covered with the front cover, a front portion of the leaning vehicle increases in size and the degree of design flexibility of the front portion decreases.

To increase the degree of design flexibility of the front portion of the leaning vehicle, it is conceivable to reduce the size of the cover covering the linkage mechanism or to omit the cover. Such reduction of size of the cover or omission of the cover covering the linkage mechanism requires a technique of suppressing entering of foreign matter into the linkage mechanism. That is, to increase the degree of design flexibility of the front portion of the leaning vehicle, a technique of suppressing entering of foreign matter into the linkage mechanism is important.

The present teaching provides a leaning vehicle capable of increasing the degree of design flexibility of a vehicle front portion by suppressing entering of foreign matter into a linkage mechanism.

Solution to the Problem

The inventors of the present teaching have studied a leaning vehicle capable of increasing the degree of design flexibility of a vehicle front portion by suppressing entering of foreign matter into a linkage mechanism.

Through an intensive study, the inventors of the present teaching have reached the configuration below.

A leaning vehicle according to one embodiment of the present teaching is a leaning vehicle configured to lean leftward when turning left and lean rightward when turning right. This leaning vehicle includes: a vehicle body frame including a linkage support part extending in a top-bottom direction thereof; a left front wheel disposed left of the vehicle body frame in a left-right direction of the vehicle body frame; a right front wheel disposed right of the vehicle body frame in the left-right direction of the vehicle body frame; a left suspension part having an upper portion and a lower portion, the lower portion thereof supporting the left front wheel; a right suspension part having an upper portion and a lower portion, the lower portion thereof supporting the right front wheel; a linkage mechanism supported by the linkage support part, the linkage mechanism including a left side member coupled to the upper portion of the left suspension part, such that the upper portion of the left suspension part is rotatable about a left steering axis, the left steering axis extending in the top-bottom direction of the vehicle body frame, a right side member coupled to the upper portion of the right suspension part, such that the upper portion of the right suspension part is rotatable about a right steering axis, the right steering axis being parallel to the left steering axis, and a lower cross member, having a front cross part located, in a front-rear direction of the vehicle body frame, in front of the linkage support part, the front cross part having a left end portion and a right end portion, a rear cross part located, in the front-rear direction of the vehicle body frame, behind the front cross part and the linkage support part, the rear cross part having a left end portion and a right end portion, and a coupling part coupling the front cross part and the rear cross part to each other in the front-rear direction of the vehicle body frame in at least one of a location between the left side member and the linkage support part, or a location between the right side member and the linkage support part, wherein the left side member is coupled to the left end portion of the front cross part and the left end portion of the rear cross part, such that the left side member is rotatable about a left axis extending in the front-rear direction of the vehicle body frame, the right side member is coupled to the right end portion of the front cross part and the right end portion of the rear cross part, such that the right side member is rotatable about a right axis parallel to the left axis, and both the front cross part and the rear cross part are supported by the linkage support part, such that the front cross part and the rear cross part are rotatable about an intermediate axis parallel to the left axis and the right axis; and a foreign-matter-entering-suppression part filling a gap that is between the linkage support part and the coupling part, between the left side member and the coupling part, or between the right side member and the coupling part, to thereby prevent foreign matter from entering the gap. The coupling part has a recess configured to accommodate the foreign-matter-entering-suppression part when the front cross part and the rear cross part rotate with respect to the linkage support part.

Even in a case where the linkage mechanism is exposed, the foreign-matter-entering-suppression part can suppress entering of foreign matter into at least one gap in the gap between the vehicle body frame supporting the linkage mechanism and the coupling part coupling the front cross part and the rear cross part to each other in the front-rear direction in the linkage mechanism, and the gap between the left side member of the linkage mechanism and the coupling part, and the gap between the right side member of the linkage mechanism and the coupling part.

With the configuration described above, the coupling part has the recess for preventing interference with the foreign-matter-entering-suppression part when the front cross part and the rear cross part rotate with respect to the linkage support part. This can prevent interference between the foreign-matter-entering-suppression part and the coupling part.

Thus, by suppressing entering of foreign matter into the linkage mechanism, the degree of design flexibility of the front portion of the leaning vehicle can be increased.

In another aspect, the leaning vehicle preferably has the following configuration. The foreign-matter-entering-suppression part is a spacer at least partially located in the gap. This spacer can suppress entering of foreign matter into the linkage mechanism. Thus, the degree of design flexibility of the front portion of the leaning vehicle can be increased.

In another aspect, the leaning vehicle preferably has the following configuration. The spacer is disposed in the gap and is free of contact with the recess. This further ensures prevention of interference between the spacer and the coupling part. Thus, by suppressing entering of foreign matter into the linkage mechanism, the degree of design flexibility of the front portion of the leaning vehicle can be increased.

In another aspect, the leaning vehicle preferably has the following configuration. The coupling part has a lower portion and an upper portion, respectively below and above a center of the coupling part, in the top-bottom direction of the vehicle body frame, and in a cross sectional view of the linkage mechanism passing the left steering axis and the right steering axis, a distance, in the left-right direction of the vehicle body frame, between the intermediate axis and the upper portion or the lower portion of the coupling part, is smaller than a distance between the intermediate axis and the center of the coupling part.

Accordingly, when the coupling part is seen in a cross section including the left steering axis and the right steering axis, rigidity of the coupling part can be enhanced by the upper portion and the lower portion of the coupling part. In addition, with the configuration described above, it is possible to suppress entering of foreign matter into the gap in which the spacer is provided while preventing interference between the spacer and the coupling parts.

Thus, it is possible to suppress entering of foreign matter into the gap in which the spacer is provided while maintaining rigidity of the linkage mechanism.

In another aspect, the leaning vehicle preferably has the following configuration. The leaning vehicle further includes an upper cross part located above the front cross part or the rear cross part in the top-bottom direction of the vehicle body frame, the upper cross part being located, in the front-rear direction of the vehicle body frame, in front of or behind the linkage support part, the left side member and the right side member, the upper cross part having a left end portion coupled to the left side member such that the left side member is rotatable about an upper left axis extending in the front-rear direction of the vehicle body frame, and a right end portion coupled to the right side member such that the right side member is rotatable about an upper right axis parallel to the upper left axis, the upper cross part being supported by the linkage support part such that the upper cross part is rotatable about an upper intermediate axis parallel to the upper left axis and the upper right axis.

Accordingly, since the upper cross part is located in front of or behind the linkage support part, the left side member and the right side member, even when the spherical spacer is disposed between the front cross part and the rear cross part, interference of the spacer with the upper cross part can be suppressed. Thus, an increase in size of the front portion of leaning vehicle can be prevented.

In another aspect, the leaning vehicle preferably has the following configuration. At least one of the front cross part or the rear cross part is rotatably supported by the linkage support part with a bearing. Accordingly, the linkage mechanism is allowed to have a compact configuration.

In another aspect, the leaning vehicle preferably has the following configuration. A part of the spacer is located in the gap in a state where each of the front cross part and the rear cross part extend in parallel.

Accordingly, even in a case where the front cross part and the rear cross part rotate with respect to the vehicle body frame, a gap hardly occurs between the spacer and the vehicle body frame or between the spacer and the linkage mechanism.

In another aspect, the leaning vehicle preferably has the following configuration. The spacer is located in a narrowest portion of the gap when the front cross part and the rear cross part lean with respect to the vehicle body frame to a maximum.

Accordingly, even in the case where the front cross part and the rear cross part lean to a maximum with respect to the vehicle body frame, the spacer further ensures suppression of entering of foreign matter into the narrowest gap in the gap between the vehicle body frame and the coupling part, the gap between the left side member and the coupling part, and the gap between the right side member and the coupling part.

In another aspect, the leaning vehicle preferably has the following configuration. The spacer projects upward from the gap.

Accordingly, the spacer further ensures suppression of entering of foreign matter into at least one of the gap between the vehicle body frame and the coupling part, the gap between the left side member and the coupling part, or the gap between the right side member and the coupling part.

In another aspect, the leaning vehicle preferably has the following configuration. A part of the spacer facing the coupling part has a curved outer surface in a sectional view of the linkage mechanism passing the left steering axis and the right steering axis.

Accordingly, the spacer further ensures suppression of entering of foreign matter into at least one of the gap between the vehicle body frame and the coupling part, the gap between the left side member and the coupling part, or the gap between the right side member and the coupling part.

In another aspect, the leaning vehicle preferably has the following configuration. The spacer is formed integrally with the linkage support part, the left side member, or the right side member.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An embodiment of a leaning vehicle according to the present teaching will be herein described.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Leaning Vehicle]

A leaning vehicle herein is a vehicle that turns in a leaning posture. Specifically, the leaning vehicle is a vehicle that leans leftward when turning to the left and leans rightward when turning to the right. The leaning vehicle may be a single-passenger vehicle or a vehicle on which a plurality of passengers can ride. The leaning vehicle includes all the types of vehicles that turn in leaning postures, such as three-wheeled vehicles and four-wheeled vehicles as well as two-wheeled vehicles.

[Maximum Leaning of Front Cross Part and Rear Cross Part with Respect to Vehicle Body Frame]

A state where a front cross part and a rear cross part lean to the maximum with respect to a vehicle body frame herein refers to a state where the front cross part and the rear cross part lean leftward or rightward to maximum with respect to the vehicle body frame in a range where the front cross part and the rear cross part are capable of leaning leftward or rightward with respect to the vehicle body frame.

[Foreign Matter]

Examples of "foreign matter" herein includes pebbles, tree branches, insects, and tools used for maintenance. The foreign matter refers to a substance that has entered at least one of a gap between a linkage support part and a coupling part, a gap between a left side member and the coupling part, and a gap between a right side member and the coupling part to thereby hinder movement of a linkage mechanism.

Advantageous Effects of Invention

According to one embodiment of the present teaching, it is possible to provide a leaning vehicle capable of increasing the degree of design flexibility of a vehicle front portion by suppressing entering of foreign matter into a linkage mechanism.

BRIEF DESCRIPTION OF DRAWINGS

FIG. 5 is a rear view when the leaning vehicle is seen from the rear.

FIG. 9 is a view of a throttle device having another configuration when seen from the right of the vehicle body frame.

FIG. 16 is a view illustrating a peripheral configuration of the first spacer and the second spacer in FIG. 15.

FIG. 17 is a top view illustrating a schematic configuration of the first spacer, the second spacer, and the third spacer when seen from above the vehicle body frame in a direction in which an intermediate steering axis extends.

FIG. 22 is a view corresponding to FIG. 17 and illustrating a first spacer according to another embodiment.

FIG. 23 is a view corresponding to FIG. 17 and illustrating a first spacer according to another embodiment.

FIG. 24 is a view corresponding to FIG. 17 and illustrating a first spacer according to another embodiment.

FIG. 25 is a view corresponding to FIG. 17 and illustrating a first spacer according to another embodiment.

FIG. 30 is a view schematically illustrating a configuration of a linkage mechanism according to another embodiment.

FIG. 31 is a view corresponding to FIG. 30 and illustrating a configuration of a linkage mechanism according to another embodiment.

FIG. 35 is a front view of a leaning vehicle when seen from the front, and an enlarged perspective view of a linkage mechanism.

DESCRIPTION OF EMBODIMENT

Figure 1:
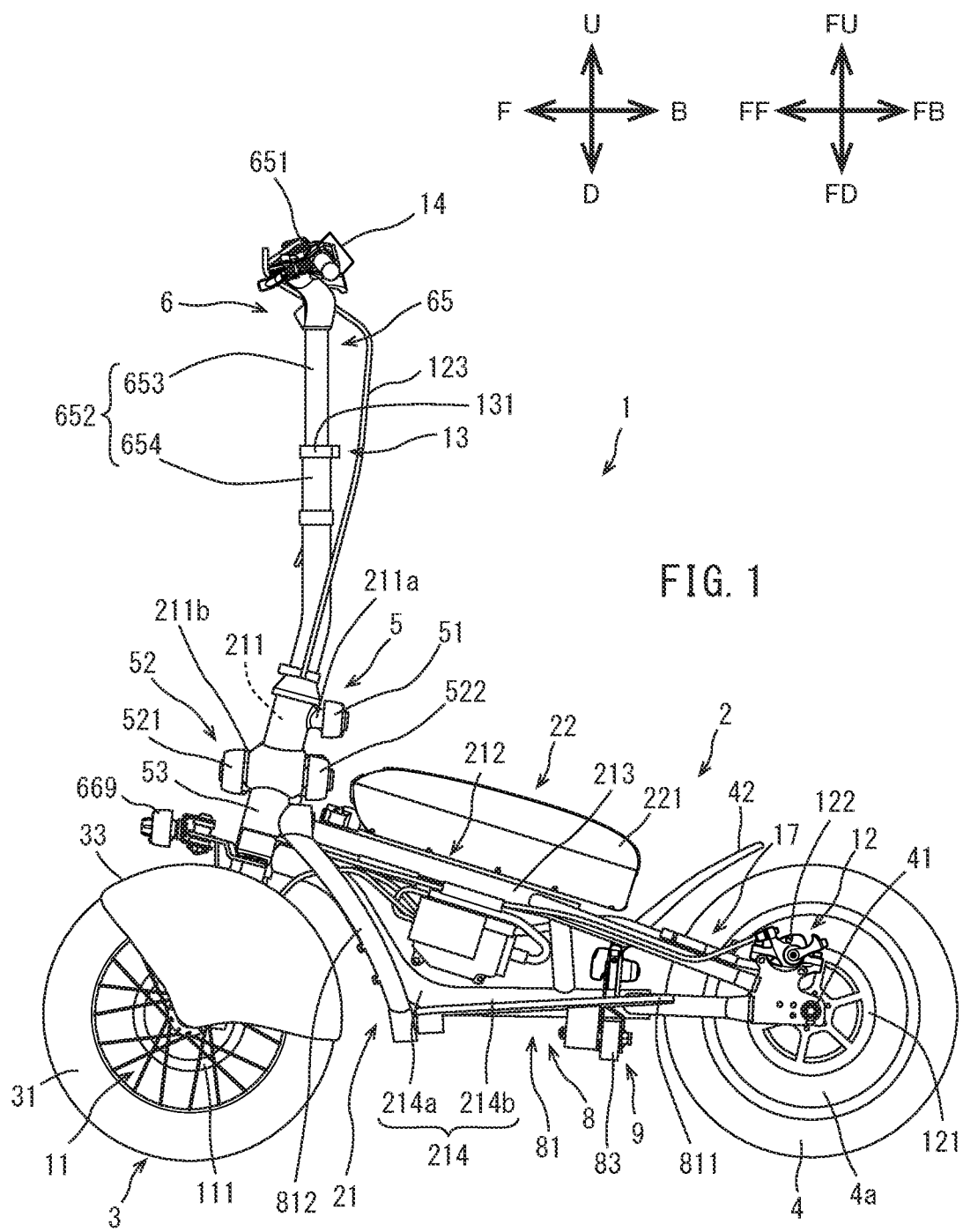
FIG. 1 is a left side view schematically illustrating an overall configuration of a leaning vehicle according to an embodiment.

An embodiment will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components.

In the following description, arrow F in the drawings represents a forward direction of a leaning vehicle 1. Arrow B in the drawings represents a rearward direction of the leaning vehicle 1. Arrow U in the drawings represents an upward direction of the leaning vehicle 1. Arrow D in the drawings represents a downward direction of the leaning vehicle 1. Arrow R in the drawings represents a rightward direction of the leaning vehicle 1. Arrow L in the drawings represents a leftward direction of the leaning vehicle 1. A front-rear direction, a left-right direction, and a top-bottom direction of the leaning vehicle 1 refer to a front-rear direction, a left-right direction, and a top-bottom direction, respectively, with respect to the leaning vehicle 1 when seen from a driver of the leaning vehicle 1.

The leaning vehicle 1 according to this embodiment turns with a vehicle body frame leaning leftward or rightward with respect to a vertical direction. Thus, in addition to the directions with respect to the vehicle, directions with respect to the vehicle body frame are defined as follows. Arrow FF in the drawings represents a forward direction of the vehicle body frame. Arrow FB in the drawings represents a rearward direction of the vehicle body frame. Arrow FU in the drawings represents an upward direction of the vehicle body frame. Arrow FD in the drawings represents a downward direction of the vehicle body frame. Arrow FR in the drawings represents a rightward direction of the vehicle body frame. Arrow FL in the drawings represents a leftward direction of the vehicle body frame. A front-rear direction, a left-right direction, and a top-bottom direction of the vehicle body frame refer to a front-rear direction, a left-right direction, and a top-bottom direction, respectively, with respect to the vehicle body frame when seen from a driver of the leaning vehicle 1.

(Overall Configuration)

FIG. 1 is a left side view schematically illustrating an overall configuration of the leaning vehicle 1 according to the embodiment. FIG. 1 is a left side view illustrating a state where a vehicle body cover is detached from the leaning vehicle 1. The leaning vehicle 1 includes a vehicle body 2, a pair of left and right front wheels 3, a rear wheel 4, a linkage mechanism 5, a steering mechanism 6, a load transfer mechanism 8, a restriction mechanism 9, a front-wheel-braking mechanism 11, a rear-wheel-braking mechanism 12, an extension/contraction adjusting mechanism 13, a meter 14, a throttle device 15 (see FIG. 2), an interlocking mechanism 16 (see FIG. 13), and a lock mechanism 17. That is, the leaning vehicle 1 in this embodiment is a three-wheeled vehicle including the pair of left and right front wheels 3. The leaning vehicle 1 is a vehicle that leans leftward when turning to the left and leans rightward when turning to the right.

The vehicle body 2 includes a vehicle body frame 21 and a power unit 22. In FIG. 1, the vehicle body frame 21 is in an upright state. In the case of referring to FIG. 1, the following description is based on a premise that the vehicle body frame 21 is in the upright state. The upright state of the vehicle body frame 21 refers to a state where the top-bottom direction of the vehicle body frame 21 coincides with the vertical direction.

The vehicle body frame 21 supports the power unit 22, for example. The vehicle body frame 21 includes a head pipe 211 (linkage support part) and a main frame 212.

The head pipe 211 is located in a front portion of the leaning vehicle 1. When the leaning vehicle 1 is seen from the left, an upper portion of the head pipe 211 is located at the rear of a lower portion of the head pipe 211 in the front-rear direction of the vehicle body frame 21. The linkage mechanism 5 is disposed around the head pipe 211. A steering shaft 652 described later is rotatably inserted in the head pipe 211.

The main frame 212 is connected to the head pipe 211. The main frame 212 is located at the rear of the head pipe 211 in the front-rear direction of the vehicle body frame 21. The main frame 212 supports the power unit 22. A rear end portion of the main frame 212 supports the rear wheel 4 such that the rear wheel 4 is rotatable about a wheel shaft 41.

The main frame 212 includes an upper frame 213 and an under frame 214.

When the vehicle body frame 21 is seen from the left, the upper frame 213 extends rearward in the front-rear direction of the vehicle body frame 21 and downward in the top-bottom direction of the vehicle body frame 21 from the head pipe 211 toward the rear wheel 4. A rear end portion of the upper frame 213 supports the rear wheel 4 together with an under frame rear portion 214b described later. The power unit 22 is supported by the upper frame 213.

The under frame 214 includes an under frame front portion 214a and the under frame rear portion 214b. When the vehicle body frame 21 is seen from the left, the under frame front portion 214a extends from the head pipe 211 rearward in the front-rear direction of the vehicle body frame 21 and downward in the top-bottom direction of the vehicle body frame 21. A front end portion of the under frame front portion 214a is connected to the head pipe 211. The under frame rear portion 214b extends rearward from a rear end portion of the under frame front portion 214a in the front-rear direction of the vehicle body frame 21. A rear end portion of the under frame rear portion 214b supports the rear wheel 4 together with the upper frame 213.

As described above, since the main frame 212 includes the upper frame 213 and the under frame 214, strength and rigidity of the main frame 212 can be increased. In the case of further reducing the height of the main frame in the top-bottom direction of the vehicle body frame, the main frame may include only the under frame.

Figure 2:
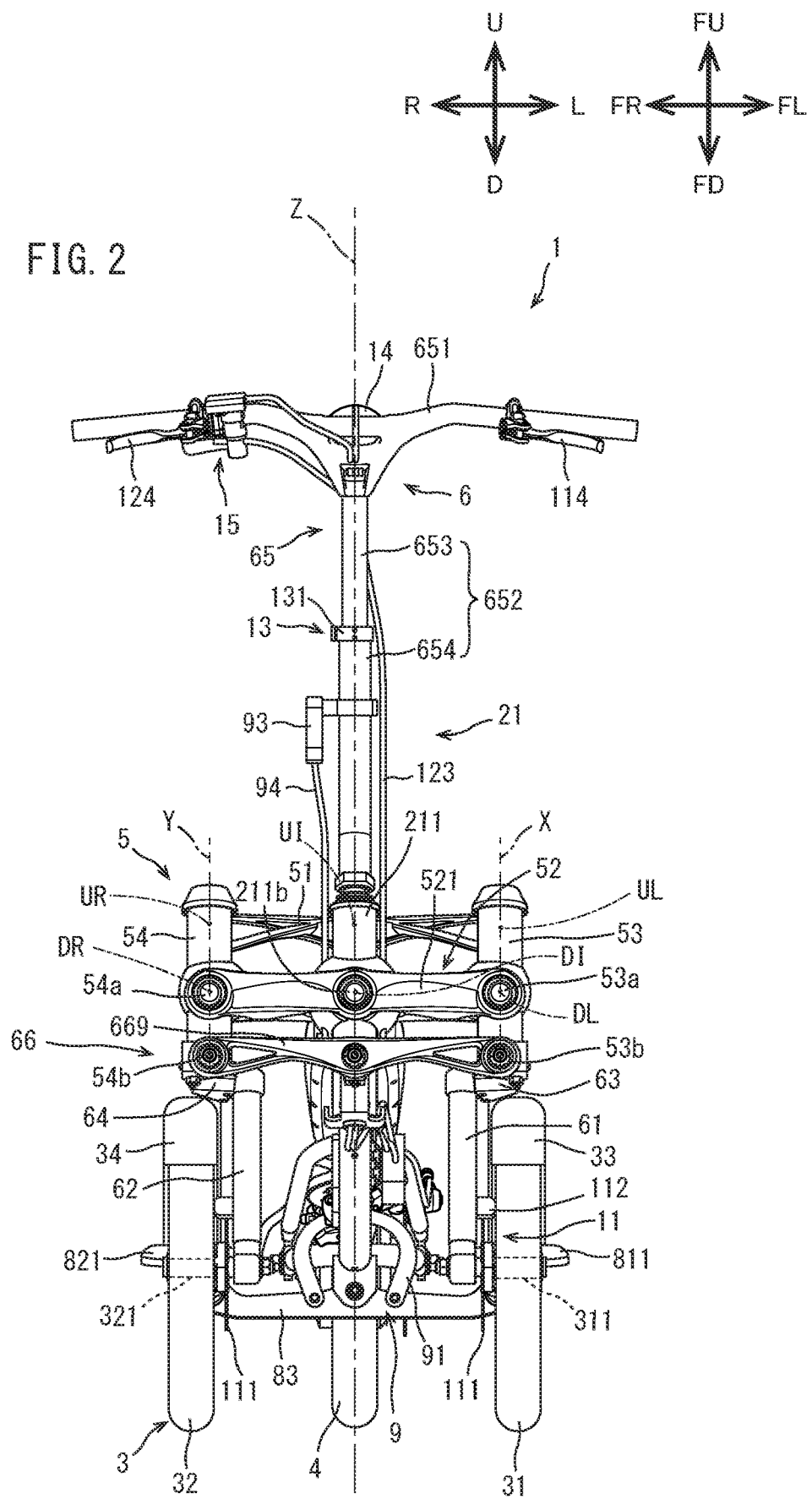
FIG. 2 is a front view illustrating a configuration of a vehicle front portion when the leaning vehicle is seen from the front.

FIG. 2 is a front view of a front portion of the leaning vehicle 1 when seen from the front. FIG. 2 is a front view illustrating a state where the vehicle body cover is detached from the leaning vehicle 1. In FIG. 2, the vehicle body frame 21 is in an upright state. In the case of referring to FIG. 2, the following description is based on a premise that the vehicle body frame 21 is in the upright state.

As illustrated in FIGS. 1 and 2, the pair of left and right front wheels 3 is located below the head pipe 211 and the linkage mechanism 5 in the top-bottom direction of the vehicle body frame 21. As illustrated in FIG. 2, the pair of left and right front wheels 3 is supported by a left suspension part 61 and a right suspension part 62 described later.

A braking force is applied to each of the pair of left and right front wheels 3 by the front-wheel-braking mechanism 11. As illustrated in FIG. 2, the front-wheel-braking mechanism 11 includes front-wheel-brake discs 111, front-wheel-brake calipers 112, front-wheel-brake hoses (not shown), and a front-wheel-brake lever 114.

The front-wheel-brake discs 111 are disc-shaped members and rotate together with the front wheels 3. The front-wheel-brake calipers 112 are individually attached to the left suspension part 61 and the right suspension part 62. The front-wheel-brake calipers 112 are actuated by changing a hydraulic pressure in the front-wheel-brake hoses. The hydraulic pressure in the front-wheel-brake hoses changes in accordance with an operation of the front-wheel-brake lever 114 provided in a handlebar 651. Thus, in accordance with the operation of the front-wheel-brake lever 114, the front-wheel-brake calipers 112 sandwich the front-wheel-brake discs 111 in the thickness direction and apply a friction force to the front-wheel-brake discs 111.

As described above, the front-wheel-brake calipers 112 provided in the pair of left and right front wheels 3 are driven by the hydraulic pressure. Thus, the direction in which the front-wheel-brake hoses extend with respect to the front-wheel-brake calipers 112 can be freely changed. Accordingly, flexibility of layout of the front-wheel-brake calipers 112 can be obtained.

As illustrated in FIG. 1, the rear wheel 4 is located at the rear of the pair of left and right front wheels 3 in the front-rear direction of the vehicle body frame 21. A braking force is applied to the rear wheel 4 by the rear-wheel-braking mechanism 12.

The rear-wheel-braking mechanism 12 includes a rear-wheel-brake disc 121, a rear-wheel-brake caliper 122, a rear-wheel-brake wire 123, and a rear-wheel-brake lever 124 (see FIG. 2).

The rear-wheel-brake disc 121 is a disc-shaped member and rotates together with the rear wheel 4. The rear-wheel-brake caliper 122 is attached to the rear end portion of the main frame 212. The rear-wheel-brake caliper 122 is actuated since an operation of the rear-wheel-brake lever 124 is transferred to the rear-wheel-brake caliper 122 through the rear-wheel-brake wire 123. Thus, in accordance with the operation of the rear-wheel-brake lever 124, the rear-wheel-brake caliper 122 sandwiches the rear-wheel-brake disc 121 in the thickness direction and applies a friction force to the rear-wheel-brake disc 121.

Figure 3:
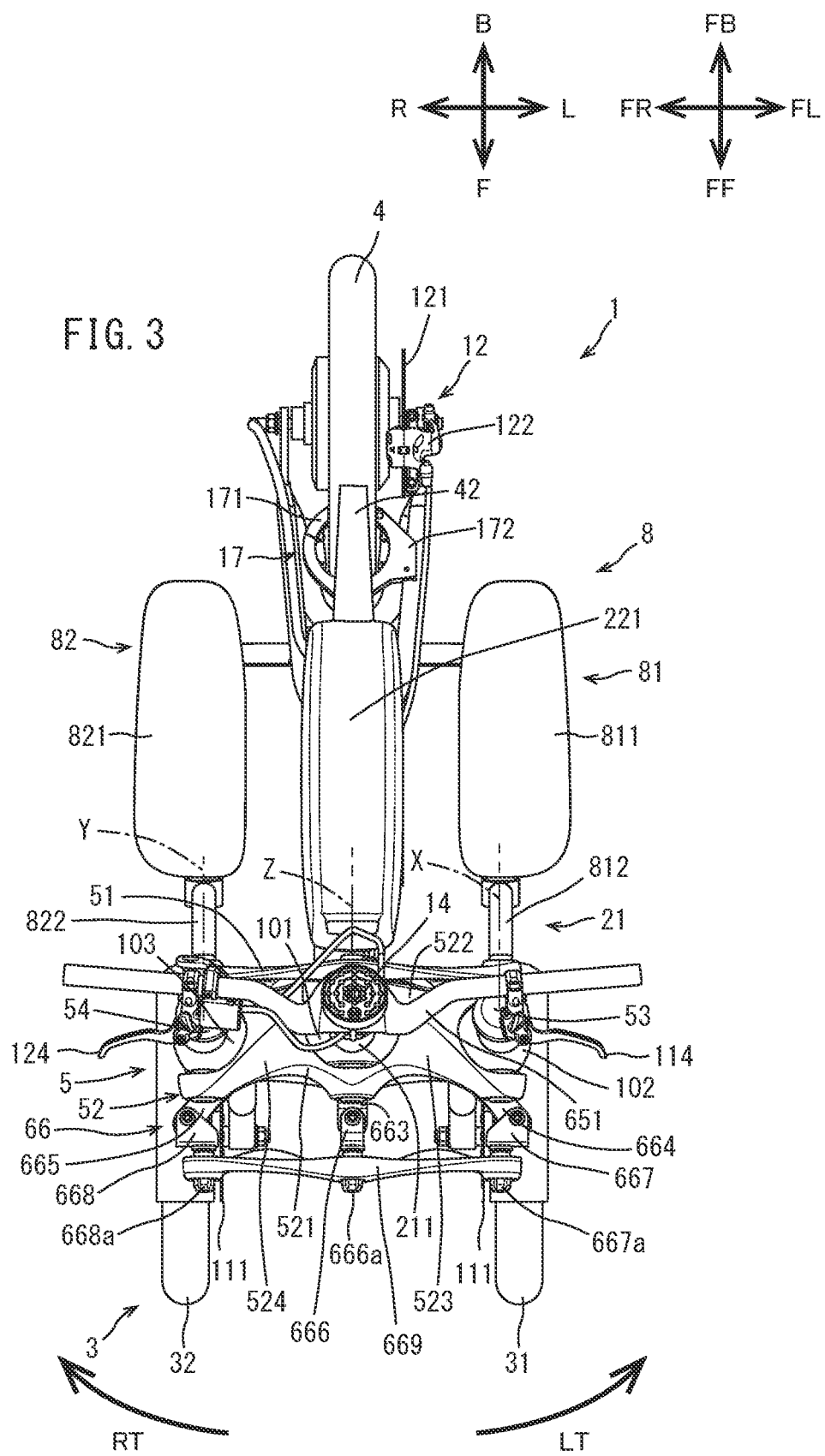
FIG. 3 is a top view when the leaning vehicle is seen from above.

Rotation of the rear wheel 4 is capable of being restricted by the lock mechanism 17. As illustrated in FIG. 3, the lock mechanism 17 includes a ring part 171 through which the rear wheel 4 penetrates in a locked state, and a fixing part 172 to which the ring part 171 is fixed in the locked state while holding the ring part 171 such that the ring part 171 is rotatable in a circumferential direction. That is, the lock mechanism 17 is a so-called ring-type lock mechanism.

In this embodiment, the fixing part 172 restricts movement of the ring part 171 with a solenoid in the locked state. When power is turned on by a power-supply-operation section 142 of the meter 14 described later, the solenoid of the fixing part 172 is driven to thereby unlock the ring part 171. In fixing the ring part 171 by the fixing part 172, the ring part 171 is manually rotated in the circumferential direction to be moved to a fixing position of the fixing part 172.

In the top-bottom direction of the vehicle body frame 21, a rear fender 42 is located above the rear wheel 4. The rear fender 42 is fixed to the main frame 212. The rear fender 42 extends from the main frame 212 rearward in the front-rear direction of the vehicle body frame 21 and upward in the top-bottom direction of the vehicle body frame 21.

The rear fender may be fixed to the wheel shaft 41 by a strut. The rear fender may be fixed to the main frame 212 by a strut. The rear fender may be fixed to both the wheel shaft 41 and the main frame 212. The rear fender may be divided into a front portion and a rear portion in the front-rear direction of the vehicle body frame 21. In this case, the front portion of the rear fender is fixed to, for example, the main frame 212. The rear portion of the rear fender is fixed to, for example, the wheel shaft 41. A taillight may be provided in the rear fender as one unit.

The power unit 22 generates a driving force for causing the leaning vehicle 1 to travel. As illustrated in FIG. 1, the power unit 22 is located at the front of the wheel shaft 41 of the rear wheel 4 in the front-rear direction of the vehicle body frame 21. The power unit 22 is fixed to the vehicle body frame 21. The power unit 22 includes an unillustrated motor and a battery 221. In this embodiment, the motor is disposed in a wheel 4a of the rear wheel 4. Electric power is supplied to the motor from the battery 221 fixed to the upper frame 213 of the vehicle body frame 21.

As illustrated in FIG. 2, the pair of left and right front wheels 3 includes a left front wheel 31 and a right front wheel 32. The left front wheel 31 is located at the left of the head pipe 211 that is a part of the vehicle body frame 21 in the left-right direction of the vehicle body frame 21. The right front wheel 32 is located at the right of the head pipe 211 in the left-right direction of the vehicle body frame 21. That is, the left front wheel 31 and the right front wheel 32 are disposed side by side in the left-right direction of the vehicle body frame 21.

As illustrated in FIG. 2, the left front wheel 31 is connected to the left suspension part 61. Specifically, the left front wheel 31 is connected to a lower portion of the left suspension part 61. The left front wheel 31 is supported by the left suspension part 61 to be rotatable about a left axle 311. The left axle 311 is disposed in the lower portion of the left suspension part 61 and extends in the left-right direction of the vehicle body frame 21.

The right front wheel 32 is connected to the right suspension part 62. Specifically, the right front wheel 32 is connected to a lower portion of the right suspension part 62. The right front wheel 32 is supported by the right suspension part 62 to be rotatable about a right axle 321. The right axle 321 is disposed in the lower portion of the right suspension part 62 and extends in the left-right direction of the vehicle body frame 21.

In the top-bottom direction of the vehicle body frame 21, a left front fender 33 is located above the left front wheel 31. In the top-bottom direction of the vehicle body frame 21, a right front fender 34 is located above the right front wheel 32. The left front fender 33 is fixed to the left axle 311 of the left front wheel 31. The right front fender 34 is fixed to the right axle 321 of the right front wheel 32.

The left front fender may be fixed to the left suspension part 61 described later. The left front fender may be fixed to the left axle 311 or the left suspension part 61 by a strut. The left front fender may be fixed to a left-foot-placing part 811 or a left coupling member 812 in the load transfer mechanism 8 described later. The left front fender may be divided into a front portion and a rear portion in the front-rear direction of the vehicle body frame 21. In this case, the front portion of the left front fender is fixed to, for example, a left bracket 63 of the steering mechanism 6 described later. The rear portion of the left front fender may be fixed to the left-foot-placing part 811 or the left coupling member 812, or may be fixed to the left axle 311 or the left suspension part 61 by a strut.

The right front fender may be fixed to the right suspension part 62 described later. The right front fender may be fixed to the right axle 321 or the right suspension part 62 by a strut. The right front fender may be fixed to a right-foot-placing part 821 or a right coupling member 822 in the load transfer mechanism 8 described later. The right front fender may be divided into a front portion and a rear portion in the front-rear direction of the vehicle body frame 21. In this case, the front portion of the right front fender is fixed to, for example, a right bracket 64 of the steering mechanism 6 described later. The rear portion of the right front fender may be fixed to the right-foot-placing part 821 or the right coupling member 822, or may be fixed to the right axle 321 or the right suspension part 62 by a strut.

Figure 4:
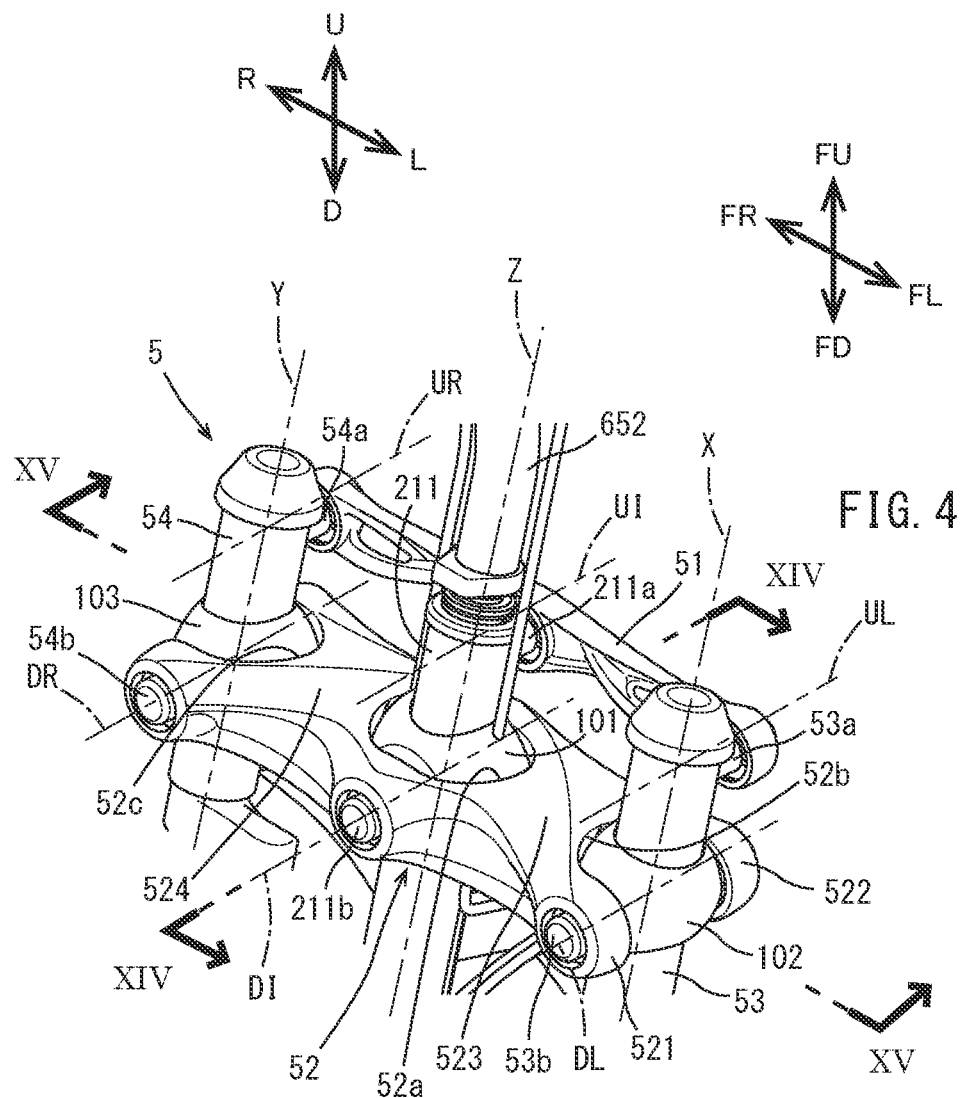
FIG. 4 is a perspective view illustrating a linkage mechanism in an enlarged manner.

FIG. 3 is a top view when the leaning vehicle 1 is seen from above in the top-bottom direction of the vehicle body frame 21. FIG. 4 is a perspective view illustrating the linkage mechanism 5 in an enlarged manner. In FIGS. 3 and 4, the vehicle body frame 21 is in an upright state. In the case of referring to FIGS. 3 and 4, the following description is based on a premise that the vehicle body frame 21 is in the upright state. FIG. 35 also shows an enlarged perspective view of the linkage mechanism 5, and the configuration illustrated in FIG. 35 is similar to the configurations illustrated in FIGS. 2 and 4. Thus, detailed description of the FIG. 35 will be omitted.

The linkage mechanism 5 is a linkage mechanism of a parallel four-bar linkage (also referred to as a parallelogram linkage) type.

As illustrated in FIG. 2, the linkage mechanism 5 is located below the handlebar 651 in the top-bottom direction of the vehicle body frame 21. The linkage mechanism 5 is located above the left front wheel 31 and the right front wheel 32 in the top-bottom direction of the vehicle body frame 21.

The linkage mechanism 5 includes an upper cross member 51, a lower cross member 52, a left side member 53, and a right side member 54. The linkage mechanism 5 is not interlocked with rotation of the steering shaft 652 about an intermediate steering axis Z caused by operation of the handlebar 651. That is, the linkage mechanism 5 does not rotate about the intermediate steering axis Z with respect to the vehicle body frame 21.

As illustrated in FIG. 1, the upper cross member 51 is located at the rear of the head pipe 211 in the front-rear direction of the vehicle body frame 21. As illustrated in FIG. 2, the upper cross member 51 extends in the left-right direction of the vehicle body frame 21.

As illustrated in FIGS. 1 and 2, the lower cross member 52 is located below the upper cross member 51 in the top-bottom direction of the vehicle body frame 21. As illustrated in FIGS. 3 and 4, the lower cross member 52 includes a front-lower-cross part 521 (front cross part), a rear-lower-cross part 522 (rear cross part), and lower-cross-coupling parts 523 and 524 (coupling parts).

As illustrated in FIG. 1, the front-lower-cross part 521 is located at the front of the head pipe 211 in the front-rear direction of the vehicle body frame 21. The rear-lower-cross part 522 is located at the rear of the head pipe 211 in the front-rear direction of the vehicle body frame 21. Each of the front-lower-cross part 521 and the rear-lower-cross part 522 extends in the left-right direction of the vehicle body frame 21.

As illustrated in FIGS. 3 and 4, each of the lower-cross-coupling parts 523 and 524 couples the front-lower-cross part 521 and the rear-lower-cross part 522 to each other in the front-rear direction of the vehicle body frame 21. Specifically, the lower-cross-coupling part 523 couples the front-lower-cross part 521 and the rear-lower-cross part 522 to each other at a location between the head pipe 211 and the left side member 53 in the left-right direction of the vehicle body frame 21. The lower-cross-coupling part 524 couples the front-lower-cross part 521 and the rear-lower-cross part 522 to each other at a location between the head pipe 211 and the right side member 54 in the left-right direction of the vehicle body frame 21.

In the lower cross member 52, the front-lower-cross part 521, the rear-lower-cross part 522, and the lower-cross-coupling parts 523 and 524 are integrally formed.

With the configuration described above, as illustrated in FIG. 4, the lower cross member 52 has a through hole 52*a* in which the head pipe 211 penetrates, between the lower-cross-coupling parts 523 and 524. In the left-right direction of the vehicle body frame 21, the lower cross member 52 has a left notch 52*b* in which the left side member 53 is located at the left end thereof, and a right notch 52*c* in which the right side member 54 is located at the right end thereof.

As illustrated in FIGS. 2 and 3, the left side member 53 is located at the left of the head pipe 211 in the left-right direction of the vehicle body frame 21. The left side member 53 is located above the left front wheel 31 in the top-bottom direction of the vehicle body frame 21. The left side member 53 extends in the direction in which the head pipe 211 extends. The left side member 53 extends in the direction in which the intermediate steering axis Z of the steering shaft 652 extends. An upper portion of the left side member 53 is located at the rear of a lower portion of the left side member 53 in the front-rear direction of the vehicle body frame 21.

The right side member 54 is located at the right of the head pipe 211 in the left-right direction of the vehicle body frame 21. The right side member 54 is located above the right front wheel 32 in the top-bottom direction of the vehicle body frame 21. The right side member 54 extends in the direction in which the head pipe 211 extends. The right side member 54 extends in the direction in which the intermediate steering axis Z of the steering shaft 652 extends. An upper portion of the right side member 54 is located at the rear of a lower portion of the right side member 54 in the front-rear direction of the vehicle body frame 21.

As illustrated in FIG. 4, the head pipe 211 includes an upper-intermediate-coupling part 211a and a lower-intermediate-coupling part 211b.

An intermediate portion of the upper cross member 51 is rotatably coupled to the head pipe 211 through the upper-intermediate-coupling part 211a. That is, the upper cross member 51 is rotatable with respect to the head pipe 211 about an upper-intermediate-coupling axis UI passing through the upper-intermediate-coupling part 211a and extending in the front-rear direction of the vehicle body frame 21.

An intermediate portion of the lower cross member 52 is rotatably coupled to the head pipe 211 through the lower-intermediate-coupling part 211b. That is, the lower cross member 52 is rotatable with respect to the head pipe 211 about a lower-intermediate-coupling axis DI (intermediate axis) passing through the lower-intermediate-coupling part 211b and extending in the front-rear direction of the vehicle body frame 21.

Figure 14:
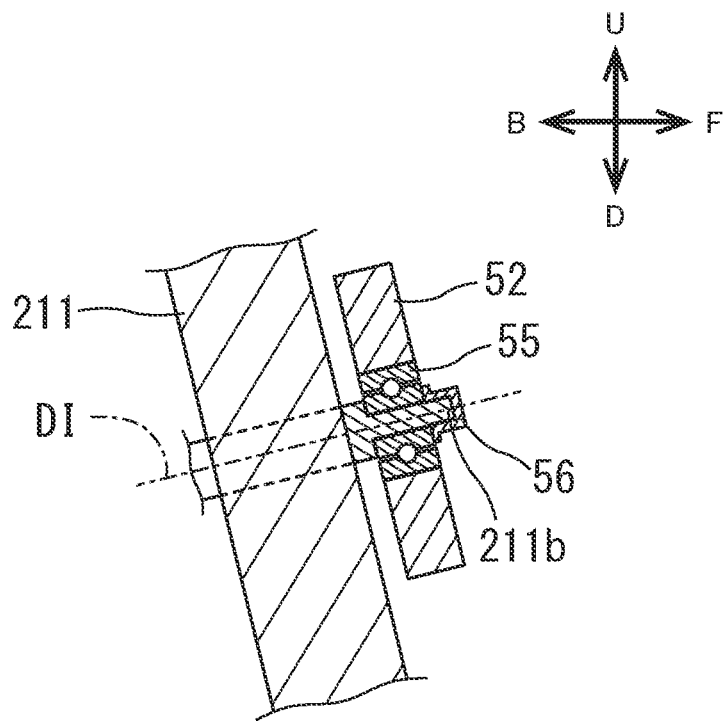
FIG. 14 is a view illustrating a support structure for supporting an intermediate portion of a lower cross member in a cross section taken along line XIV-XIV in FIG. 4.

Specifically, as illustrated in FIG. 14, the intermediate portion of the lower cross member 52 is coupled to the lower-intermediate-coupling part 211b through a lower intermediate bearing 55. The lower intermediate bearing 55 allows the intermediate portion of the lower cross member 52 to be rotatable with respect to the lower-intermediate-coupling part 211b. A front end portion of the lower-intermediate-coupling part 211b is provided with a fixing member 56 for fixing the lower intermediate bearing 55 to the lower-intermediate-coupling part 211b in an axial direction.

The intermediate portion of the upper cross member 51 is also rotatably coupled to the upper-intermediate-coupling part 211a by a structure similar to the intermediate portion of the lower cross member 52.

A coupling structure for coupling the intermediate portion of the lower cross member 52 to the lower-intermediate-coupling part 211b may be another structure. A coupling structure for coupling the intermediate portion of the upper cross member 51 to the upper-intermediate-coupling part 211a may also be another structure.

The left side member 53 includes an upper-left-coupling part 53a and a lower-left-coupling part 53b.

A left end portion of the upper cross member 51 is rotatably coupled to the left side member 53 through the upper-left-coupling part 53a. That is, the upper cross member 51 is rotatable with respect to the left side member 53 about an upper-left-coupling axis UL passing through the upper-left-coupling part 53a and extending in the front-rear direction of the vehicle body frame 21.

A left end portion of the lower cross member 52 is rotatably coupled to the left side member 53 through the lower-left-coupling part 53b. That is, the lower cross member 52 is rotatable with respect to the left side member 53 about a lower-left-coupling axis DL (left axis) passing through the lower-left-coupling part 53b and extending in the front-rear direction of the vehicle body frame 21.

The left end portion of the upper cross member 51 as described above is rotatably coupled to the upper-left-coupling part 53a by a structure similar to the intermediate portion of the lower cross member 52. The left end portion of the lower cross member 52 as described above is also rotatably coupled to the lower-left-coupling part 53b by a structure similar to the intermediate portion of the lower cross member 52.

A coupling structure for coupling the left portion of the upper cross member 51 to the upper-left-coupling part 53a may be another structure. A coupling structure for coupling the left portion of the lower cross member 52 to the lower-left-coupling part 53b may also be another structure.

The right side member 54 includes an upper-right-coupling part 54a and a lower-right-coupling part 54b.

A right end portion of the upper cross member 51 is rotatably coupled to the right side member 54 through the upper-right-coupling part 54a. That is, the upper cross member 51 is rotatable with respect to the right side member 54 about an upper-right-coupling axis UR passing through the upper-right-coupling part 54a and extending in the front-rear direction of the vehicle body frame 21.

A right end portion of the lower cross member 52 is rotatably coupled to the right side member 54 through the lower-right-coupling part 54b. That is, the lower cross member 52 is rotatable with respect to the right side member 54 about a lower-right-coupling axis DR (right axis) passing through the lower-right-coupling part 54b and extending in the front-rear direction of the vehicle body frame 21.

The right end portion of the upper cross member 51 is rotatably coupled to the upper-right-coupling part 54a by a structure similar to the intermediate portion of the lower cross member 52. The right end portion of the lower cross member 52 is also rotatably coupled to the lower-right-coupling part 54b by a structure similar to the intermediate portion of the lower cross member 52.

A coupling structure for coupling the right end portion of the upper cross member 51 to the upper-right-coupling part 54a may be another structure. A coupling structure for coupling the right end portion of the lower cross member 52 to the lower-right-coupling part 54b may also be another structure.

The upper-intermediate-coupling axis UI, the upper-right-coupling axis UR, the upper-left-coupling axis UL, the lower-intermediate-coupling axis DI, the lower-right-coupling axis DR, and the lower-left-coupling axis DL extend mutually in parallel. The upper-intermediate-coupling axis UI, the upper-right-coupling axis UR, the upper-left-coupling axis UL, the lower-intermediate-coupling axis DI, the lower-right-coupling axis DR, and the lower-left-coupling axis DL are located above the left front wheel 31 and the right front wheel 32 in the top-bottom direction of the vehicle body frame 21.

As described above, the upper cross member 51, the lower cross member 52, the left side member 53, and the right side member 54 are supported by the vehicle body frame 21 such that the upper cross member 51 and the lower cross member 52 are kept in parallel with each other, and the left side member 53 and the right side member 54 are kept in parallel with each other.

As illustrated in FIG. 2, the steering mechanism 6 includes the left suspension part 61, the right suspension part 62, the left bracket 63, the right bracket 64, a steering member 65, and a steering-force-transfer mechanism 66.

The left suspension part 61 supports the left front wheel 31 with respect to the linkage mechanism 5. The left suspension part 61 extends in the direction in which the intermediate steering axis Z extends. A lower end portion of the left suspension part 61 supports the left front wheel 31. An upper end portion of the left suspension part 61 is fixed to the left bracket 63.

The left bracket 63 includes an unillustrated left rotating member in an upper portion thereof. The left rotating member is located inside the left side member 53 of the linkage mechanism 5 and extends in the direction in which the left side member 53 extends. The left rotating member is rotatable about a left steering axis X with respect to the left side member 53. That is, the left bracket 63 is rotatable about the left steering axis X with respect to the left side member 53. The left steering axis X extends in the direction in which the left side member 53 extends.

As illustrated in FIG. 2, the left steering axis X extends in the top-bottom direction of the vehicle body frame 21, in parallel with the intermediate steering axis Z of the steering shaft 652.

The right bracket 64 includes an unillustrated right rotating member in an upper portion thereof. The right rotating member is located inside the right side member 54 of the linkage mechanism 5 and extends in the direction in which the right side member 54 extends. The right rotating member is rotatable about a right steering axis Y with respect to the right side member 54. That is, the right bracket 64 is rotatable about the right steering axis Y with respect to the right side member 54. The right steering axis Y extends in the direction in which the right side member 54 extends.

The right suspension part 62 supports the right front wheel 32 with respect to the linkage mechanism 5. The right suspension part 62 extends in the direction in which the intermediate steering axis Z extends. A lower end portion of the right suspension part 62 supports the right front wheel 32. An upper end portion of the right suspension part 62 is fixed to the right bracket 64.

As illustrated in FIG. 2, the right steering axis Y extends in the top-bottom direction of the vehicle body frame 21, in parallel with the intermediate steering axis Z of the steering shaft 652.

The steering member 65 includes the handlebar 651 and the steering shaft 652.

The handlebar 651 is connected to an upper portion of the steering shaft 652. A part of the steering shaft 652 is rotatably supported by the head pipe 211. As illustrated in FIG. 1, the upper portion of the steering shaft 652 is located at the rear of a lower portion of the steering shaft 652 in the front-rear direction of the vehicle body frame 21. Accordingly, the direction in which the intermediate steering axis Z of the steering shaft 652 extends tilts in the front-rear direction of the vehicle body frame 21 with respect to the top-bottom direction of the leaning vehicle 1. The steering shaft 652 rotates about the intermediate steering axis Z in accordance with an operation of the handlebar 651 by a driver.

When the vehicle body frame 21 is seen from the left, the steering shaft 652 is bent toward the front of the vehicle body frame 21 in an intermediate portion of the steering shaft 652 in the top-bottom direction of the vehicle body frame 21. That is, a portion of the steering shaft 652 located above the intermediate portion of the steering shaft 652 extends in the top-bottom direction of the vehicle body frame 21.

The steering shaft 652 includes an inner pipe 653 and an outer pipe 654. An upper portion of the inner pipe 653 is connected to the handlebar 651. A lower portion of the inner pipe 653 is located inside an upper portion of the outer pipe 654. As illustrated in FIG. 1, a lower portion of the outer pipe 654 extends in the direction in which the intermediate steering axis Z extends when the vehicle body frame 21 is seen from the left. The upper portion of the outer pipe 654 extends in the top-bottom direction of the vehicle body frame 21 when the vehicle body frame 21 is seen from the left. That is, the upper portion of the outer pipe 654 is bent toward the front of the vehicle body frame 21 with respect to the lower portion of the outer pipe 654, when the vehicle body frame 21 is seen from the left. A part of the lower portion of the outer pipe 654 is rotatably supported by the head pipe 211.

The inner pipe 653 and the outer pipe 654 are fixed by a fixing member 131 in a state where the lower portion of the inner pipe 653 is located inside the outer pipe 654. The fixing member 131 is located at an upper end portion of the outer pipe 654. The fixing member 131 retains the inner pipe 653 inside the outer pipe 654 by applying a fastening force to the upper end portion of the outer pipe 654 in the radial direction.

A structure of the fixing member 131 may be a structure that generates the fastening force by fastening a bolt or a structure that generates the fastening force by using the principle of leverage with a lever operation. That is, the fixing member 131 may have any structure as long as the inner pipe 653 is capable of being fixed to the outer pipe 654.

Figure 6:
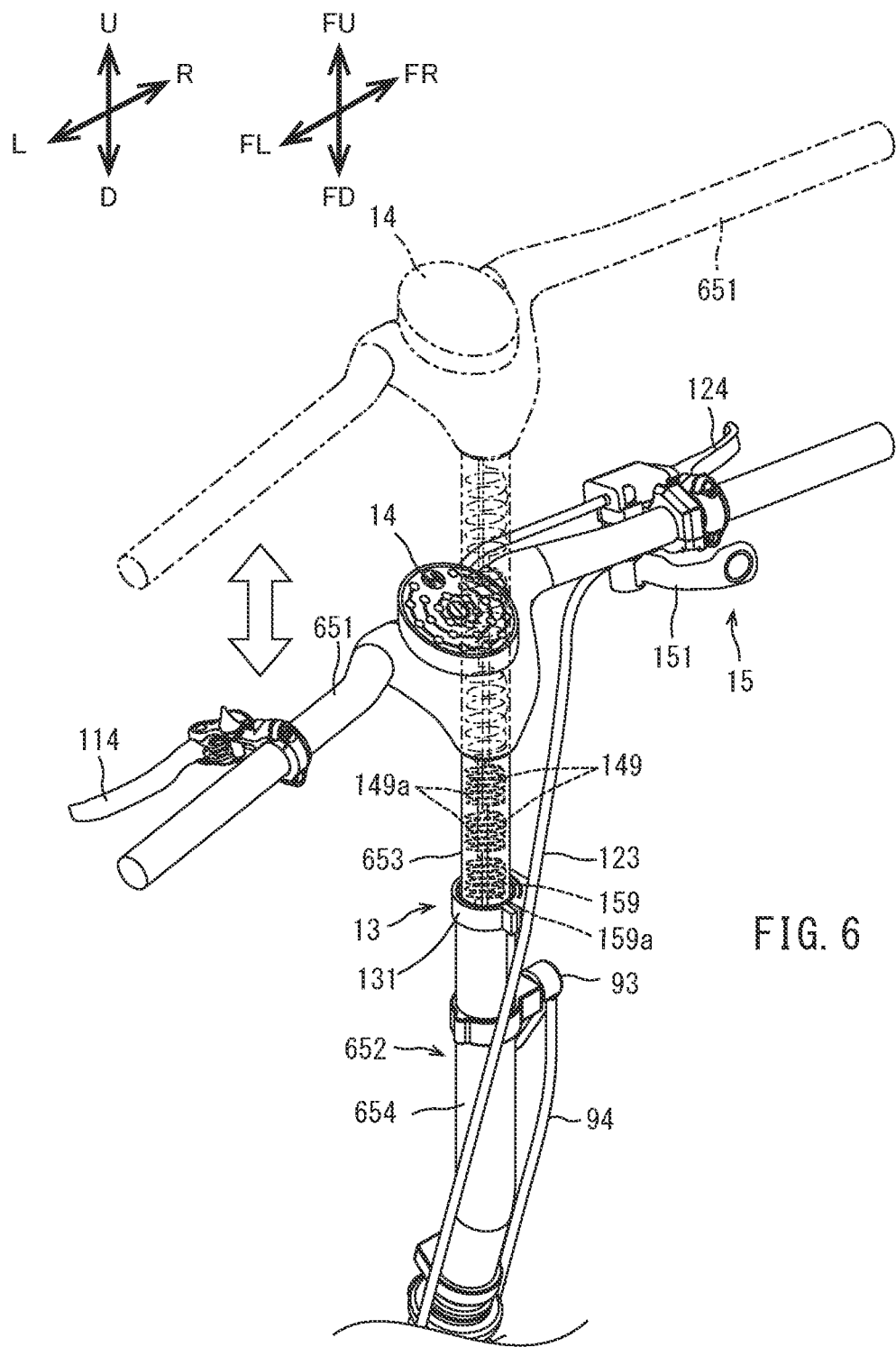
FIG. 6 is a view schematically illustrating a state where a position of a handlebar is changed by an extension/contraction adjusting mechanism.

As illustrated in FIG. 6, in the steering shaft 652 having the structure described above, the length of the steering shaft 652 is changeable by changing a position of the inner pipe 653 relative to the outer pipe 654 in the direction in which the inner pipe 653 extends. That is, the steering shaft 652 includes the extension/contraction adjusting mechanism 13 capable of extending and contracting in the direction in which the inner pipe 653 extends. The extension/contraction adjusting mechanism 13 includes the inner pipe 653 described above, the outer pipe 654, and the fixing member 131.

Since the steering shaft 652 includes the extension/contraction adjusting mechanism 13 as described above, a height position of the handlebar 651 can be adjusted and a distance between the handlebar 651 and a driver can be changed. Thus, it is possible to match with a driver's preference of a steering operation.

In FIG. 6, the handlebar 651 and the steering shaft 652 in a case where the height of the handlebar 651 is changed are indicated by dot-dash lines. In FIG. 6, a direction in which the height of the handlebar 651 is changed is indicated by white arrows.

As illustrated in FIG. 6, two signal lines 149 of the meter 14 described later and a signal line 159 of the throttle device 15 described later are disposed inside the inner pipe 653 and the outer pipe 654. The two signal lines 149 of the meter 14 and the signal line 159 of the throttle device 15 include helically wound curl cords 149a and 159a, respectively. In this embodiment, the curl cords 149a of the signal lines 149 of the meter 14 and the curl cord 159a of the signal line 159 of the throttle device 15 are disposed inside at least one of the inner pipe 653 or the outer pipe 654. Although the number of the signal lines 149 of the meter 14 is two in this embodiment, but the number of the signal lines 149 may be one or three or more. Another signal line may be disposed inside the inner pipe 653 and the outer pipe 654.

In this manner, in the case where the steering shaft 652 is extended or contracted by the extension/contraction adjusting mechanism 13 in the direction in which the intermediate steering axis Z extends as described above, it is possible to prevent hindering of extension or contraction of the steering shaft 652 by the signal lines 149 of the meter 14 and the signal line 159 of the throttle device 15. In addition, the signal lines 149 of the meter 14 and the signal line 159 of the throttle device 15 can be housed in a compact space in the steering shaft 652.

Figure 7:
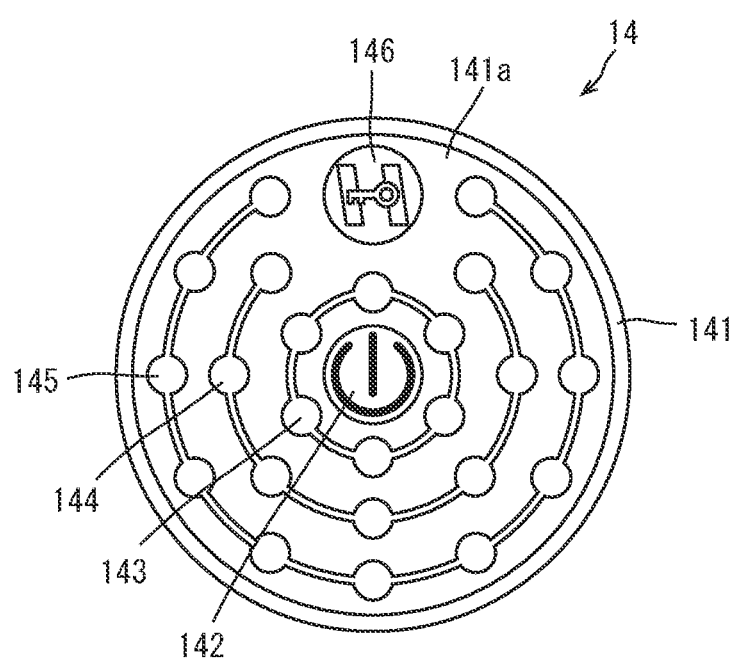
FIG. 7 is a plan view illustrating a configuration of a meter.

As illustrated in FIGS. 1 through 3, 5, and 6, the meter 14 is attached to the handlebar 651. The meter 14 indicates a vehicle state, a battery remaining capacity, and a vehicle speed, for example, of the leaning vehicle 1 to a driver. In this embodiment, as illustrated in FIG. 7, the meter 14 includes a disc-shaped body 141. The body 141 includes a circular display surface 141a at a position facing the driver.

The meter 14 includes, on the display surface 141a, the power-supply-operation section 142, a vehicle-state-display section 143, a battery-remaining-capacity-display section 144, a vehicle-speed-display section 145, and a lean-lock-display section 146. The signal lines 149 for transmitting signals are connected to the meter 14 (see FIG. 6). The signal lines 149 connect the meter 14 to an unillustrated controller.

The power-supply-operation section 142 communicates with, for example, a portable terminal of a driver wirelessly to thereby output a signal for turning the power supply of the leaning vehicle 1 on or off, to the unillustrated controller. The power-supply-operation section 142 is located at a center portion of the display surface 141a of the meter 14. The power-supply-operation section 142 may be a button switch.

The vehicle-state-display section 143 displays a vehicle state of the leaning vehicle 1. The vehicle-state-display section 143 displays an abnormal state of the leaning vehicle 1 such as a non-travelable state or, if the leaning vehicle 1 is travelable but maintenance is needed, for example, displays a warning to the driver. The vehicle-state-display section 143 displays the abnormal state in red and the warning in yellow, for example. In this manner, by displaying the vehicle state of the leaning vehicle 1 with colors, the driver is capable of easily knowing the vehicle state of the leaning vehicle 1. The vehicle state display section 143 is formed in a circular shape surrounding the power-supply-operation section 142.

The battery-remaining-capacity-display section 144 displays a battery remaining capacity of the battery 221 of the leaning vehicle 1. The battery-remaining-capacity-display section 144 displays the battery remaining capacity of the battery 221 by changing an illuminating range in accordance with the battery remaining capacity of the battery 221, for example. Since the battery-remaining-capacity-display section 144 displays the battery remaining capacity of the battery 221 not with numerals but with the illuminated range as described above, the driver is capable of easily knowing the battery remaining capacity of the battery 221. The battery-remaining-capacity-display section 144 is formed in a circular shape surrounding the vehicle-state-display section 143.

The vehicle-speed-display section 145 displays a vehicle speed of the leaning vehicle 1. The vehicle-speed-display section 145 displays the vehicle speed of the leaning vehicle 1 by changing an illuminated range in accordance with the vehicle speed of the leaning vehicle 1, for example. Since the vehicle-speed-display section 145 displays the vehicle speed of the leaning vehicle 1 not with numerals but with the illuminated range, the driver is capable of easily knowing the vehicle speed of the leaning vehicle 1. The vehicle-speed-display section 145 is formed in a circular shape surrounding the battery-remaining-capacity-display section 144.

The lean-lock-display section 146 displays whether or not leftward or rightward leaning of the vehicle body frame 21 is restricted by the restriction mechanism 9 described later. The lean-lock-display section 146 illuminates in a case where leftward or rightward leaning of the vehicle body frame 21 is restricted by the restriction mechanism 9, for example.

Figure 8:
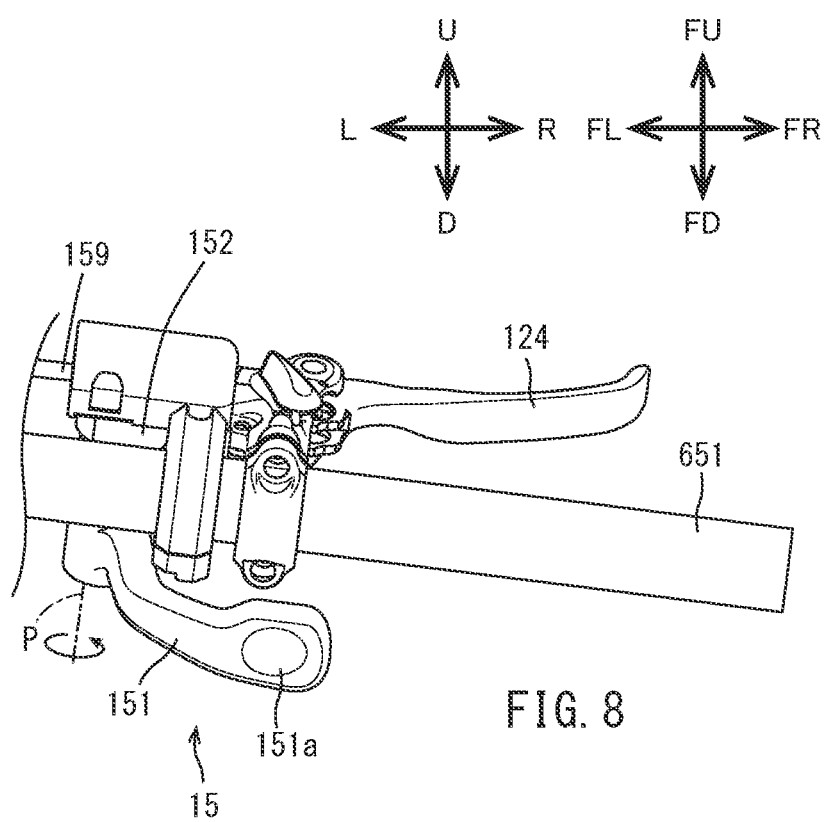
FIG. 8 is a view of a throttle device when seen from the rear of a vehicle body frame.

As illustrated in FIGS. 2, 5, 6, and 8, the handlebar 651 is provided with the throttle device 15 that is operated by a finger(s) of the driver. As illustrated in FIG. 8, the throttle device 15 includes a throttle lever 151 and a throttle-lever-support part 152.

The throttle lever 151 includes a first end portion and a second end portion at both ends thereof in the longitudinal direction. The first end portion of the throttle lever 151 in the longitudinal direction is supported by the throttle-lever-support part 152 to be rotatable about a rotation axis P extending in the top-bottom direction of the vehicle body frame 21. The throttle lever 151 includes a pressing part 151a that is pressed by a finger(s) of the driver, at the second end portion in the longitudinal direction.

The throttle-lever-support part 152 rotatably supports the first end portion of the throttle lever 151 in the longitudinal direction, and outputs a rotation angle of the throttle lever 151 as a throttle signal. The signal line 159 is connected to the throttle lever 151. The signal line 159 connects the throttle-lever-support part 152 and an unillustrated controller to each other.

An operation amount of the throttle lever 151 is transmitted, as a throttle signal, to the unillustrated controller through the signal line 159. The controller drives the power unit 22 in accordance with the throttle signal. Thus, the power unit 22 can be driven in accordance with the operation amount of the throttle lever 151.

As described above, the throttle device 15 including the throttle lever 151 configured to be operated by a finger(s) of the driver is used to control driving of the power unit 22, thereby enhancing operability in throttle operation.

In a case where the leaning vehicle 1 is capable of traveling rearward as well as forward, a forward or rearward throttle signal can be easily output from the throttle device in accordance with a rotation direction of a throttle lever 251, as illustrated in FIG. 9. FIG. 9 is a view schematically illustrating another example of the throttle lever, i.e., the throttle lever 251.

The throttle lever 251 includes a first pressing part 251a and a second pressing part 251b at a second end portion in the longitudinal direction. The first pressing part 251a is located at the front of the second pressing part 251b in the front-rear direction of the vehicle body frame 21.

When the driver pushes the second pressing part 251b of the throttle lever 251 forward to cause the throttle lever 251 to rotate toward the front of the vehicle body frame 21 about the rotation axis P extending in the top-bottom direction of the vehicle body frame 21 (i.e., to rotate in a direction b1 in FIG. 9), a throttle-lever-support part 252 outputs a forward throttle signal. When the driver pulls the second pressing part 251b of the throttle lever 251 rearward to cause the throttle lever 251 to rotate toward the rear of the vehicle body frame 21 about the rotation axis P (i.e., to rotate in a direction b2 in FIG. 9), the throttle-lever-support part 252 outputs a rearward throttle signal. Accordingly, by operating the throttle lever 251, the leaning vehicle 1 can be easily moved forward or rearward.

The throttle-lever-support part 252 may output a regeneration brake signal when the throttle lever 251 is rotated about the rotation axis P toward the rear of the vehicle body frame 21. The regeneration brake signal is a signal with which the unillustrated controller causes the motor to perform a regeneration operation.

Next, with reference to FIGS. 2 and 3, the steering-force-transfer mechanism 66 of the steering mechanism 6 will be described.

The steering-force-transfer mechanism 66 transfers a steering force when a driver operates the handlebar 651, to the left bracket 63 and the right bracket 64. As illustrated in FIG. 3, the steering-force-transfer mechanism 66 includes an intermediate transfer plate 663, a left transfer plate 664, a right transfer plate 665, an intermediate joint 666, a left joint 667, a right joint 668, and a tie rod 669.

The intermediate transfer plate 663 is connected to a lower portion of the steering shaft 652. The intermediate transfer plate 663 is non-rotatable with respect to the steering shaft 652. Thus, the intermediate transfer plate 663 is rotatable about the intermediate steering axis Z of the steering shaft 652 together with the steering shaft 652, with respect to the head pipe 211.

The left transfer plate 664 is located at the left of the intermediate transfer plate 663 in the left-right direction of the vehicle body frame 21. The left transfer plate 664 is connected to a lower portion of the left bracket 63. The left transfer plate 664 is non-rotatable with respect to the left bracket 63. Accordingly, the left transfer plate 664 is rotatable about the left steering axis X with respect to the left side member 53.

The right transfer plate 665 is located at the right of the intermediate transfer plate 663 in the left-right direction of the vehicle body frame 21. The right transfer plate 665 is connected to a lower portion of the right bracket 64. The right transfer plate 665 is non-rotatable with respect to the right bracket 64. Accordingly, the right transfer plate 665 is rotatable about the right steering axis Y with respect to the right side member 54.

As illustrated in FIG. 3, the intermediate joint 666 is coupled to a front portion of the intermediate transfer plate 663 through an intermediate joint steering shaft part extending in the top-bottom direction of the vehicle body frame 21. The intermediate transfer plate 663 and the intermediate joint 666 are rotatable relative to each other about the intermediate joint steering shaft part.

The left joint 667 is located at the left of the intermediate joint 666 in the left-right direction of the vehicle body frame 21. The left joint 667 is coupled to a front portion of the left transfer plate 664 through a left-joint-steering-shaft part extending in the top-bottom direction of the vehicle body frame 21. The left transfer plate 664 and the left joint 667 are rotatable relative to each other about the left-joint-steering-shaft part.

The right joint 668 is located at the right of the intermediate joint 666 in the left-right direction of the vehicle body frame 21. The right joint 668 is coupled to a front portion of the right transfer plate 665 through a right-joint-steering-shaft part extending in the top-bottom direction of the vehicle body frame. The right transfer plate 665 and the right joint 668 are rotatable relative to each other about the right-joint-steering-shaft part.

A front portion of the intermediate joint 666 is provided with an intermediate-joint-rotation-shaft part 666a extending in the front-rear direction of the vehicle body frame 21. A front portion of the left joint 667 is provided with a left-joint-rotation-shaft part 667a extending in the front-rear direction of the vehicle body frame 21. A front portion of the right joint 668 is provided with a right-joint-rotation-shaft part 668a extending in the front-rear direction of the vehicle body frame 21.

The tie rod 669 extends in the left-right direction of the vehicle body frame 21. The tie rod 669 is coupled to the intermediate joint 666, the left joint 667, and the right joint 668 through the intermediate-joint-rotation-shaft part 666a, the left-joint-rotation-shaft part 667a, and the right-joint-rotation-shaft part 668a.

In this embodiment, the tie rod 669 is made of the same material as that of the upper cross member 51, and has the same shape as that of the upper cross member 51. The shape of the tie rod may not be the same as that of the upper cross member. The tie rod may be made of a material different from that of the upper cross member. That is, the tie rod may be made of any material as long as necessary strength is obtainable, and the tie rod may also be in any shape as long as necessary strength is obtainable.

The tie rod 669 and the intermediate joint 666 are rotatable relative to each other about the intermediate-joint-rotation-shaft part 666a provided in the front portion of the intermediate joint 666. The tie rod 669 and the left joint 667 are rotatable relative to each other about the left-joint-rotation-shaft part 667a provided in the front portion of the left joint 667. The tie rod 669 and the right joint 668 are rotatable relative to each other about the right-joint-rotation-shaft part 668a provided in the front portion of the right joint 668.

The left transfer plate 664 is coupled to the intermediate transfer plate 663 through the left joint 667, the tie rod 669, and the intermediate joint 666. The right transfer plate 665 is coupled to the intermediate transfer plate 663 through the right joint 668, the tie rod 669, and the intermediate joint 666. The left transfer plate 664 and the right transfer plate 665 are coupled to each other through the left joint 667, the tie rod 669, and the right joint 668. That is, the tie rod 669 couples the intermediate transfer plate 663, the left transfer plate 664, and the right transfer plate 665.

Next, with reference to FIG. 3, a steering operation of the leaning vehicle 1 will be described.

When a driver operates the handlebar 651, the steering shaft 652 (see, for example, FIG. 2) rotates about the intermediate steering axis Z with respect to the head pipe 211. In the case of leftward steering, the steering shaft 652 rotates in the direction indicated by arrow LT. With the rotation of the steering shaft 652, the intermediate transfer plate 663 rotates about the intermediate steering axis Z in the direction indicated by arrow LT with respect to the head pipe 211.

With the rotation of the intermediate transfer plate 663 in the direction indicated by arrow LT, the intermediate joint 666 rotates in the direction indicated by arrow RT with respect to the intermediate transfer plate 663. Accordingly, the tie rod 669 moves rightward in the left-right direction of the vehicle body frame 21 and rearward in the front-rear direction of the vehicle body frame 21 while maintaining the posture thereof.

With the movement of the tie rod 669 described above, the left joint 667 and the right joint 668 rotate in the direction indicated by arrow RT with respect to the left transfer plate 664 and the right transfer plate 665, respectively. Accordingly, while the tie rod 669 maintains the posture thereof, the left transfer plate 664 and the right transfer plate 665 rotate in the direction indicated by arrow LT.

When the left transfer plate 664 rotates in the direction indicated by arrow LT, the left bracket 63, which is non-rotatable with respect to the left transfer plate 664, rotates about the left steering axis X in the direction indicated by arrow LT with respect to the left side member 53.

When the right transfer plate 665 rotates in the direction indicated by arrow LT, the right bracket 64, which is non-rotatable with respect to the right transfer plate 665, rotates about the right steering axis Y in the direction indicated by arrow LT with respect to the right side member 54.

When the left bracket 63 rotates in the direction indicated by arrow LT, the left suspension part 61 supported by the left bracket 63 rotates about the left steering axis X in the direction indicated by arrow LT with respect to the left side member 53. When the left suspension part 61 rotates in the direction indicated by arrow LT, the left front wheel 31 supported by the left suspension part 61 rotates about the left steering axis X in the direction indicated by arrow LT with respect to the left side member 53.

When the right bracket 64 rotates in the direction indicated by arrow LT, the right suspension part 62 supported by the right bracket 64 rotates about the right steering axis Y in the direction indicated by arrow LT with respect to the right side member 54. When the right suspension part 62 rotates in the direction indicated by arrow LT, the right front wheel 32 supported by the right suspension part 62 rotates about the right steering axis Y in the direction indicated by arrow LT with respect to the right side member 54.

When the driver operates the handlebar 651 for rightward steering, the components of the steering mechanism 6 described above rotate in a direction opposite to the direction in leftward steering. That is, with respect of movements of the components of the steering mechanism 6, left movement and right movement are switched between leftward steering and rightward steering. Thus, detailed description on movement of the steering mechanism 6 in rightward steering will be omitted.

Specifically, the steering-force-transfer mechanism 66 causes the left suspension part 61 to rotate about the left steering axis X in a rotation direction of the steering member 65 in accordance with rotation of the steering member 65. Similarly, the steering-force-transfer mechanism 66 causes the right suspension part 62 to rotate about the right steering axis Y in the rotation direction of the steering member 65 in accordance with rotation of the steering member 65. Accordingly, the steering-force-transfer mechanism 66 transfers a steering force to the left front wheel 31 and the right front wheel 32 in accordance with an operation of the steering member 65 by a driver. The left front wheel 31 and the right front wheel 32 rotate about the left steering axis X and the right steering axis Y, respectively, in a direction in accordance with the direction of operation of the steering member 65 by the driver.

Figure 10:
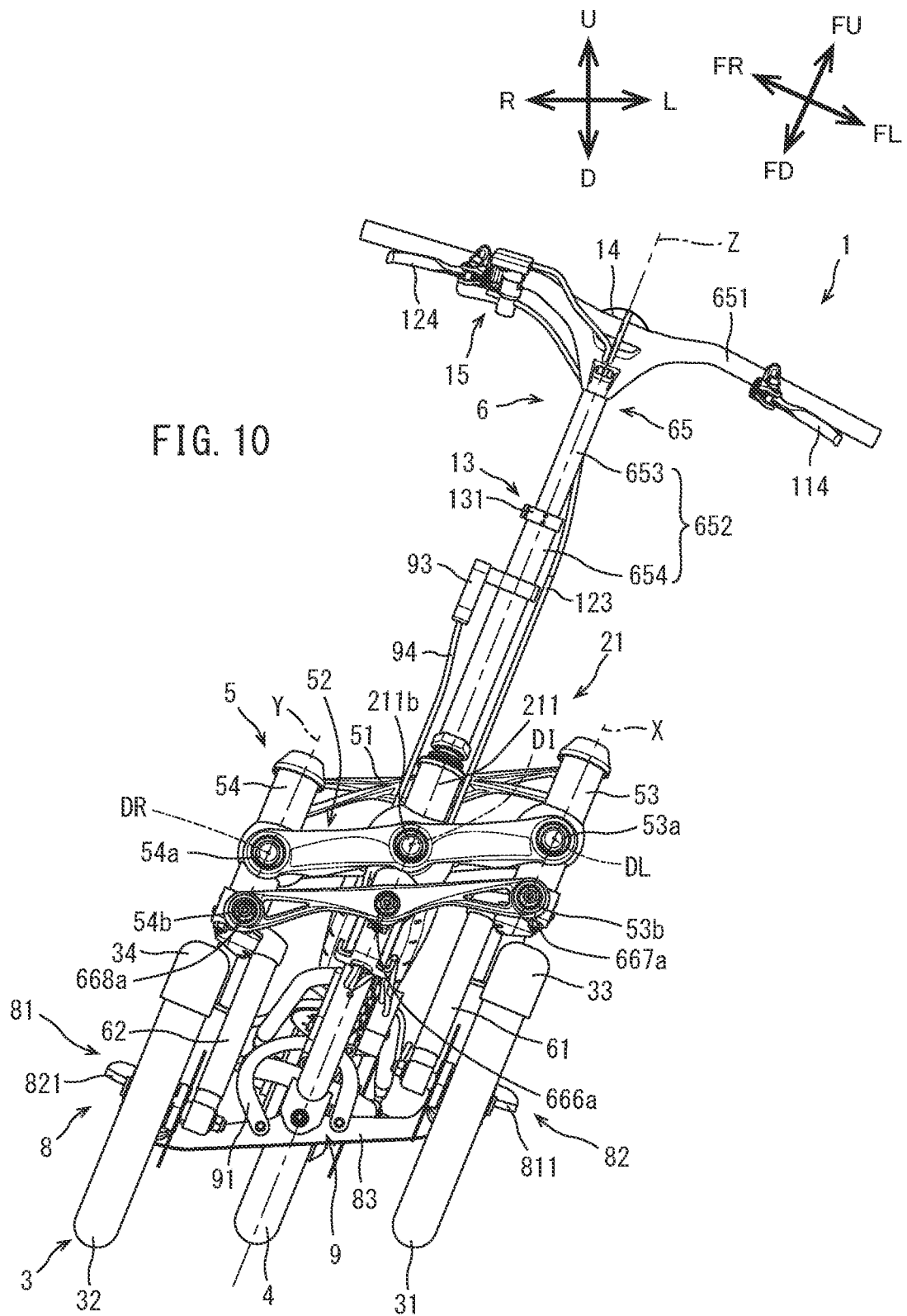
FIG. 10 is a view corresponding to FIG. 2 and illustrating a state where the leaning vehicle leans leftward.

A lean operation of the leaning vehicle 1 will now be described with reference to FIGS. 2 and 10. FIG. 10 is a front view of a front portion of the leaning vehicle 1 in a state where the vehicle body frame 21 leans leftward when seen from the front of the vehicle body frame 21.

As illustrated in FIG. 2, when the leaning vehicle 1 is seen from the front of the vehicle body frame 21 in an upright state, the linkage mechanism 5 has a rectangular shape. As illustrated in FIG. 10, when the leaning vehicle 1 is seen from the front of the vehicle body frame 21 in a lean state, the linkage mechanism 5 has a parallelogram shape. Operation of the linkage mechanism 5 and leftward or rightward leaning of the vehicle body frame 21 are interlocked to each other.

The "operation of the linkage mechanism 5" means that the shape of the linkage mechanism 5 changes. When the linkage mechanism 5 is seen from the front of the vehicle body frame 21, the change of shape of the linkage mechanism 5 is generated by rotation of the upper cross member 51 and the lower cross member 52 about the upper-intermediate-coupling axis UI and the lower-intermediate-coupling axis DI, respectively, with respect to the head pipe 211, and by rotation of the upper cross member 51, the lower cross member 52, the left side member 53, and the right side member 54 about the upper-left-coupling axis UL, the upper-right-coupling axis UR, the lower-left-coupling axis DL, and the lower-right-coupling axis DR, respectively.

For example, as illustrated in FIG. 10, when a driver causes the leaning vehicle 1 to lean leftward, the head pipe 211 leans leftward with respect to the vertical direction. When the head pipe 211 leans leftward, the upper cross member 51 rotates counterclockwise about the upper-intermediate-coupling axis UI with respect to the head pipe 211 when seen from the front of the vehicle body frame 21. Similarly, when the head pipe 211 leans leftward, the lower cross member 52 rotates counterclockwise about the lower-intermediate-coupling axis DI with respect to the head pipe 211 when seen from the front of the vehicle body frame 21. Accordingly, the upper cross member 51 moves to the left in the left-right direction of the vehicle body frame 21 with respect to the lower cross member 52.

With this movement, the upper cross member 51 rotates counterclockwise about the upper-left-coupling axis UL and the upper-right-coupling axis UR with respect to the left side member 53 and the right side member 54, respectively, when seen from the front of the vehicle body frame 21. Similarly, the lower cross member 52 rotates counterclockwise about the lower-left-coupling axis DL and the lower-right-coupling axis DR with respect to the left side member 53 and the right side member 54, respectively, when seen from the front of the vehicle body frame 21. Accordingly, the left side member 53 and the right side member 54 lean to the left of the leaning vehicle 1 with respect to the vertical direction, while maintaining a posture parallel to the head pipe 211.

At this time, the lower cross member 52 moves to the left in the left-right direction of the vehicle body frame 21 with respect to the tie rod 669. With this movement, the tie rod 669 rotates about the intermediate-joint-rotation-shaft part 666a, the left-joint-rotation-shaft part 667a, and the right-joint-rotation-shaft part 668a with respect to the intermediate joint 666, the left joint 667, and the right joint 668, respectively. Accordingly, the tie rod 669 maintains a posture in parallel with the upper cross member 51 and the lower cross member 52.

In the left-right direction of the leaning vehicle 1, leftward leaning of the left side member 53 causes the left suspension part 61 supported by the left side member 53 to lean leftward. This leaning causes the left front wheel 31 supported by the left suspension part 61 to lean leftward while maintaining a posture parallel to the head pipe 211.

In the left-right direction of the leaning vehicle 1, leftward leaning of the right side member 54 causes the right suspension part 62 supported by the right side member 54 to lean leftward. With this leaning, the right front wheel 32 supported by the right suspension part 62 leans leftward while maintaining a posture parallel to the head pipe 211.

In the description on lean operation of the left front wheel 31 and the right front wheel 32 described above, the top-bottom direction is defined with reference to the vertical direction. However, in lean operation of the leaning vehicle 1 (in operation of the linkage mechanism 5), the top-bottom direction of the vehicle body frame 21 does not coincide with the vertical direction. When the top-bottom direction of the vehicle body frame 21 is used as a reference, in operation of the linkage mechanism 5, relative positions of the left front wheel 31 and the right front wheel 32 change in the top-bottom direction of the vehicle body frame 21. In other words, the linkage mechanism 5 causes the vehicle body frame 21 to lean to the left or the right of the leaning vehicle 1 with respect to the vertical direction by changing relative positions of the left front wheel 31 and the right front wheel 32 in the top-bottom direction of the vehicle body frame 21. Accordingly, the leaning vehicle 1 turns to the left.

When the driver causes the leaning vehicle 1 to lean rightward, the components of the leaning vehicle 1 described above lean rightward. Accordingly, the leaning vehicle 1 turns to the right. With respect to movements of the components of the leaning vehicle 1, left movement and right movement are switched between leftward leaning and rightward leaning. Thus, detailed description on movement of the components of the leaning vehicle 1 in rightward leaning will be omitted.

As illustrated in FIGS. 3 and 5, the load transfer mechanism 8 includes a left-foot-load-transfer part 81, a right-foot-load-transfer part 82, and a left-right coupling member 83.

The left-foot-load-transfer part 81 includes the left-foot-placing part 811 and the left coupling member 812.

A left foot of a standing driver is placed on the left-foot-placing part 811. The left coupling member 812 couples the left-foot-placing part 811 and the left side member 53 of the linkage mechanism 5 to each other. As illustrated in FIG. 1, the left coupling member 812 extends from the left side member 53 rearward in the front-rear direction of the vehicle body frame 21 and downward in the top-bottom direction of the vehicle body frame 21. A rear end portion of the left coupling member 812 is coupled to the left-foot-placing part 811. The left-foot-load-transfer part 81 is configured to transfer a load of the driver input through the left-foot-placing part 811, to the left side member 53.

As illustrated in FIGS. 3 and 5, the right-foot-load-transfer part 82 includes the right-foot-placing part 821 and the right coupling member 822.

A right foot of the standing driver is placed on the right-foot-placing part 821. The right coupling member 822 couples the right-foot-placing part 821 and the right side member 54 of the linkage mechanism 5 to each other. The right coupling member 822 extends from the right side member 54 rearward in the front-rear direction of the vehicle body frame 21 and downward in the top-bottom direction of the vehicle body frame 21. A rear end portion of the right coupling member 822 is coupled to the right-foot-placing part 821. The right-foot-load-transfer part 82 is configured to transfer a load of the driver input through the right-foot-placing part 821, to the right side member 54.

With the configuration described above, a load applied to the left-foot-placing part 811 through the left foot of the driver and a load applied to the right-foot-placing part 821 through the right foot of the driver are individually adjusted to thereby control leaning of the vehicle body frame 21.

Figure 11:
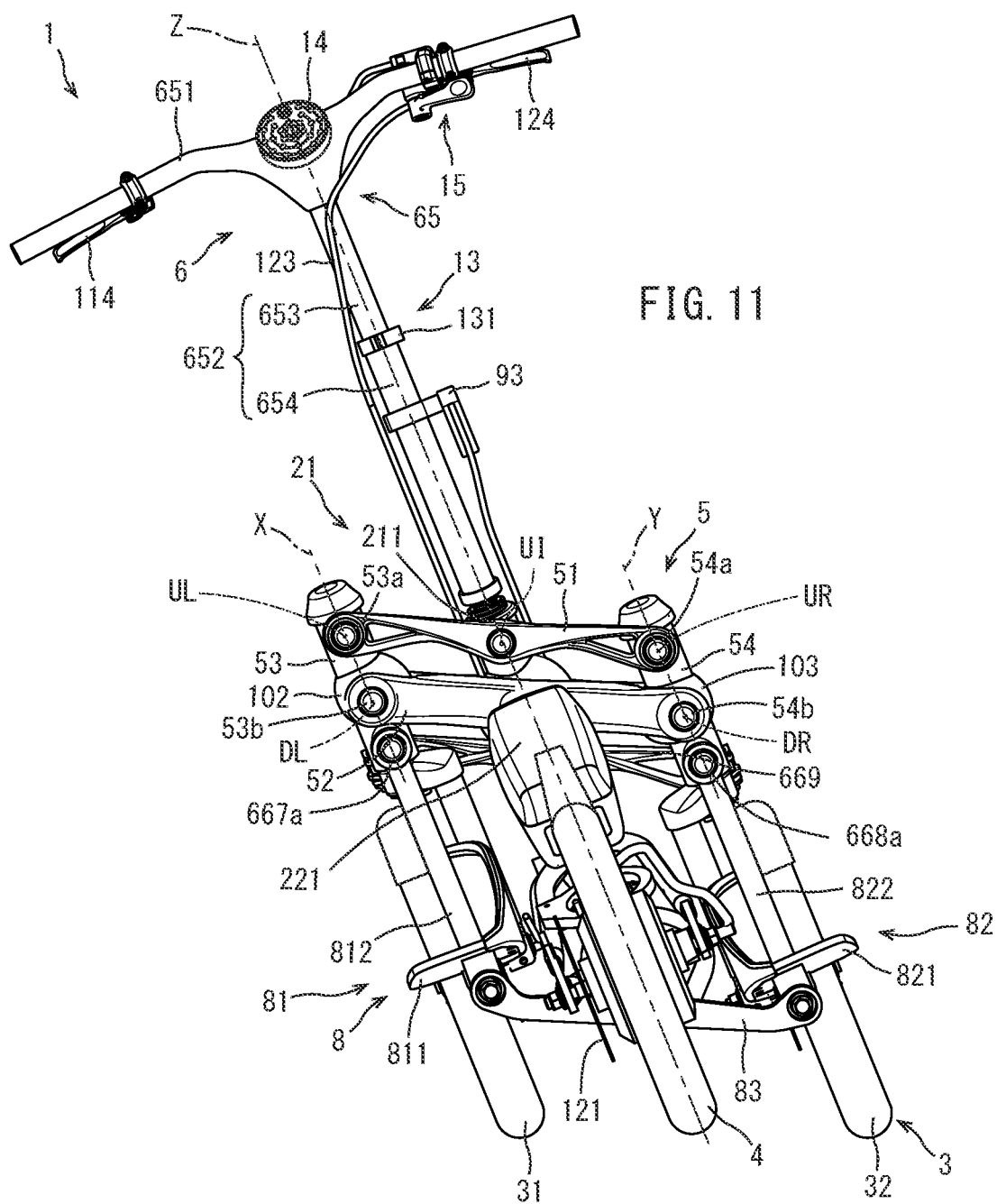
FIG. 11 is a view corresponding to FIG. 5 and illustrating a state where the leaning vehicle leans leftward.

For example, as illustrated in FIGS. 10 and 11, when the vehicle body frame 21 leans to the left of the leaning vehicle 1, the left side member 53 is located above the right side member 54 in the top-bottom direction of the vehicle body frame 21. FIG. 11 is a rear view of a front portion of the leaning vehicle 1 in a state where the vehicle body frame 21 leans leftward when seen from the rear of the vehicle body frame 21.

When a load is applied by a left foot to the left side member 53 through the left-foot-placing part 811, a force is exerted to the left side member 53 such that the left side member 53 is displaced in the downward direction of the vehicle body frame 21. Accordingly, leftward leaning of the vehicle body frame 21 can be suppressed in the left-right direction of the leaning vehicle 1.

On the other hand, when the vehicle body frame 21 leans to the right of the leaning vehicle 1, the right side member 54 is located above the left side member 53 in the top-bottom direction of the vehicle body frame 21. When a load is applied by a right foot to the right side member 54 through the right-foot-placing part 821, a force is exerted to the right side member 54 such that the right side member 54 is displaced in the downward direction of the vehicle body frame 21. Accordingly, rightward leaning of the vehicle body frame 21 can be suppressed in the left-right direction of the leaning vehicle 1.

When the vehicle body frame 21 leans leftward or rightward from the upright state, the normal direction to the placing surface of the left-foot-placing part 811 and the normal direction to the placing surface of the right-foot-placing part 821 change. However, an angle formed by the direction in which the head pipe 211 extends (the direction in which the intermediate steering axis Z extends) and the placing surface of the left-foot-placing part 811 and the placing surface of the right-foot-placing part 821 does not change. That is, the normal direction to the placing surface of the left-foot-placing part 811 and the normal direction to the placing surface of the right-foot-placing part 821 constantly coincide with the top-bottom direction of the vehicle body frame 21.

The left-right coupling member 83 couples the left-foot-placing part 811 and the right-foot-placing part 821 to each other in the left-right direction of the vehicle body frame 21 under the vehicle body frame 21. In the left-right direction of the vehicle body frame 21, a center portion of the left-right coupling member 83 is supported by a rotation support part 214c fixed to a lower portion of the under frame 214 of the vehicle body frame 21, to be rotatable about the under frame 214. Accordingly, in the top-bottom direction of the vehicle body frame 21, the left-right coupling member 83 leans in the top-bottom direction in accordance with upward or downward movement of the left-foot-placing part 811 and the right-foot-placing part 821.

In this manner, the left-foot-placing part 811 and the right-foot-placing part 821 move upward or downward in an interlocked manner in accordance with an input of a load from a left foot on the left-foot-placing part 811 or an input of a load from a right foot on the right-foot-placing part 821. Thus, with the input of a load from the left foot on the left-foot-placing part 811 or the input of a load from the right foot on the right-foot-placing part 821 described above, leftward or rightward leaning of the vehicle body frame 21 can be easily suppressed.

Figure 12:
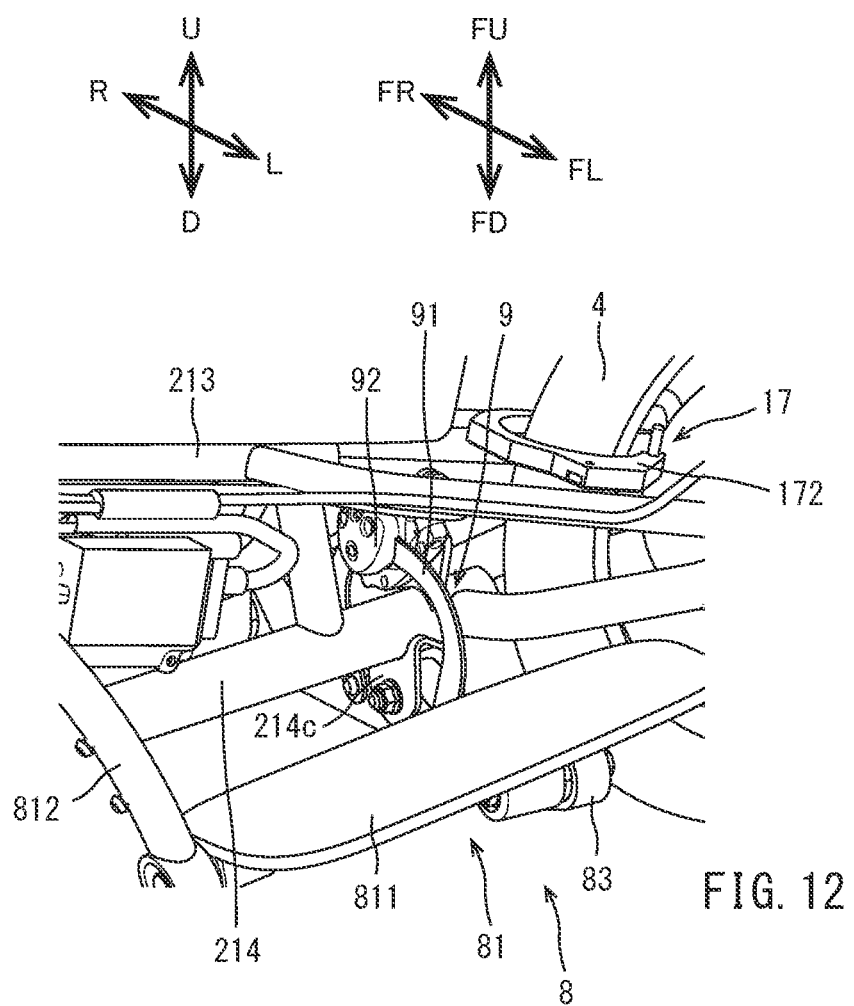
FIG. 12 is a perspective view illustrating a restriction mechanism in an enlarged manner.

As illustrated in FIGS. 1, 2, and 12, the restriction mechanism 9 includes a rotation part 91, a stopper part 92, and a lean lock lever 93 (see FIG. 2). FIG. 12 is a perspective view illustrating the rotation part 91 and the stopper part 92 of the restriction mechanism 9 in an enlarged manner.

The rotation part 91 is displaced relative to the vehicle body frame 21. The stopper part 92 is not displaced relative to the vehicle body frame 21.

As illustrated in FIGS. 2 and 12, the rotation part 91 is a plate member formed by partially cutting off an annular ring, and is fixed to the left-right coupling member 83 coupling the left-foot-placing part 811 and the right-foot-placing part 821 to each other. Specifically, as illustrated in FIG. 12, both end portions of the rotation part 91 are fixed to the left-right coupling member 83 while extending over the under frame 214 and the rotation support part 214c of the vehicle body frame 21. The rotation support part 214c is provided in the under frame 214 and rotatably supports the left-right coupling member 83. Accordingly, in a case where the left-foot-placing part 811 and the right-foot-placing part 821 are displaced relative to the vehicle body frame 21 in the top-bottom direction of the vehicle body frame 21, the rotation part 91 also rotates about the rotation support part 214c together with the left-right coupling member 83.

As described above, since the rotation part 91 is disposed in a manner to extend over the under frame 214, the height of the vehicle body frame 21 can be reduced, and the size of the vehicle body frame 21 in the left-right direction can be reduced.

The stopper part 92 is fixed to the under frame 214. The stopper part 92 includes a caliper that sandwiches the rotation part 91 in the thickness direction. The stopper part 92 operates to hold the rotation part 91 in the thickness direction and apply a friction force to the rotation part 91, by a lock operation of the lean lock lever 93 attached to the steering shaft 652. The stopper part 92 operates to cancel holding of the rotation part 91 and eliminate or reduce a friction force to the rotation part 91 by an unlock operation of the lean lock lever 93.

An operation of the lean lock lever 93 is input to the stopper part 92 through a lean lock wire 94. That is, the lean lock wire 94 connected to the lean lock lever 93 is connected to the stopper part 92.

In the restriction mechanism 9 having the configuration described above, leftward or rightward leaning of the vehicle body frame 21 of the leaning vehicle 1 can be restricted by operating the lean lock lever 93.

In this embodiment, by operating the lean lock lever 93, the stopper part 92 of the restriction mechanism 9 is operated and the rear-wheel-brake caliper 122 of the rear-wheel-braking mechanism 12 is also operated. That is, the restriction mechanism 9 and the rear-wheel-braking mechanism 12 can be interlocked with each other by operating the lean lock lever 93.

Figure 13:
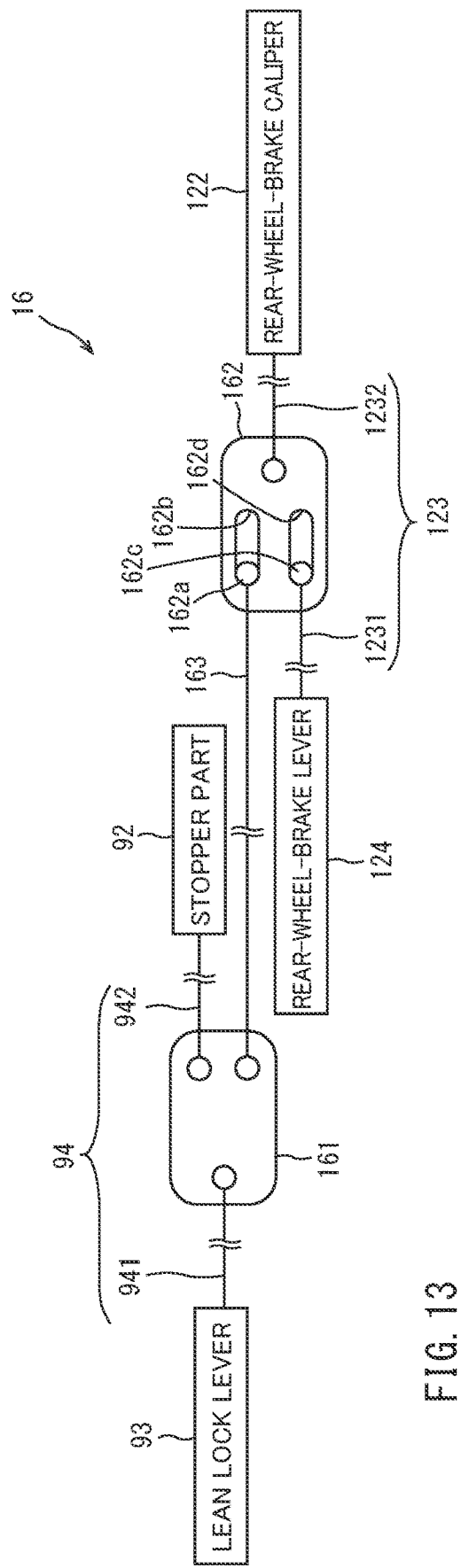
FIG. 13 is a view schematically illustrating a configuration of an interlocking mechanism.

FIG. 13 is a view schematically illustrating a general configuration of the interlocking mechanism 16. The interlocking mechanism 16 includes a first equalizer 161 and a second equalizer 162.

The lean lock lever 93 is connected to the stopper part 92 through the lean lock wire 94 and the first equalizer 161. Specifically, the lean lock wire 94 includes a first-lean-lock wire 941 and a second-lean-lock wire 942. The first-lean-lock wire 941 connects the lean lock lever 93 and the first equalizer 161 to each other. The second-lean-lock wire 942 connects the first equalizer 161 and the stopper part 92 to each other. The first equalizer 161 is located between the first-lean-lock wire 941 and the second-lean-lock wire 942. The direction in which the first-lean-lock wire 941 extends from the first equalizer 161 is opposite to the direction in which the second-lean-lock wire 942 extends from the first equalizer 161.

The expression "the direction in which the first-lean-lock wire 941 extends is opposite to the direction in which the second-lean-lock wire 942 extends" includes not only a case where an extension line of the first-lean-lock wire 941 and an extension line of the second-lean-lock wire 942 overlap with each other, but also a case where the extension line of the first-lean-lock wire 941 and the extension line of the second-lean-lock wire 942 intersect with each other. An angle of the intersection of the extension line of the first-lean-lock wire 941 and the extension line of the second-lean-lock wire 942 is preferably 45 degrees or less.

With the configuration described above, when the lean lock lever 93 is operated, an operating force is transferred to the stopper part 92 through the first-lean-lock wire 941, the first equalizer 161, and the second-lean-lock wire 942.

An interlock brake wire 163 is connected to the first equalizer 161 in parallel with the second-lean-lock wire 942. That is, the direction in which the interlock brake wire 163 extends from the first equalizer 161 is opposite to the direction in which the first-lean-lock wire 941 extends from the first equalizer 161. The interlock brake wire 163 connects the first equalizer 161 and a first connection part 162a of the second equalizer 162 to each other.

Accordingly, an operating force generated when the lean lock lever 93 is operated is transferred to the second equalizer 162 through the first-lean-lock wire 941, the first equalizer 161, and the interlock brake wire 163.

The second equalizer 162 has a first elongated hole 162b in which the first connection part 162a connected to the interlock brake wire 163 is located and a second elongated hole 162d in which a second connection part 162c connected to a first-rear-wheel-brake wire 1231 descried later is located. The longitudinal direction of the first elongated hole 162b and the longitudinal direction of the second elongated hole 162d are the same direction. The expression "the same direction" includes not only a case where the longitudinal direction of the first elongated hole 162b is parallel to the longitudinal direction of the second elongated hole 162d but also a case where the longitudinal direction of the first elongated hole 162b intersects with the longitudinal direction of the second elongated hole 162d.

The first elongated hole 162b is a hole elongated in the direction in which the interlock brake wire 163 extends from the second equalizer 162. That is, the first connection part 162a is movable in the first elongated hole 162b in the direction in which the interlock brake wire 163 extends from the second equalizer 162.

Thus, in a case where the interlock brake wire 163 is pulled with respect to the second equalizer 162, a force is transferred to the second equalizer 162 through the interlock brake wire 163 and the first connection part 162a. On the other hand, in a case where the second equalizer 162 is pulled by the first-rear-wheel-brake wire 1231 described later, the first connection part 162a moves in the first elongated hole 162b. Thus, no force is transferred to the interlock brake wire 163.

The second elongated hole 162d is a hole elongated in the direction in which the first-rear-wheel-brake wire 1231 extends from the second equalizer 162. The second connection part 162c is movable in the second elongated hole 162d in the direction in which the first-rear-wheel-brake wire 1231 extends from the second equalizer 162.

Thus, in a case where the first-rear-wheel-brake wire 1231 is pulled with respect to the second equalizer 162, a force is transferred to the second equalizer 162 through the first-rear-wheel-brake wire 1231 and the second connection part 162c. On the other hand, in a case where the second equalizer 162 is pulled by the interlock brake wire 163, the second connection part 162c moves in the second elongated hole 162d. Thus, slack in the first-rear-wheel-brake wire 1231 can be prevented.

The first-rear-wheel-brake wire 1231 of the rear-wheel-brake wire 123 is connected to the second equalizer 162 in parallel with the interlock brake wire 163. The rear-wheel-brake wire 123 includes the first-rear-wheel-brake wire 1231 and a second-rear-wheel-brake wire 1232. The first-rear-wheel-brake wire 1231 connects the second equalizer 162 and the rear-wheel-brake lever 124 to each other. The second-rear-wheel-brake wire 1232 connects the second equalizer 162 and the rear-wheel-brake caliper 122 to each other. The direction in which the second-rear-wheel-brake wire 1232 extends from the second equalizer 162 is opposite to the direction in which the interlock brake wire 163 and the first-rear-wheel-brake wire 1231 extend from the second equalizer 162.

Accordingly, an operating force generated when the rear-wheel-brake lever 124 is operated is transferred to the rear-wheel-brake caliper 122 through the first-rear-wheel-brake wire 1231, the second equalizer 162, and the second-rear-wheel-brake wire 1232. At this time, the first connection part 162a to which the interlock brake wire 163 is connected moves in the first elongated hole 162b of the second equalizer 162. Thus, no force is transferred to the interlock brake wire 163.

An operating force generated when the lean lock lever 93 is operated is transferred to the rear-wheel-brake caliper 122 through the first-lean-lock wire 941, the first equalizer 161, the interlock brake wire 163, the second equalizer 162, and the second-rear-wheel-brake wire 1232.

With the configuration described above, the stopper part 92 of the restriction mechanism 9 and the rear-wheel-brake caliper 122 of the rear-wheel-braking mechanism 12 are interlocked with each other by operating the lean lock lever 93. In this manner, a driver can easily get on or off the leaning vehicle 1 with leftward and rightward leaning and forward and rearward movement of the leaning vehicle 1 restricted.

(Spacer of Linkage Mechanism)

Next, a first spacer 101, a second spacer 102, and a third spacer 103 provided in the linkage mechanism 5 of the leaning vehicle 1 having the configuration described above will be described with reference to FIGS. 4, and 15 through 18. The first spacer 101, the second spacer 102, and the third spacer 103 correspond to spacers. The first spacer 101, the second spacer 102, and the third spacer 103 correspond to foreign-matter-entering-suppression parts.

Figure 15:
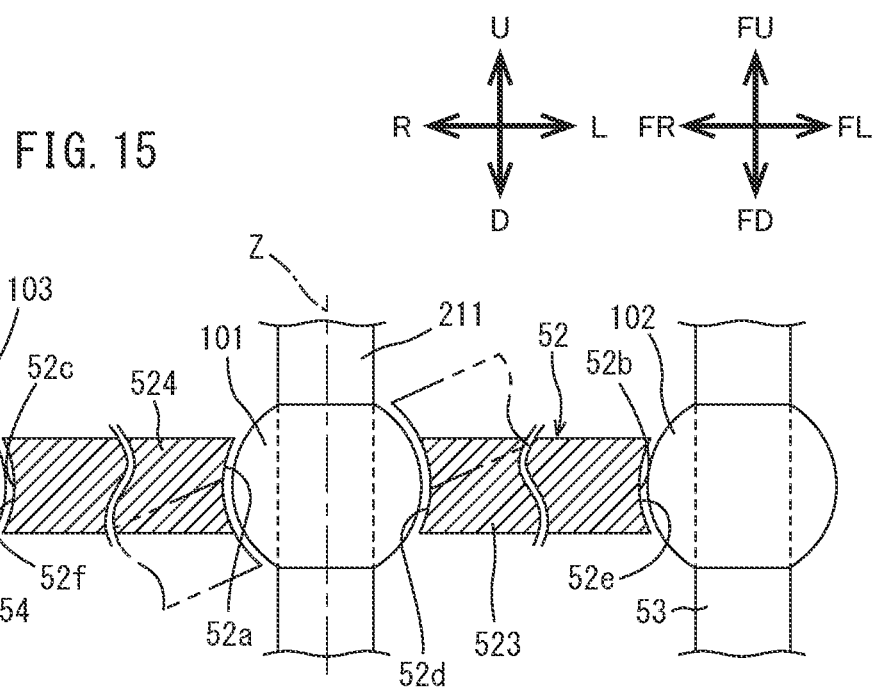
FIG. 15 is a view illustrating a schematic configuration of a first spacer, a second spacer, and a third spacer in a cross section taken along line XV-XV in FIG. 4.

FIG. 15 is a view illustrating a schematic configuration of the first spacer 101, the second spacer 102, and the third spacer 103 when seen from the front of the vehicle body frame 21 in the direction orthogonal to the intermediate steering axis Z. In FIG. 15, in a cross section taken along line XV-XV in FIG. 4, the lower cross member 52, the head pipe 211, the left side member 53, and the right side member 54 are simplified, and the first spacer 101, the second spacer 102, and the third spacer 103 are not illustrated in cross section, but their outer shapes are illustrated, for description. In FIG. 15, a position of the lower cross member 52 is indicated by chain double-dashed lines in a case where the leaning vehicle 1 leans leftward to the most. FIG. 16 is a view illustrating a peripheral configuration of the first spacer 101 and the second spacer 102 in FIG. 15.

FIG. 17 is a top view illustrating a schematic configuration of the first spacer 101, the second spacer 102, and the third spacer 103 when seen from above the vehicle body frame 21 in the direction in which the intermediate steering axis Z extends. In FIG. 17, the lower cross member 52, the head pipe 211, the left side member 53, and the right side member 54 are also simplified for description. In FIG. 17, to distinguish the head pipe 211 and the first spacer 101, the head pipe 211 is hatched. In FIG. 17, to distinguish the left side member 53 and the second spacer 102, the left side member 53 is hatched. In FIG. 17, to distinguish the right side member 54 and the third spacer 103, the right side member 54 is hatched.

Figure 18:
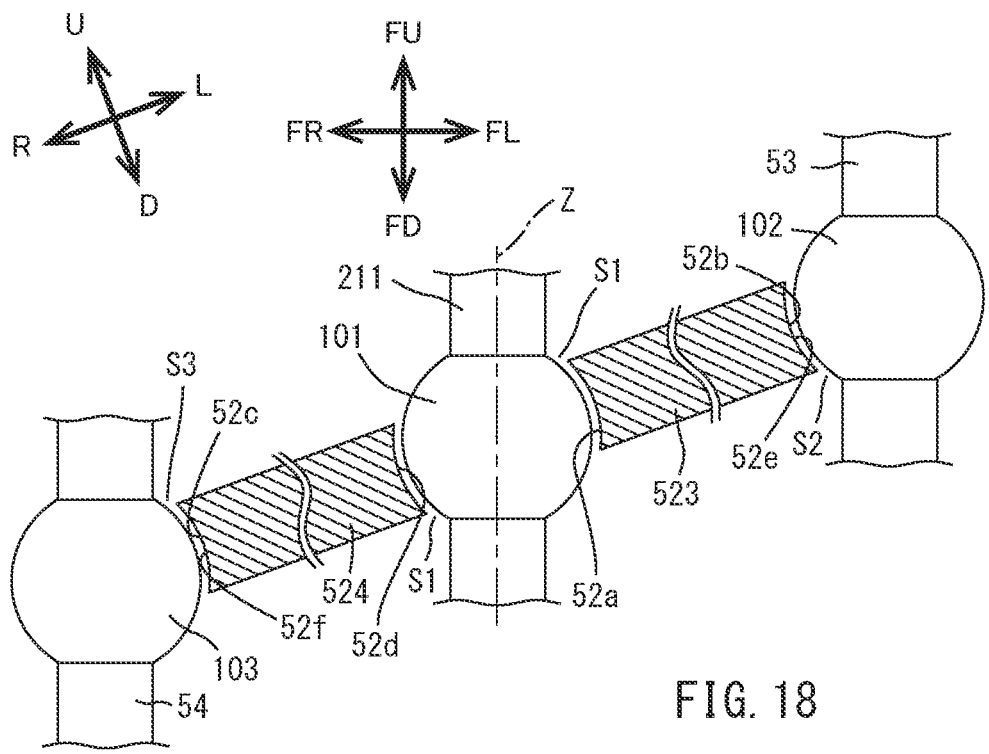
FIG. 18 is a view corresponding to FIG. 15 and illustrating a positional relationship between the first, second, and third spacers and the lower cross member in a case where the leaning vehicle leans leftward to the maximum.

FIG. 18 is a view corresponding to FIG. 15 and illustrating a positional relationship among the first spacer 101, the second spacer 102, and the third spacer 103 relative to the lower cross member 52 in a case where the leaning vehicle 1 leans leftward to the maximum.

As illustrated in FIGS. 4 and 15, in the linkage mechanism 5, the first spacer 101, the second spacer 102, and the third spacer 103 are disposed at portions where the head pipe 211, the left side member 53, and the right side member 54, respectively, intersect with the lower cross member 52.

As illustrated in FIGS. 4 and 15 through 17, the first spacer 101 is located in the through hole 52a of the lower cross member 52 and attached to the head pipe 211 such that the first spacer 101 is located in a gap between the lower cross member 52 and the head pipe 211. That is, the first spacer 101 is located in a gap between the lower-cross-coupling part 523 of the lower cross member 52 and the head pipe 211 and in a gap between the lower-cross-coupling part 524 of the lower cross member 52 and the head pipe 211. The first spacer 101 is a spherical resin member. The head pipe 211 penetrates the first spacer 101 in the radial direction.

The first spacer 101 is partially located in the through hole 52a of the lower cross member 52 and partially exposed from the lower cross member 52 in a state where the front-lower-cross part 521 and the rear-lower-cross part 522 of the lower cross member 52 extend in the left-right direction of the vehicle body frame 21. Specifically, as illustrated in FIGS. 15 and 16, in the top-bottom direction of the vehicle body frame 21, a center portion of the first spacer 101 is located in the through hole 52a of the lower cross member 52 and an upper portion and a lower portion of the first spacer 101 are exposed from the lower cross member 52. The first spacer 101 projects upward from the through hole 52a when the vehicle body frame 21 is seen from the front.

As illustrated in FIG. 18, the first spacer 101 is located in a narrowest gap S1 in the gap between the lower-cross-coupling part 523 of the lower cross member 52 and the head pipe 211 and the gap between the lower-cross-coupling part 524 of the lower cross member 52 and the head pipe 211 when the front-lower-cross part 521 and the rear-lower-cross part 522 of the lower cross member 52 lean to the maximum with respect to the vehicle body frame 21.

The state of leaning to the maximum (maximum leaning) means a state where the front-lower-cross part 521 and the rear-lower-cross part 522 lean leftward or rightward to the maximum with respect to the vehicle body frame 21 in a range where the front-lower-cross part 521 and the rear-lower-cross part 522 are capable of leaning leftward or rightward with respect to the vehicle body frame 21.

In this embodiment, the narrowest gap S1 is formed at the maximum leaning in each of the gap between the lower-cross-coupling part 523 of the lower cross member 52 and the head pipe 211 and the gap between the lower-cross-coupling part 524 of the lower cross member 52 and the head pipe 211. However, the narrowest gap S1 may be formed at the maximum leaning in one of the gap between the lower-cross-coupling part 523 and the head pipe 211 and the gap between the lower-cross-coupling part 524 and the head pipe 211.

As illustrated in FIGS. 15, 16, and 18, a wall surface 52d constituting the through hole 52a in the lower cross member 52 has an arc shape along the outer surface of the first spacer 101 when seen from the front of the vehicle body frame 21 in the direction orthogonal to the intermediate steering axis Z. That is, in the top-bottom direction of the vehicle body frame 21, a diameter of the through hole 52a in a center portion of the lower cross member 52 is larger than a diameter of the through hole 52a in an upper portion and a lower portion of the lower cross member 52.

Parts of the wall surface 52d constituting the through hole 52a of the lower cross member 52 are provided in the lower-cross-coupling parts 523 and 524. The parts of the wall surface 52d form recesses 523a and 524a in the lower-cross-coupling parts 523 and 524 of the lower cross member 52. Thus, outer surfaces of the first spacer 101 in portions facing the lower-cross-coupling parts 523 and 524 are parts of a curved surface when seen in the direction in which the left steering axis X and the right steering axis Y extend.

Accordingly, a distance between the outer surface of the first spacer 101 and the wall surface 52d of the through hole 52a is uniform in the lower cross member 52, when seen from the front of vehicle body frame 21 in the direction orthogonal to the intermediate steering axis Z.

As illustrated in FIG. 16, a distance between the intermediate steering axis Z and the wall surface 52d in the left-right direction varies in the top-bottom direction. That is, in the left-right direction, a distance D1 between the intermediate steering axis Z and an upper portion of the wall surface 52d is smaller than a distance D2 between the intermediate steering axis Z and a center portion of the wall surface 52d in the top-bottom direction. In the left-right direction, a distance D3 between the intermediate steering axis Z and a lower portion of the wall surface 52d is smaller than the distance D2 between the intermediate steering axis Z and the center portion of the wall surface 52d in the top-bottom direction.

Accordingly, in a cross section of the lower-cross-coupling part 523 including the left steering axis X and the right steering axis Y, rigidity of the lower-cross-coupling parts 523 and 524 can be enhanced by the upper portions and the lower portions of the lower-cross-coupling parts 523 and 524. In addition, with the configuration described above, it is possible to suppress entering of foreign matter into the gap in which the first spacer 101 is provided while preventing interference between the first spacer 101 and the lower-cross-coupling parts 523 and 524.

As illustrated in FIG. 15, the spherical first spacer 101 is disposed in the through hole 52a of the lower cross member 52 such that the center of the first spacer 101 coincides with the center of the lower cross member 52 in the top-bottom direction of the vehicle body frame 21.

As described above, the first spacer 101 is provided in the head pipe 211, and portions of the first spacer 101 facing the lower-cross-coupling parts 523 and 524 of the lower cross member 52 have convex shapes projecting toward the lower-cross-coupling parts 523 and 524. Portions of the lower-cross-coupling parts 523 and 524 facing the first spacer 101 have parts of the wall surface 52d (recesses 523a, 524a) having a uniform minimum distance to the first spacer 101. The first spacer 101 is disposed in a non-contact manner with the recesses 523a and 524a of the lower-cross-coupling parts 523 and 524.

Accordingly, the first spacer 101 fills the gaps between the head pipe 211 and the lower-cross-coupling parts 523 and 524 to thereby suppress entering of foreign matter into the gap.

As illustrated in FIGS. 4 and 15 through 17, the second spacer 102 is located in the left notch 52b (recess) of the lower cross member 52 and attached to the left side member 53 such that the second spacer 102 is located in a gap between the lower-cross-coupling part 523 of the lower cross member 52 and the left side member 53. The second spacer 102 is a spherical resin member. The left side member 53 penetrates the second spacer 102 in the radial direction.

The second spacer 102 is partially located in the left notch 52b of the lower cross member 52 and partially exposed from the lower cross member 52 in a state where the front-lower-cross part 521 and the rear-lower-cross part 522 of the lower cross member 52 extend in the left-right direction of the vehicle body frame 21. The second spacer 102 projects upward from the left notch 52b when the vehicle body frame 21 is seen from the front.

As illustrated in FIG. 18, while the front-lower-cross part 521 and the rear-lower-cross part 522 of the lower cross member 52 lean to the maximum with respect to the vehicle body frame 21, the second spacer 102 is located in a narrowest gap S2 in a gap between the lower-cross-coupling part 523 of the lower cross member 52 and the left side member 53.

A wall surface 52e constituting the left notch 52b in the lower cross member 52 has an arc shape along the outer surface of the second spacer 102 when seen from the front of the vehicle body frame 21 in the direction orthogonal to the intermediate steering axis Z.

As illustrated in FIG. 16, a distance between the left steering axis X and the wall surface 52e in the left-right direction varies in the top-bottom direction. That is, in the left-right direction, a distance D4 between the left steering axis X and an upper portion of the wall surface 52e is smaller than a distance D5 between the left steering axis X and a center portion of the wall surface 52e in the top-bottom direction. In the left-right direction, a distance D6 between the left steering axis X and a lower portion of the wall surface 52e is smaller than the distance D5 between the left steering axis X and the center portion of the wall surface 52e in the top-bottom direction.

Accordingly, in a cross section of the lower-cross-coupling part 523 including the left steering axis X and the right steering axis Y, rigidity of the lower-cross-coupling part 523 can be enhanced by the upper portion and the lower portion of the lower-cross-coupling part 523. In addition, with the configuration described above, it is possible to suppress entering of foreign matter into the gap in which the second spacer 102 is provided while preventing interference between the second spacer 102 and the lower-cross-coupling part 523.

A part of the wall surface 52e constituting the left notch 52b of the lower cross member 52 is provided in the lower-cross-coupling part 523. Thus, the outer surface of a portion of the second spacer 102 facing the lower-cross-coupling part 523 is a part of a curved surface when seen in the direction in which the left steering axis X and the right steering axis Y extend.

Accordingly, a distance between the outer surface of the second spacer 102 and the wall surface 52e of the left notch 52b is uniform in the lower cross member 52, when seen from the front of vehicle body frame 21 in the direction orthogonal to the intermediate steering axis Z.

The spherical second spacer 102 is located in the left notch 52b of the lower cross member 52 such that the center of the second spacer 102 coincides with the center of the lower cross member 52 in the top-bottom direction of the vehicle body frame 21.

As described above, the second spacer 102 is provided in the left side member 53, and a portion of the second spacer 102 facing the lower-cross-coupling part 523 of the lower cross member 52 has a convex shape projecting toward the lower-cross-coupling part 523. A portion of the lower-cross-coupling part 523 facing the second spacer 102 has a part of the wall surface 52e (recess) having a uniform minimum distance to the second spacer 102. The second spacer 102 is disposed in a non-contact manner with the left notch 52b of the lower-cross-coupling part 523.

Accordingly, the second spacer 102 fills the gap between the left side member 53 and the lower-cross-coupling part 523 to thereby suppress entering of foreign matter into the gap.

As illustrated in FIGS. 4, 15, and 17, the third spacer 103 is located in the right notch 52c (recess) of the lower cross member 52 and attached to the right side member 54 such that the third spacer 103 is located in a gap between the lower-cross-coupling part 524 of the lower cross member 52 and the right side member 54. The third spacer 103 is a spherical resin member. The right side member 54 penetrates the third spacer 103 in the radial direction.

The third spacer 103 is partially located in the right notch 52c of the lower cross member 52 and partially exposed from the lower cross member 52 in a state where the front-lower-cross part 521 and the rear-lower-cross part 522 of the lower cross member 52 extend in the left-right direction of the vehicle body frame 21. The third spacer 103 projects upward from the right notch 52c when the vehicle body frame 21 is seen from the front.

The third spacer 103 is located in the narrowest gap S3 in the gap between the lower-cross-coupling part 524 of the lower cross member 52 and the right side member 54 when the front-lower-cross part 521 and the rear-lower-cross part 522 of the lower cross member 52 lean to the maximum with respect to the vehicle body frame 21.

A wall surface 52f constituting the right notch 52c in the lower cross member 52 has an arc shape along the outer surface of the third spacer 103 when seen from the front of the vehicle body frame 21 in the direction orthogonal to the intermediate steering axis Z. A distance between the right steering axis Y and the wall surface 52f in the left-right direction has a relationship similar to the case of the distance between the left steering axis X and the wall surface 52e in the left-right direction described above. Thus, detailed description will not be repeated.

A part of the wall surface 52f constituting the right notch 52c of the lower cross member 52 is provided in the lower-cross-coupling part 524. Thus, the outer surface of a portion of the third spacer 103 facing the lower-cross-coupling part 524 is a part of a curved surface when seen in the direction in which the left steering axis X and the right steering axis Y extend.

Accordingly, a distance between the outer surface of the third spacer 103 and the wall surface 52f of the right notch 52c is uniform in the lower cross member 52, when seen from the front of vehicle body frame 21 in the direction orthogonal to the intermediate steering axis Z.

The spherical third spacer 103 is located in the right notch 52c of the lower cross member 52 such that the center of the third spacer 103 coincides with the center of the lower cross member 52 in the top-bottom direction of the vehicle body frame 21.

As described above, the third spacer 103 is provided in the right side member 54, and a portion of the third spacer 103 facing the lower-cross-coupling part 524 of the lower cross member 52 has a convex shape projecting toward the lower-cross-coupling part 524.

A portion of the lower-cross-coupling part 524 facing the third spacer 103 has a part of the wall surface 52f (recess) having a uniform minimum distance to the third spacer 103. The third spacer 103 is disposed in a non-contact manner with the right notch 52c of the lower-cross-coupling part 524.

Accordingly, the third spacer 103 fills the gap between the right side member 54 and the lower-cross-coupling part 524 to thereby suppress entering of foreign matter into the gap.

The lower cross member 52 rotates with respect not only to the head pipe 211, the left side member 53, and the right side member 54 but also to the first spacer 101, the second spacer 102, and the third spacer 103.

With the configuration described above, the first spacer 101, the second spacer 102, and the third spacer 103 can narrow the gaps between the lower cross member 52 and each of the head pipe 211, the left side member 53, and the right side member 54. Accordingly, entering of foreign matter into these gaps can be suppressed.

In addition, since the first spacer 101, the second spacer 102, and the third spacer 103 are spherical, even when the lower cross member 52 rotates with respect to the head pipe 211, the left side member 53, and the right side member 54, entering of foreign matter into the gaps can be suppressed.

That is, even when the lower cross member 52 rotates with respect to the head pipe 211, the spherical first spacer 101 enables the minimum distance from the first spacer 101 to the lower-cross-coupling parts 523 and 524 of the lower cross member 52 to be kept uniform. This further ensures suppression of entering of foreign matter into gaps between the first spacer 101 and the lower-cross-coupling parts 523 and 524.

Further, even when the lower cross member 52 rotates with respect to the left side member 53, the spherical second spacer 102 enables the minimum distance from the second spacer 102 to the lower-cross-coupling part 523 of the lower cross member 52 to be kept uniform. This further ensures suppression of entering of foreign matter into the gap between the second spacer 102 and the lower-cross-coupling part 523.

Furthermore, even when the lower cross member 52 rotates with respect to the right side member 54, the spherical third spacer 103 enables the minimum distance from the third spacer 103 to the lower-cross-coupling part 524 of the lower cross member 52 to be kept uniform. This further ensures suppression of entering of foreign matter into the gap between the third spacer 103 and the lower-cross-coupling part 524.

The first spacer 101 is located in the narrowest gap S1 in the gap between the lower-cross-coupling part 523 of the lower cross member 52 and the head pipe 211 and the gap between the lower-cross-coupling part 524 of the lower cross member 52 and the head pipe 211 when the front-lower-cross part 521 and the rear-lower-cross part 522 of the lower cross member 52 lean to the maximum with respect to the vehicle body frame 21.

Accordingly, even in a case where the front-lower-cross part 521 and the rear-lower-cross part 522 of the lower cross member 52 lean to the maximum with respect to the vehicle body frame 21, the first spacer 101 can further reliably suppress entering of foreign matter into the narrowest gap S1 in the gap between the lower-cross-coupling part 523 of the lower cross member 52 and the head pipe 211 and the gap between the lower-cross-coupling part 524 of the lower cross member 52 and the head pipe 211.

While the front-lower-cross part 521 and the rear-lower-cross part 522 of the lower cross member 52 lean to the maximum with respect to the vehicle body frame 21, the second spacer 102 is located in the narrowest gap S2 in the gap between the lower-cross-coupling part 523 of the lower cross member 52 and the left side member 53.

Accordingly, even in the case where the front-lower-cross part 521 and the rear-lower-cross part 522 of the lower cross member 52 lean to the maximum with respect to the vehicle body frame 21, the second spacer 102 can further reliably suppress entering of foreign matter into the narrowest gap S2 in the gap between the lower-cross-coupling part 523 of the lower cross member 52 and left side member 53.

The third spacer 103 is located in the narrowest gap S3 in the gap between the lower-cross-coupling part 524 of the lower cross member 52 and the right side member 54 when the front-lower-cross part 521 and the rear-lower-cross part 522 of the lower cross member 52 lean to the maximum with respect to the vehicle body frame 21.

Accordingly, even in the case where the front-lower-cross part 521 and the rear-lower-cross part 522 of the lower cross member 52 lean to the maximum with respect to the vehicle body frame 21, the third spacer 103 can further reliably suppress entering of foreign matter into the narrowest gap S3 in the gap between the lower-cross-coupling part 524 of the lower cross member 52 and right side member 54.

OTHER EMBODIMENTS

The embodiment of the present teaching has been described above, but the embodiment is merely an example for carrying out the present teaching. Thus, the present teaching is not limited to the embodiment described above, and the embodiment may be modified as necessary within a range not departing from the gist of the present teaching.

In the embodiment, the first spacer 101 is attached to the head pipe 211. The second spacer 102 is attached to the left side member 53. The third spacer 103 is attached to the right side member 54. That is, the first spacer 101 is separate from the head pipe 211. The second spacer 102 is separate from the left side member 53. The third spacer 103 is separate from the right side member 54.

However, the first spacer may be formed integrally with the head pipe. The second spacer may be formed integrally with the left side member. The third spacer may be formed integrally with the right side member. That is, the spacer may be formed integrally with at least one of the head pipe, the left side member, or the right side member. Accordingly, the number of components of the leaning vehicle can be reduced.

In the embodiment, the first spacer 101, the second spacer 102, and the third spacer 103 are resin members. Alternatively, the first spacer, the second spacer, and the third spacer may be made using other materials such as metal materials or elastic materials.

In the embodiment, the first spacer 101, the second spacer 102, and the third spacer 103 are disposed in a non-contact manner with the lower cross member 52. Alternatively, at least one of the first spacer, the second spacer, or the third spacer may be in contact with the lower cross member to such a degree that does not hinder movement of the linkage mechanism 5. A contact portion of the first spacer, the second spacer, or the third spacer in contact with the lower cross member may be lubricated by a lubricant such as grease, or may be made of a low-friction material or a lubricating material.

In the embodiment, the first spacer 101, the second spacer 102, and the third spacer 103 are spherical. Alternatively, at least one of the first spacer, the second spacer, or the third spacer may be columnar or conic. That is, at least one of the first spacer, the second spacer, or the third spacer may have a curved surface at the outer periphery thereof when seen in the direction in which the left steering axis X and the right steering axis Y extend. At least one of the first spacer, the second spacer, or the third spacer may have another shape described below. Variations of the first spacer will be described below, and the following configuration is similarly applicable to at least one of the second spacer or the third spacer.

Figure 19:
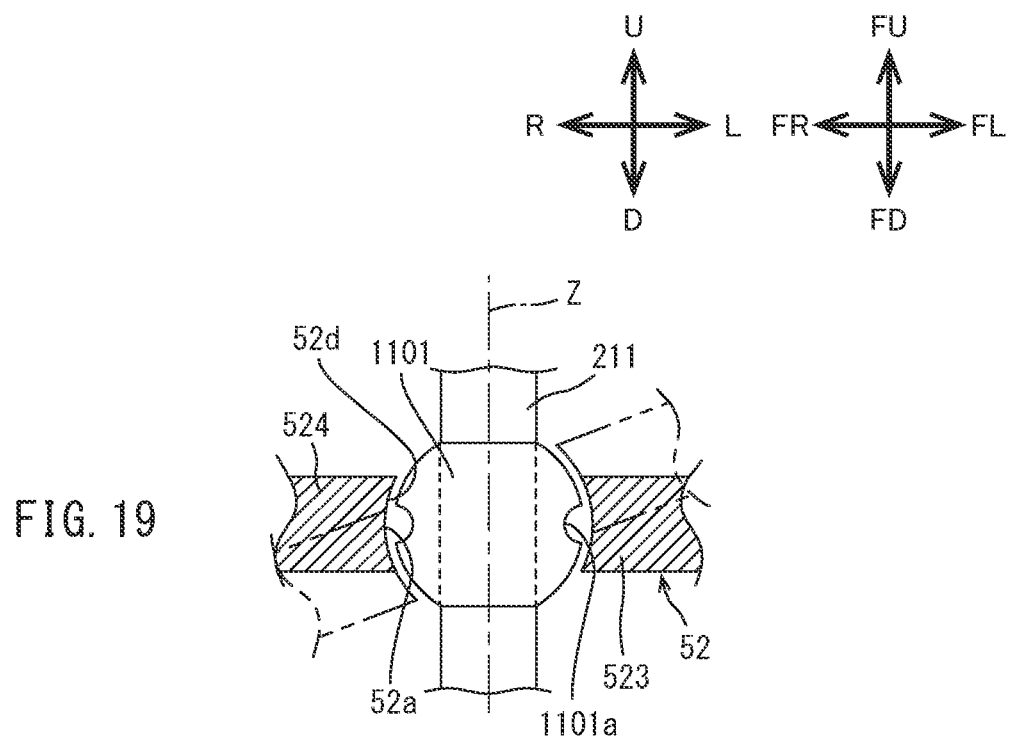
FIG. 19 is a view corresponding to FIG. 15 and illustrating a first spacer according to another embodiment.

For example, as illustrated in FIG. 19, a spherical spacer 1101 may have recesses 1101a on the surface thereof. Each recess 1101a is semicircular when the spacer 1101 is seen in the direction orthogonal to the intermediate steering axis Z. The recess 1101a is disposed in the spacer 1101 at a location at which the recess 1101a is not exposed when the vehicle body frame of the leaning vehicle leans leftward or rightward to the maximum. In FIG. 19, the spacer 1101 has two recesses. Alternatively, the number of recesses may be two or three or more. The shape of each recess may be a shape other than a semicircle when the spacer is seen in the direction orthogonal to the intermediate steering axis Z. The recess may be a dimple or a groove. The recess may be disposed at any location in the spacer as long as the recess is not exposed in a state where the vehicle body frame of the leaning vehicle leans leftward or rightward to the maximum.

Figure 20:
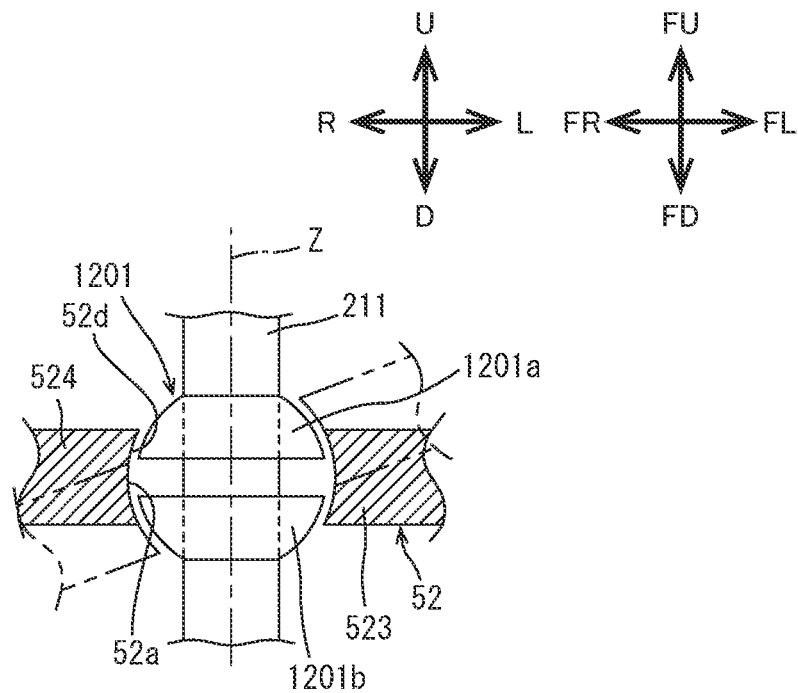
FIG. 20 is a view corresponding to FIG. 15 and illustrating a first spacer according to another embodiment.

As illustrated in FIG. 20, the spacer 1201 may include a plurality of spacer constituents 1201a and 1201b arranged with predetermined intervals. In the example of FIG. 20, each of the plurality of spacer constituents 1201a and 1201b is disposed to constitute a part of a sphere. Also in this case, a gap between the plurality of spacer constituents 1201a and 1201b is formed at a location where the gap is not exposed in the state where the vehicle body frame of the leaning vehicle leans leftward or rightward to the maximum. In the example illustrated in FIG. 20, the spacer 1201 includes two spacer constituents disposed with a predetermined interval. Alternatively, the spacer may include three or more spacer constituents such that the spacer is formed by arranging adjacent two of the spacer constituents with a predetermined interval. The plurality of spacer constituents may be arranged at any locations as long as a gap is not exposed in the state where the vehicle body frame of the leaning vehicle leans leftward or rightward to the maximum. The shape of the plurality of spacer constituents may be any shape as long as a gap is not exposed in the state where the vehicle body frame of the leaning vehicle leans leftward or rightward to the maximum.

Figure 21:
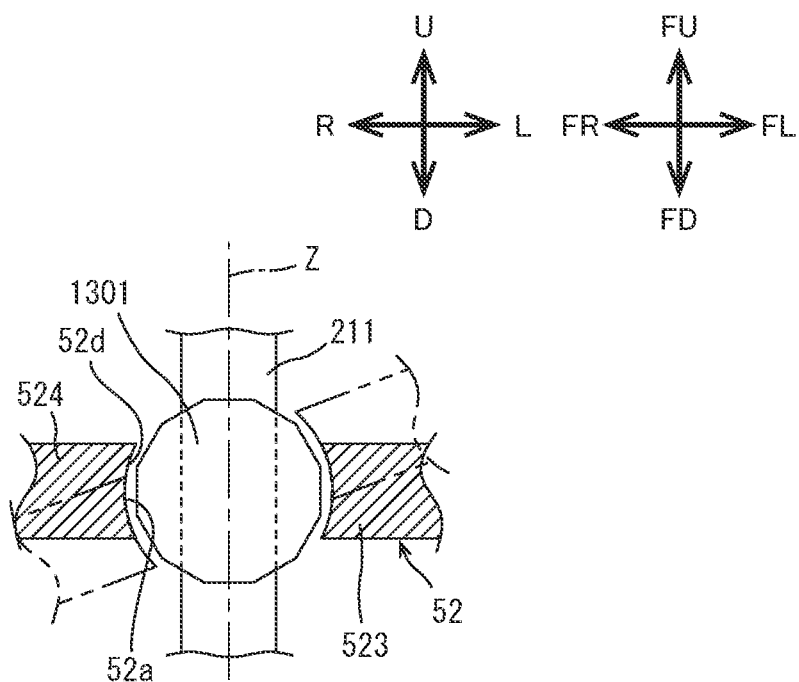
FIG. 21 is a view corresponding to FIG. 15 and illustrating a first spacer according to another embodiment.

As illustrated in FIG. 21, a spacer 1301 may have a polygonal shape. The polygonal shape includes not only the polygonal shape close to a spherical shape as illustrated in FIG. 21 but also shapes such as a triangular pyramid, a triangular prism, a quadrangular pyramid, a rectangular parallelepiped, a polygonal prism, and a polygonal pyramid. In this case, the shape of the spacer 1301 may be such a shape that no foreign matter enters a gap between the outer surface of the spacer 1301 and the wall surface 52d constituting the through hole 52a of the lower cross member 52 in the state where the vehicle body frame of the leaning vehicle leans leftward or rightward. In the polygonal spacer illustrated in FIG. 21, a recess as illustrated in FIG. 19 and a gap as illustrated in FIG. 20 may be formed.

As illustrated in FIG. 22, when seen in the direction in which the intermediate steering axis Z extends, the shape of a spacer 1401 may be a rectangle. As illustrated in FIG. 23, when seen in the direction in which the intermediate steering axis Z extends, the shape of a spacer 1501 may be a hexagon projecting in the left-right direction of the vehicle body frame 21. As illustrated in FIG. 24, when seen in the direction in which the intermediate steering axis Z extends, the shape of a spacer 1601 may be a hexagon recessed in the left-right direction of the vehicle body frame 21. As illustrated in FIG. 25, when seen in the direction in which the intermediate steering axis Z extends, the shape of a spacer 1701 may be a semicircle. As described above, the shape of the spacer when seen in the direction in which the intermediate steering axis Z extends may be any shape as long as rotation of the lower cross member with respect to the head pipe, the left side member, and the right side member is not hindered.

In FIGS. 22 through 25, reference characters 1052, 1152, 1252, and 1352 denote lower cross members, and reference characters 1052a, 1152a, 1252a, and 1352a denote through holes of the lower cross members. In FIGS. 22 through 25, to distinguish the head pipe 211 from the spacers, the head pipe 211 are hatched.

The wall surface provided in the lower cross member and constituting the through hole in which the spacer is disposed has a shape along the outer shape of the spacer when seen in the direction in which the intermediate steering axis extends.

In the embodiment, the spherical first spacer 101 is disposed in the through hole 52a of the lower cross member 52 such that the center of the first spacer 101 coincides with the center of the lower cross member 52 in the top-bottom direction of the vehicle body frame 21. The spherical second spacer 102 is disposed in the left notch 52b of the lower cross member 52 such that the center of the second spacer 102 coincides with the center of the lower cross member 52 in the top-bottom direction of the vehicle body frame 21. The spherical third spacer 103 is disposed in the right notch 52c of the lower cross member 52 such that the center of the third spacer 103 coincides with the center of the lower cross member 52 in the top-bottom direction of the vehicle body frame 21.

Figure 26:
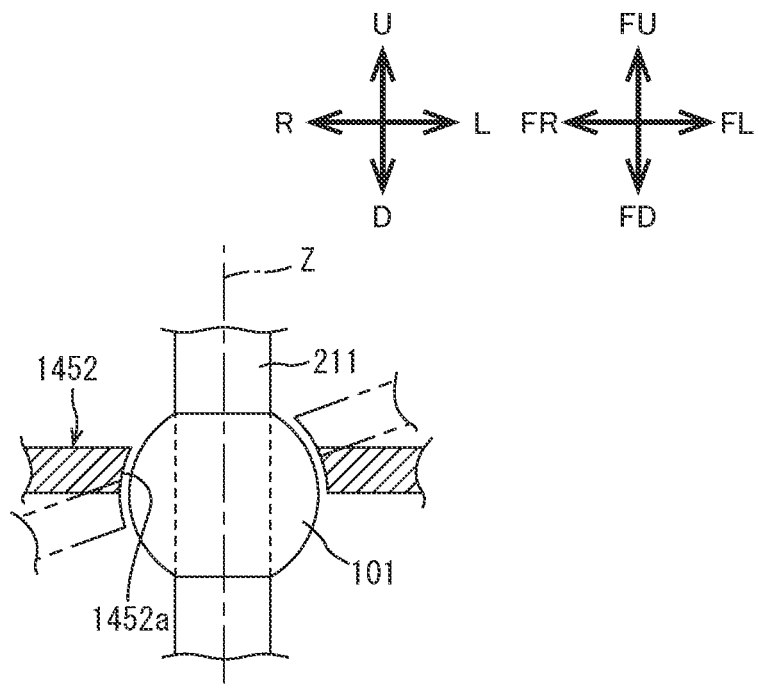
FIG. 26 is a view corresponding to FIG. 15 and illustrating a lower cross member according to another embodiment.

Alternatively, as illustrated in FIG. 26, for example, the first spacer 101 may be disposed with respect to a lower cross member 1452 such that the center of the first spacer 101 is located below the center of the lower cross member 1452 in the top-bottom direction of the vehicle body frame. Although not specifically shown, the first spacer 101 may be disposed with respect to the lower cross member such that the center of the first spacer 101 is located above the center of the lower cross member 1452 in the top-bottom direction of the vehicle body frame. In FIG. 26, reference character 1452a denotes a through hole of the lower cross member. The example of FIG. 26 shows the case of a spacer disposed in the through hole of the lower cross member, but a spacer disposed in the notch of the lower cross member may be disposed similarly.

In the embodiment, the wall surface 52d constituting the through hole 52a in the lower cross member 52 has an arc shape along the outer surface of the first spacer 101 when seen from the front of the vehicle body frame 21 in the direction orthogonal to the intermediate steering axis Z. The wall surface 52e constituting the left notch 52b in the lower cross member 52 has an arc shape along the outer surface of the second spacer 102 when seen from the front of the vehicle body frame 21 in the direction orthogonal to the intermediate steering axis Z. The wall surface 52f constituting the right notch 52c in the lower cross member 52 has an arc shape along the outer surface of the third spacer 103 when seen from the front of the vehicle body frame 21 in the direction orthogonal to the intermediate steering axis Z.

Alternatively, the wall surface constituting a space housing a spacer in the lower cross member may have a shape other than the arc shape. Although wall surfaces constituting through holes will be described below, the following configuration is also applicable to the wall surface constituting the notch similarly.

Figure 27:
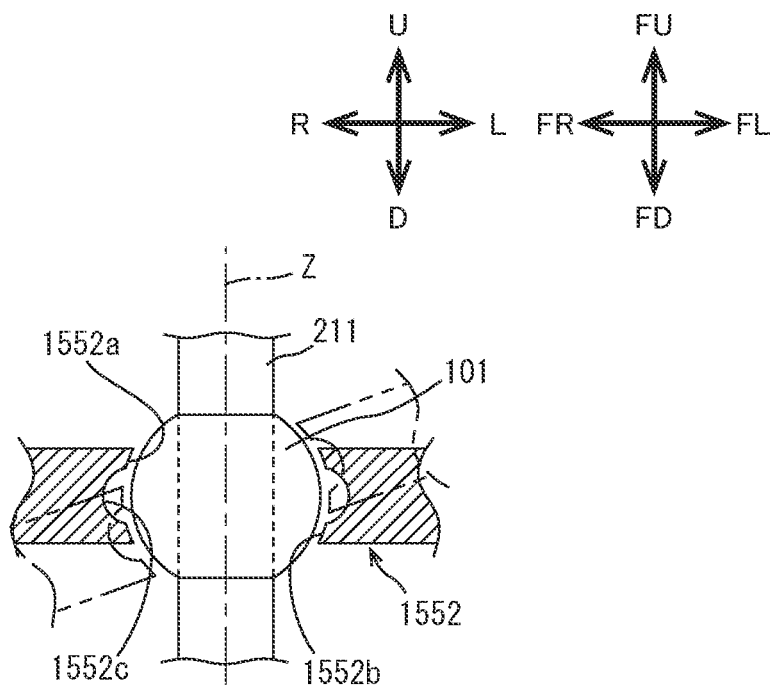
FIG. 27 is a view corresponding to FIG. 15 and illustrating a lower cross member according to another embodiment.

As illustrated in FIG. 27, a recess 1552c may be provided in a wall surface 1552b constituting a through hole 1552a of a lower cross member 1552. The recess 1552c has an arc shape when seen from the front of the vehicle body frame 21 in the direction orthogonal to the intermediate steering axis Z. The recess 1552c is located at the center of the lower cross member 1552 in the top-bottom direction of the vehicle body frame. Alternatively, the recess 1552c may have a shape other than the arc shape when seen from the front of the vehicle body frame in the direction orthogonal to the intermediate steering axis Z. In the top-bottom direction of the vehicle body frame, the recess may be located above the center of the lower cross member or may be located below the center of the lower cross member.

Figure 28:
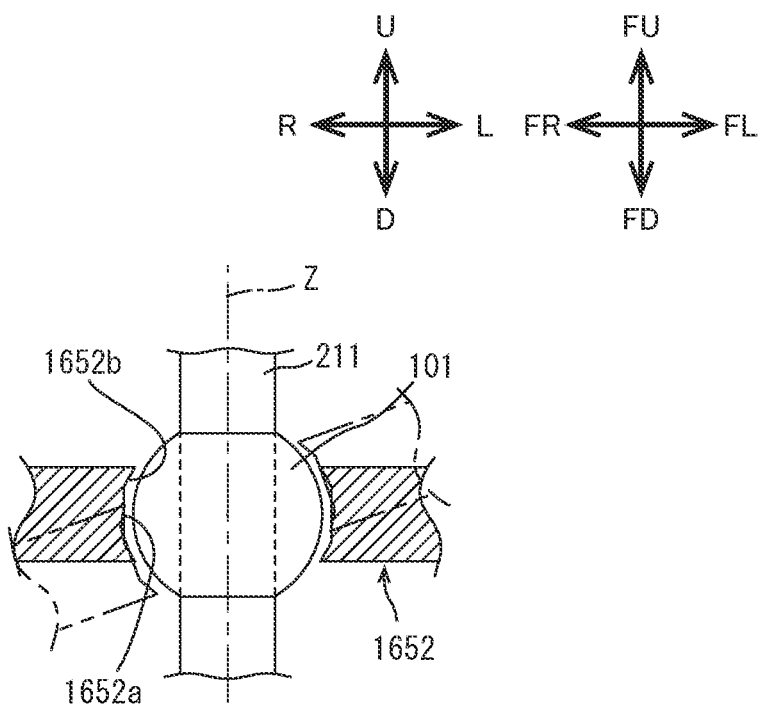
FIG. 28 is a view corresponding to FIG. 15 and illustrating a lower cross member according to another embodiment.

As illustrated in FIG. 28, a wall surface 1652b constituting a through hole 1652a of a lower cross member 1652 may have a polygonal shape along the outer surface of the first spacer 101 when seen from the front of the vehicle body frame 21 in the direction orthogonal to the intermediate steering axis Z. The expression "the wall surface 1652b constituting the through hole 1652a of the lower cross member 1652 has a polygonal shape" means that the wall surface 1652b has a shape with a plurality of apexes when seen from the front of the vehicle body frame in the direction orthogonal to the intermediate steering axis Z. The wall surface may have a shape with only one apex when seen from the front of the vehicle body frame in the direction orthogonal to the intermediate steering axis Z.

Figure 29:
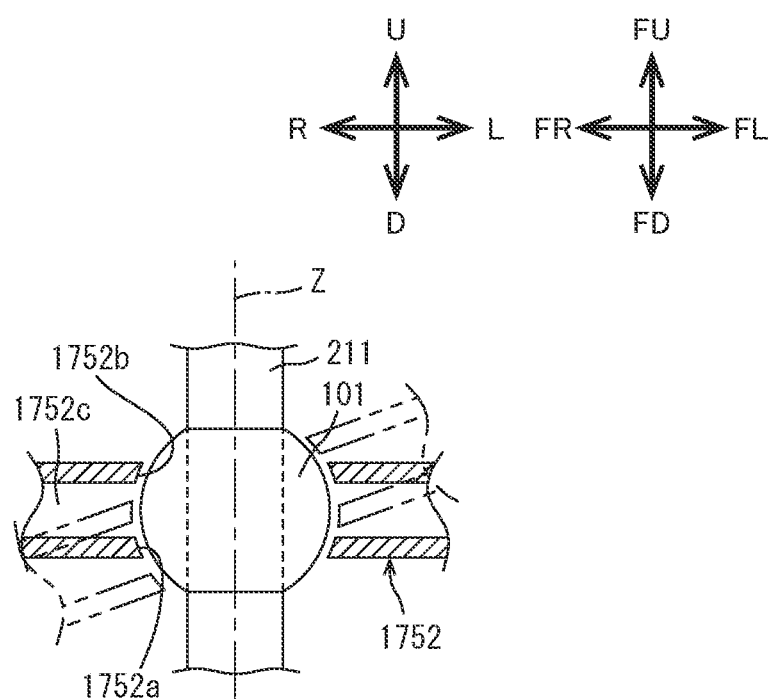
FIG. 29 is a view corresponding to FIG. 15 and illustrating a lower cross member according to another embodiment.

As illustrated in FIG. 29, the lower cross member 1752 may have a hollow portion 1752c that is open at a wall surface 1752b constituting a through hole 1752a. The hollow portion 1752c may be formed in the wall surface 1752b over the entire periphery of the through hole 1752a to surround the first spacer 101 or may be formed only in the wall surface 1752b located in a part of the through hole 1752a.

In the embodiment, the first spacer 101 is located in the through hole 52a of the lower cross member 52 such that the first spacer 101 is located in the gap between the lower cross member 52 and the head pipe 211. The second spacer 102 is located in the left notch 52b of the lower cross member 52 such that the second spacer 102 is located in the gap between the lower cross member 52 and the left side member 53. The third spacer 103 is located in the right notch 52c of the lower cross member 52 such that the third spacer 103 is located in the gap between the lower cross member 52 and the right side member 54.

Alternatively, the leaning vehicle may include at least one of the first spacer, the second spacer, or the third spacer. That is, the leaning vehicle only needs to include a spacer housed in at least one of the gap between the lower cross member and the head pipe, the gap between the lower cross member and the left side member, or the gap between the lower cross member and the right side member.

In the embodiment, a part of the first spacer 101 is located in the through hole 52a of the lower cross member 52 in a state where the front-lower-cross part 521 and the rear-lower-cross part 522 of the lower cross member 52 extend in the left-right direction of the vehicle body frame 21. A part of the second spacer 102 is located in the left notch 52b of the lower cross member 52 in a state where the front-lowercross part 521 and the rear-lower-cross part 522 of the lower cross member 52 extend in the left-right direction of the vehicle body frame 21. A part of the third spacer 103 is located in the right notch 52c of the lower cross member 52 in a state where the front-lower-cross part 521 and the rear-lower-cross part 522 of the lower cross member 52 extend in the left-right direction of the vehicle body frame 21.

Alternatively, a part of the first spacer may not be located in the through hole of the lower cross member in a state where the front-lower-cross part and the rear-lower-cross part extend in the left-right direction of the vehicle body frame. A part of the second spacer may not be located in the left notch of the lower cross member in a state where the front-lower-cross part and the rear-lower-cross part extend in the left-right direction of the vehicle body frame. A part of the third spacer may not be located in the right notch of the lower cross member in a state where the front-lower-cross part and the rear-lower-cross part extend in the left-right direction of the vehicle body frame.

In the embodiment, the first spacer 101 is located in the narrowest gap S1 in the gap between the lower-cross-coupling part 523 of the lower cross member 52 and the head pipe 211 and the gap between the lower-cross-coupling part 524 of the lower cross member 52 and the head pipe 211 when the front-lower-cross part 521 and the rear-lower-cross part 522 of the lower cross member 52 lean to the maximum with respect to the vehicle body frame 21. The second spacer 102 is located in the narrowest gap S2 in the gap between the lower-cross-coupling part 523 of the lower cross member 52 and the left side member 53 when the front-lower-cross part 521 and the rear-lower-cross part 522 of the lower cross member 52 lean to the maximum with respect to the vehicle body frame 21. The third spacer 103 is located in the narrowest gap S3 in the gap between the lower-cross-coupling part 524 of the lower cross member 52 and the right side member 54 when the front-lower-cross part 521 and the rear-lower-cross part 522 of the lower cross member 52 lean to the maximum with respect to the vehicle body frame 21.

Alternatively, the first spacer may not be located in the narrowest gap in the gap between the lower-cross-coupling part of the lower cross member and the head pipe and the gap between the lower-cross-coupling part of the lower cross member and the head pipe when the front-lower-cross part and the rear-lower-cross part lean to the maximum with respect to the vehicle body frame. The second spacer may not be located in the narrowest gap in the gap between the lower-cross-coupling part of the lower cross member and the left side member when the front-lower-cross part and the rear-lower-cross part lean to the maximum with respect to the vehicle body frame. The third spacer may not be located in the narrowest gap in the gap between the lower-cross-coupling part of the lower cross member and the right side member when the front-lower-cross part and the rear-lower-cross part lean to the maximum with respect to the vehicle body frame.

In the embodiment, the first spacer 101 projects upward from the through hole 52a when the vehicle body frame 21 is seen from the front. The second spacer 102 projects upward from the left notch 52b when the vehicle body frame 21 is seen from the front. The third spacer 103 projects upward from the right notch 52c when the vehicle body frame 21 is seen from the front.

Alternatively, the first spacer may not project upward from the through hole of the lower cross member when the vehicle body frame is seen from the front. The second spacer may not project upward from the left notch of the lower cross member when the vehicle body frame is seen from the front. The third spacer may not project upward from the right notch of the lower cross member when the vehicle body frame is seen from the front.

In the embodiment, in the lower cross member 52, the front-lower-cross part 521, the rear-lower-cross part 522, and the lower-cross-coupling parts 523 and 524 are integrally formed. Alternatively, the front-lower-cross part, the rear-lower-cross part, and the lower-cross-coupling parts may be constituted by separate members. The front-lower-cross part and the lower-cross-coupling part may be integrally formed with the rear-lower-cross part being a separate member from the front-lower-cross part and the lower-cross-coupling part. The rear-lower-cross part and the lower-cross-coupling part may be integrally formed with the front-lower-cross part being a separate member from the rear-lower-cross part and the lower-cross-coupling part.

In the embodiment, the linkage mechanism 5 includes the upper cross member 51 located at the rear of the head pipe 211. Alternatively, the linkage mechanism may include a front-upper-cross member at the front of a rear-upper-cross member and the head pipe. In the manner described above, in the case where the upper cross member includes the rear-upper-cross member and the front-upper-cross member, in a manner similar to the case of the lower cross member in the embodiment, the leaning vehicle preferably includes a spacer housed in at least one of the gap between the upper cross member and the head pipe, the gap between the upper cross member and the left side member, and the gap between the upper cross member and the right side member.

FIG. 30 is a view illustrating a schematic configuration of the linkage mechanism in a case where the linkage mechanism including the front-upper-cross member is seen from the front of the vehicle body frame. For description, FIG. 30 shows only the schematic configuration of the linkage mechanism. In FIG. 30, movable portions of the linkage mechanism are indicated as circles, and spaces are indicated by broken lines.

Although not specifically shown, an upper cross member 1051 includes a coupling part coupling the front-upper-cross member and the rear-upper-cross member to each other in the front-rear direction of the vehicle body frame, between the left side member 53 and the head pipe 211 and between the right side member 54 and the head pipe 211.

As illustrated in FIG. 30, spacers 104, 105, and 106 housed in gaps are provided in portions where the upper cross member 1051 including the front-upper-cross member is rotatably connected to the head pipe 211, the left side member 53, and the right side member 54. Specifically, the spacer 104 is provided in a gap between the coupling part of the upper cross member 1051 and the head pipe 211. The spacer 105 is provided in a gap between the coupling part of the upper cross member 1051 and the left side member 53. The spacer 106 is provided in a gap between the coupling part of the upper cross member 1051 and the right side member 54.

In the embodiment, the linkage mechanism 5 includes the upper cross member 51 and the lower cross member 52 whose intermediate portions in the left-right direction of the vehicle body frame 21 are rotatably supported by the head pipe 211. Alternatively, the linkage mechanism may have other configurations.

FIGS. 31 through 34 are schematic views illustrating general configurations of linkage mechanisms having other configurations. In a manner similar to FIG. 30, FIGS. 31 through 34 show only schematic configurations of the linkage mechanisms for description. In a manner similar to FIG.

30, in FIGS. 31 through 34, movable portions of the linkage mechanisms are indicated as circles, and spacers are indicated by broken lines.

As illustrated in FIG. 31, an upper cross member 2051 may include a left-upper-cross member 2051a whose right end portion is rotatably supported by the head pipe 211 and a right-upper-cross member 2051b whose left end portion is rotatably supported by the head pipe 211. The left-upper-cross member 2051a includes left portions of the front-upper-cross member and the rear-upper-cross member. The right-upper-cross member 2051b includes right portions of the front-upper-cross member and the rear-upper-cross member.

Although not specifically shown, the left-upper-cross member 2051a includes a coupling part connecting the front-upper-cross member and the rear-upper-cross member to each other in the front-rear direction of the vehicle body frame, between the left side member 53 and the head pipe 211. The right-upper-cross member 2051b includes a coupling part coupling the front-upper-cross member and the rear-upper-cross member to each other in the front-rear direction of the vehicle body frame, between the right side member 54 and the head pipe 211.

In the case of the configuration illustrated in FIG. 31, the right end portion of the left-upper-cross member 2051a and the left end portion of the right-upper-cross member 2051b are supported to the head pipe 211 to be rotatable about the intermediate steering axis Z. In FIG. 31, components similar to those in FIG. 30 are denoted by the same reference characters, and description thereof will not be repeated.

Figure 32:
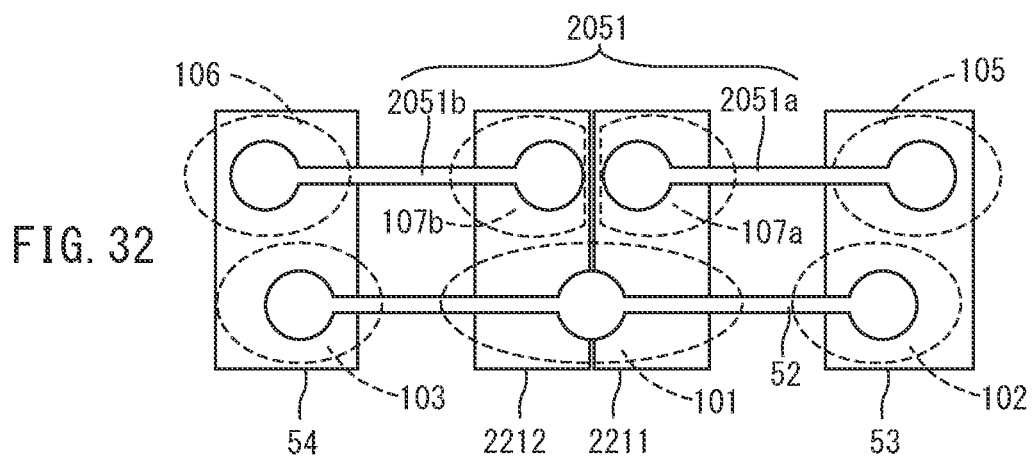
FIG. 32 is a view corresponding to FIG. 30 and illustrating a configuration of a linkage mechanism according to another embodiment.

As illustrated in FIG. 32, the right end portion of the left-upper-cross member 2051a and the left end portion of the right-upper-cross member 2051b may be rotatably supported by different members. That is, the right end portion of the left-upper-cross member 2051a is rotatably supported by a first support member 2211, and the left end portion of the right-upper-cross member 2051b is rotatably supported by a second support member 2212. Each of the first support member 2211 and the second support member 2212 is a member extending in the top-bottom direction of the vehicle body frame. The first support member 2211 and the second support member 2212 may be members connected to the vehicle body frame or may be parts of the vehicle body frame. In FIG. 32, components similar to those in FIG. 31 are denoted by the same reference characters, and description thereof will not be repeated.

A spacer 107a is provided in a gap between the coupling part of the left-upper-cross member 2051a and the first support member 2211. A spacer 107b is provided in a gap between the coupling part of the right-upper-cross member 2051b and the second support member 2212.

The lower cross member 52 may be rotatably supported by the first support member 2211, or may be rotatably supported by the second support member 2212.

In the configurations illustrated in FIGS. 31 and 32, the upper cross member 2051 includes the left-upper-cross member 2051a and the right-upper-cross member 2051b. Alternatively, the lower cross member may include a left-lower-cross member and a right-lower-cross member. In this case, the upper cross member may include a left-upper-cross member and a right-upper-cross member, or may not be divided into the left-upper-cross member and the right-upper-cross member.

In the configurations illustrated in FIGS. 30 through 32, the upper cross member may include only one of the front-upper-cross member and the rear-upper-cross member. In a case where the upper cross member includes only one of the front-upper-cross member or the rear-upper-cross member, the upper cross member does not include the coupling part.

Figure 33:
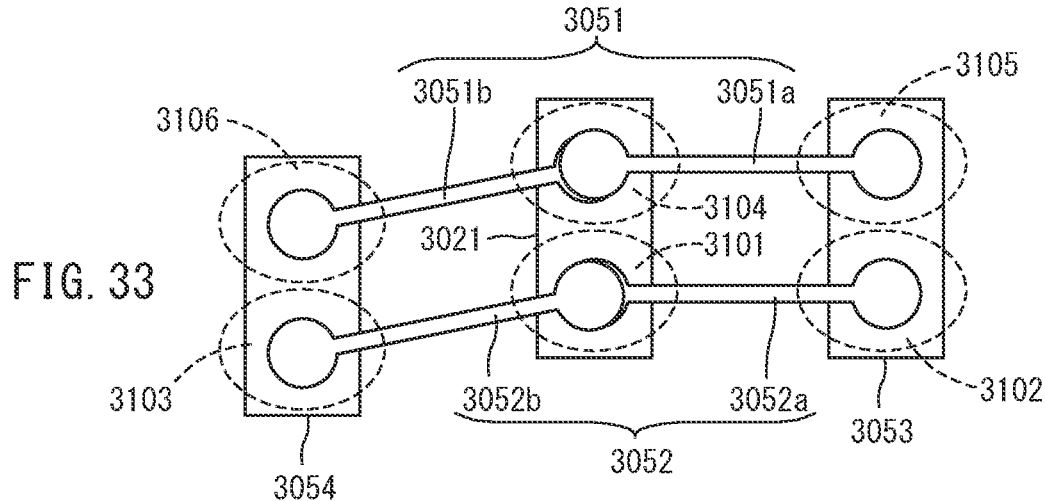
FIG. 33 is a view corresponding to FIG. 30 and illustrating a configuration of a linkage mechanism according to another embodiment.

As illustrated in FIG. 33, the linkage mechanism may be a left and right independent suspension type linkage mechanism. The linkage mechanism includes an upper cross member 3051, a lower cross member 3052, a left side member 3053, and a right side member 3054.

The upper cross member 3051 includes a left-upper-cross member 3051a and a right-upper-cross member 3051b. A left end portion of the left-upper-cross member 3051a is rotatably connected to the left side member 3053. A right end portion of the left-upper-cross member 3051a is rotatably connected to a vehicle body frame 3021. A right end portion of the right-upper-cross member 3051b is rotatably connected to the right side member 3054. A left end portion of the right-upper-cross member 3051b is rotatably connected to the vehicle body frame 3021.

Although not specifically shown, the left-upper-cross member 3051a includes a front-left-upper-cross member located at the front of the vehicle body frame 3021 and a rear-left-upper-cross member located at the rear of the vehicle body frame 3021. The left-upper-cross member 3051a includes a coupling part coupling the front-left-upper-cross member and the rear-left-upper-cross member to each other in the front-rear direction of the vehicle body frame, between the left side member 3053 and the vehicle body frame 3021.

Similarly, the right-upper-cross member 3051b includes a front-right-upper-cross member located at the front of the vehicle body frame 3021 and a rear right-upper-cross member located at the rear of the vehicle body frame 3021. The right-upper-cross member 3051b includes a coupling part coupling the front-right-upper-cross member and the rear-right-upper-cross member to each other in the front-rear direction of the vehicle body frame, between the right side member 3054 and the vehicle body frame 3021.

The lower cross member 3052 includes a left-lower-cross member 3052a and a right-lower-cross member 3052b. A left end portion of the left-lower-cross member 3052a is rotatably connected to the left side member 3053. A right end portion of the left-lower-cross member 3052a is rotatably connected to the vehicle body frame 3021. A right end portion of the right-lower-cross member 3052b is rotatably connected to the right side member 3054. A left end portion of the right-lower-cross member 3052b is rotatably connected to the vehicle body frame 3021.

Although not specifically shown, the left-lower-cross member 3052a includes a front-left-lower-cross member located at the front of the vehicle body frame 3021 and a rear-left-lower-cross member located at the rear of the vehicle body frame 3021. The left-lower-cross member 3052a includes a coupling part coupling the front-left-lower-cross member and the rear-left-lower-cross member to each other in the front-rear direction of the vehicle body frame, between the left side member 3053 and the vehicle body frame 3021.

Similarly, the right-lower-cross member 3052b includes a front-right-lower-cross member located at the front of the vehicle body frame 3021 and a rear-right-lower-cross member located at the rear of the vehicle body frame 3021. The right-lower-cross member 3052b includes a coupling part coupling the front-right-lower-cross member and the rear-right-lower-cross member to each other in the front-rear direction of the vehicle body frame, between the right side member 3054 and the vehicle body frame 3021.

A spacer 3101 is provided in a gap between the coupling part of the left-lower-cross member 3052a and the coupling part of the right-lower-cross member 3052b, and the vehicle body frame 3021. A spacer 3102 is provided in a gap between the coupling part of the left-lower-cross member 3052a and the left side member 3053. A spacer 3103 is provided in a gap between the coupling part of the right-lower-cross member 3052b and the right side member 3054.

A spacer 3104 is provided in a gap between the coupling part of the left-upper-cross member 3051a and the coupling part of the right-upper-cross member 3051b, and the vehicle body frame 3021. A spacer 3105 is provided in a gap between the coupling part of the left-upper-cross member 3051a and the left side member 3053. A spacer 3106 is provided in a gap between the coupling part of the right-upper-cross member 3051b and the right side member 3054.

Figure 34:
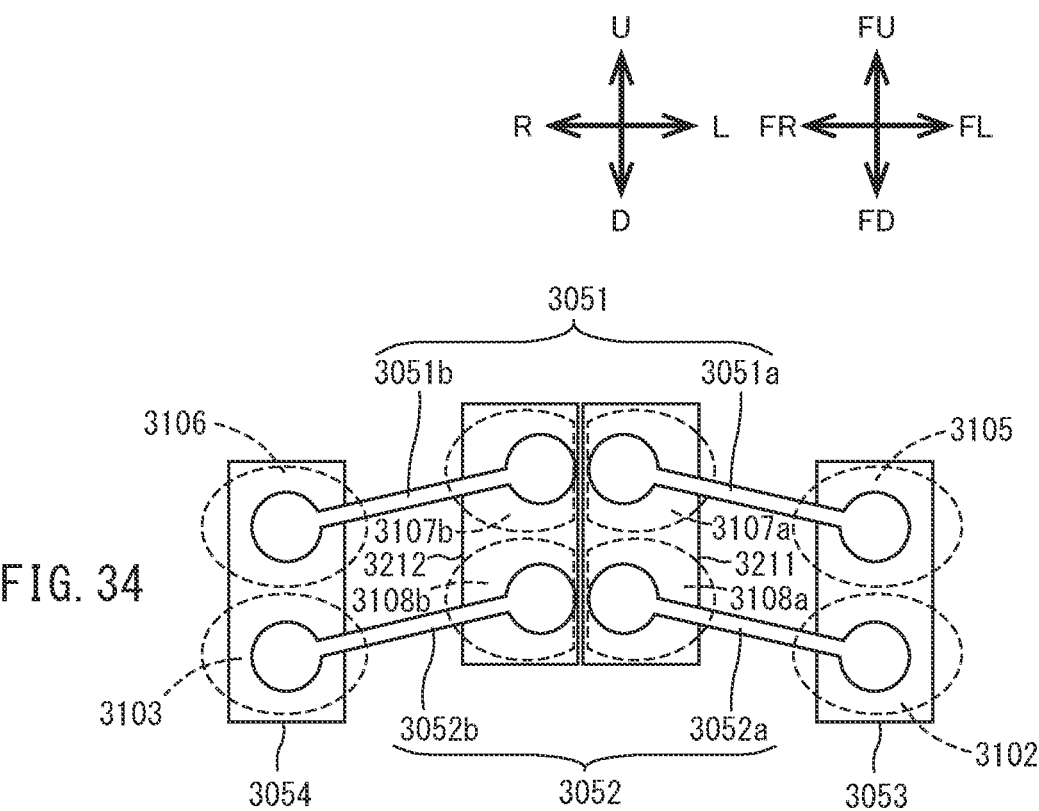
FIG. 34 is a view corresponding to FIG. 30 and illustrating a configuration of a linkage mechanism according to another embodiment.

As illustrated in FIG. 34, the right end portion of the left-upper-cross member 3051a and the left end portion of the right-upper-cross member 3051b may be rotatably supported by other members. The right end portion of the left-lower-cross member 3052a and the left end portion of the right-lower-cross member 3052b may be rotatably supported by other members. In FIG. 34, components similar to those in FIG. 33 are denoted by the same reference characters, and description thereof will not be repeated.

That is, the right end portions of the left-upper-cross member 3051a and the left-lower-cross member 3052a are rotatably supported by a first support member 3211, and the left end portions of the right-upper-cross member 3051b and the right-lower-cross member 3052b are rotatably supported by a second support member 3212. Each of the first support member 3211 and the second support member 3212 is a member extending in the top-bottom direction of the vehicle body frame. The first support member 3211 and the second support member 3212 may be members connected to the vehicle body frame or may be parts of the vehicle body frame.

A spacer 3107a is provided in a gap between the coupling part of the left-upper-cross member 3051a and the first support member 3211. A spacer 3107b is provided in a gap between the coupling part of the right-upper-cross member 3051b and the second support member 3212.

A spacer 3108a is provided in a gap between the coupling part of the left-lower-cross member 3052a and the first support member 3211. A spacer 3108b is provided in a gap between the coupling part of the right-lower-cross member 3052b and the second support member 3212.

In the embodiment, the restriction mechanism 9 includes the stopper part 92 that holds the plate-shaped rotation part 91 in the thickness direction and applies a friction force to the rotation part 91. Alternatively, the restriction mechanism may have any configuration as long as leftward or rightward leaning of the leaning vehicle can be restricted.

In the embodiment, the front-wheel-braking mechanism 11 includes the front-wheel-brake discs 111 and the front-wheel-brake calipers 112. Alternatively, the front-wheel-braking mechanism may have any configuration as long as a braking force is applied to the pair of left and right front wheels. In the embodiment, the front-wheel-braking mechanism 11 is actuated by a hydraulic pressure, but may be actuated by other techniques (e.g., wires) other than the hydraulic pressure.

In the embodiment, the rear-wheel-braking mechanism 12 includes the rear-wheel-brake disc 121 and the rear-wheel-brake caliper 122. Alternatively, the rear-wheel-braking mechanism may have any configuration as long as a braking force is applied to the rear wheel. In the embodiment, the rear-wheel-braking mechanism 12 is actuated by the rear-wheel-brake wire 123, but may be actuated by other techniques (e.g., hydraulic pressure) other than wires.

In the embodiment, the leaning vehicle 1 includes the interlocking mechanism 16 that interlocks the restriction mechanism 9 and the rear-wheel-braking mechanism 12 with each other by operating the lean lock lever 93. Alternatively, the interlocking mechanism may interlock the restriction mechanism and the front-wheel-braking mechanism with each other. The configuration of the interlocking mechanism is not limited to the configuration described above, and may be other configurations. The leaning vehicle may not include an interlocking mechanism.

DESCRIPTION OF REFERENCE CHARACTERS

1 leaning vehicle
2 vehicle body
3 front wheel
4 rear wheel
5 linkage mechanism
6 steering mechanism
8 load transfer mechanism
9 restriction mechanism
11 front-wheel-braking mechanism
12 rear-wheel-braking mechanism
13 extension/contraction adjusting mechanism
14 meter
15 throttle device
16 interlocking mechanism
17 lock mechanism
21, 3021 vehicle body frame
22 power unit
31 left front wheel
32 right front wheel
41 wheel shaft
51, 1051, 2051, 3051 upper cross member
52, 1052, 1152, 1252, 1352, 1452, 1552, 1652, 1752, 3052 lower cross member
52a, 1052a, 1152a, 1252a, 1352a, 1452a, 1552a, 1652a, 1752a through hole
52b left notch (recess)
52c right notch (recess)
52d, 52e, 52f, 1652b, 1752b wall surface
53, 3053 left side member
53a upper-left-coupling part
53b lower-left-coupling part
54, 3054 right side member
54a upper-right-coupling part
54b lower-right-coupling part
61 left suspension part
62 right suspension part
63 left bracket
64 right bracket
65 steering member
66 steering-force-transfer mechanism
81 left-foot-load-transfer part
82 right-foot-load-transfer part
83 left-right coupling member
91 rotation part
92 stopper part
93 lean lock lever
94 lean lock wire
101, 1101, 1201, 1301, 1401, 1501, 1601, 1701 first spacer (spacer, foreign-matter-entering-suppression part)

102 second spacer (spacer, foreign-matter-entering-suppression part)
103 third spacer (spacer, foreign-matter-entering-suppression part)
104 to 106, 107*a*, 107*b*, 3101, 3102, 3103, 3104, 3105, 3106, 3107*a*, 3107*b*, 3108*a*, 3108*b* spacer
131 fixing member
141 body
141*a* display surface
142 power-supply-operation section
143 vehicle-state-display section
144 battery-remaining-capacity-display section
145 vehicle-speed-display section
146 lean-lock-display section
149 signal line
149*a* curl cord
151 throttle lever
151*a* pressing part
152 throttle-lever-support part
159 signal line
159*a* curl cord
161 first equalizer
162 second equalizer
163 interlock brake wire
211 head pipe (linkage support part)
212 main frame
213 upper frame
214 under frame
221 battery
521 front-lower-cross part (front cross part)
522 rear-lower-cross part (rear cross part)
523 lower-cross-coupling part (coupling part)
523*a*, 524*a* recess
524 lower-cross-coupling part (coupling part)
651 handlebar
652 steering shaft
653 inner pipe
654 outer pipe
669 tie rod
811 left-foot-placing part
812 left coupling member
821 right-foot-placing part
822 right coupling member
941 first-lean-lock wire
942 second-lean-lock wire
1101*a* recess
1201*a*, 1201*b* spacer constituent
1552*c* recess
1752*c* hollow portion
2211, 3211 first support member
2212, 3212 second support member
2051*a*, 3051*a* left-upper-cross member
2051*b*, 3051*b* right-upper-cross member
3052*a* left-lower-cross member
3052*b* right-lower-cross member
X left steering axis
Y right steering axis
Z intermediate steering axis
UI upper-intermediate-coupling axis
UL upper-left-coupling axis
UR upper-right-coupling axis
DI lower-intermediate-coupling axis (intermediate axis)
DL lower-left-coupling axis (left axis)
DR lower-right-coupling axis (right axis)
P rotation axis
S1 narrowest gap in gaps between lower-cross-coupling parts and head pipe at maximum leaning
S2 narrowest gap in gap between lower-cross-coupling part and left side member at maximum leaning
S3 narrowest gap in gap between lower-cross-coupling part and right side member at maximum leaning

The invention claimed is:

1. A leaning vehicle configured to lean leftward when turning left and lean rightward when turning right, the leaning vehicle comprising:
   a vehicle body frame including a linkage support part extending in a top-bottom direction thereof;
   a left front wheel disposed left of the vehicle body frame in a left-right direction of the vehicle body frame;
   a right front wheel disposed right of the vehicle body frame in the left-right direction of the vehicle body frame;
   a left suspension part having an upper portion and a lower portion, the lower portion thereof supporting the left front wheel;
   a right suspension part having an upper portion and a lower portion, the lower portion thereof supporting the right front wheel;
   a linkage mechanism supported by the linkage support part, the linkage mechanism including
      a left side member coupled to the upper portion of the left suspension part, such that the upper portion of the left suspension part is rotatable about a left steering axis, the left steering axis extending in the top-bottom direction of the vehicle body frame,
      a right side member coupled to the upper portion of the right suspension part, such that the upper portion of the right suspension part is rotatable about a right steering axis, the right steering axis being parallel to the left steering axis, and
      a lower cross member, having
         a front cross part located, in a front-rear direction of the vehicle body frame, in front of the linkage support part, the left side member and the right side member, the front cross part having a left end portion and a right end portion,
         a rear cross part located, in the front-rear direction of the vehicle body frame, behind the front cross part and the linkage support part, the rear cross part having a left end portion and a right end portion, and
         a coupling part coupling the front cross part and the rear cross part to each other in the front-rear direction of the vehicle body frame in at least one of
            a location between the left side member and the linkage support part, or
            a location between the right side member and the linkage support part, wherein
         the left side member is coupled to the left end portion of the front cross part and the left end portion of the rear cross part, such that the left side member is rotatable about a left axis extending in the front-rear direction of the vehicle body frame,
         the right side member is coupled to the right end portion of the front cross part and the right end portion of the rear cross part, such that the right side member is rotatable about a right axis parallel to the left axis, and
         both the front cross part and the rear cross part are supported by the linkage support part, such that the front cross part and the rear cross part are rotatable about an intermediate axis parallel to the left axis and the right axis; and a foreign-matter-entering-suppression part filling a gap that is
   between the linkage support part and the coupling part,
   between the left side member and the coupling part, or
   between the right side member and the coupling part,
to thereby prevent foreign matter from entering the gap,
wherein
   the coupling part has a recess configured to accommodate the foreign-matter-entering-suppression part when the front cross part and the rear cross part rotate with respect to the linkage support part.

2. The leaning vehicle according to claim 1, wherein
the foreign-matter-entering-suppression part is a spacer at least partially located in the gap.

3. The leaning vehicle according to claim 2, wherein
the spacer is disposed in the gap and is free of contact with the recess.

4. The leaning vehicle according to claim 2, wherein
the coupling part has a lower portion and an upper portion, respectively below and above a center of the coupling part, in the top-bottom direction of the vehicle body frame, and
in a cross sectional view of the linkage mechanism passing the left steering axis and the right steering axis, a distance, in the left-right direction of the vehicle body frame, between the intermediate axis and the upper portion or the lower portion of the coupling part, is smaller than a distance between the intermediate axis and the center of the coupling part.

5. The leaning vehicle according to claim 2, further comprising
an upper cross part located above the front cross part or the rear cross part in the top-bottom direction of the vehicle body frame, the upper cross part being located, in the front-rear direction of the vehicle body frame, in front of or behind the linkage support part, the left side member and the right side member, the upper cross part having
   a left end portion coupled to the left side member such that the left side member is rotatable about an upper left axis extending in the front-rear direction of the vehicle body frame, and
   a right end portion coupled to the right side member such that the right side member is rotatable about an upper right axis parallel to the upper left axis,
the upper cross part being supported by the linkage support part such that the upper cross part is rotatable about an upper intermediate axis parallel to the upper left axis and the upper right axis.

6. The leaning vehicle according to claim 2, wherein
at least one of the front cross part or the rear cross part is rotatably supported by the linkage support part with a bearing.

7. The leaning vehicle according to claim 2, wherein
a part of the spacer is located in the gap in a state where each of the front cross part and the rear cross part extends in the left-right direction of the vehicle body frame.

8. The leaning vehicle according to claim 2, wherein
the spacer is located in a narrowest portion of the gap when the front cross part and the rear cross part lean with respect to the vehicle body frame to a maximum.

9. The leaning vehicle according to claim 2, wherein
the spacer projects upward from the gap.

10. The leaning vehicle according to claim 2, wherein
a part of the spacer facing the coupling part has a curved outer surface in a sectional view of the linkage mechanism passing the left steering axis and the right steering axis.

11. The leaning vehicle according to claim 2, wherein
the spacer is formed integrally with the linkage support part, the left side member, or the right side member.

* * * * *